US008265455B2

(12) United States Patent
Shinkai

(10) Patent No.: US 8,265,455 B2
(45) Date of Patent: Sep. 11, 2012

(54) APPARATUS, METHOD, AND PROGRAM FOR PROCESSING INFORMATION

(75) Inventor: Mitsutoshi Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1068 days.

(21) Appl. No.: 11/011,653

(22) Filed: Dec. 14, 2004

(65) Prior Publication Data

US 2005/0158025 A1 Jul. 21, 2005

(30) Foreign Application Priority Data

Dec. 15, 2003 (JP) ................................ 2003-416679

(51) Int. Cl.
*H04N 5/77* (2006.01)
*H04N 5/775* (2006.01)
*H04N 9/80* (2006.01)

(52) U.S. Cl. .......................... 386/248; 386/224; 386/230
(58) Field of Classification Search .................... 386/46, 386/94, 117; 348/207.99, 441
See application file for complete search history.

(56) References Cited

U.S. PATENT DOCUMENTS

| | | | |
|---|---|---|---|
| 5,084,912 A * | 1/1992 | Barr .............................. | 378/98.2 |
| 6,137,539 A * | 10/2000 | Lownes et al. ................ | 348/569 |
| 6,334,023 B1 * | 12/2001 | Bruls ............................ | 386/286 |
| 6,449,426 B1 * | 9/2002 | Suga et al. .................... | 386/228 |
| 7,015,957 B2 * | 3/2006 | Romano et al. ............. | 348/231.1 |
| 7,015,965 B2 * | 3/2006 | Asada et al. ................. | 348/312 |
| 7,053,933 B2 * | 5/2006 | Suzuki ......................... | 348/211.6 |
| 7,073,193 B2 * | 7/2006 | Marsh .......................... | 725/114 |
| 7,274,389 B1 * | 9/2007 | Hieda ......................... | 348/207.1 |
| 7,333,149 B2 * | 2/2008 | Choi ............................ | 348/441 |
| 7,369,683 B2 * | 5/2008 | Kobayashi et al. ........... | 382/107 |
| 2002/0135607 A1 | 9/2002 | Kato et al. | |
| 2003/0099459 A1 * | 5/2003 | Yanagita et al. ............... | 386/52 |

(Continued)

FOREIGN PATENT DOCUMENTS

JP 2003 78856 3/2003

(Continued)

OTHER PUBLICATIONS

Patent Abstracts of Japan, publication No. 11-177868 published on Jul. 2, 1999.

(Continued)

*Primary Examiner* — William C Vaughn, Jr.
*Assistant Examiner* — Gelek W Topgyal
(74) *Attorney, Agent, or Firm* — Frommer Lawrence & Haug LLP; William S. Frommer; Ellen Marcie Emas

(57) ABSTRACT

Disclosed is an apparatus, a method, and a program for processing information, applicable to a record playback system etc. wherein a control unit provides information regarding an input imaging record mode inputted by a user to a rate information creation unit; the rate information creation unit creates rate information based on the information and provides the rate information to a record unit; the record unit records the rate information etc. onto an optical disc as being controlled by the control unit; a playback unit is controlled by a control unit to read out the rate information recorded on the optical disc and provide it to a rate information determination unit; the rate information determination unit determines a processing mode at each unit based on the rate information and provides the information to the control unit; and the control unit controls the playback unit, an image audio processing unit, and an output unit based on this information.

23 Claims, 28 Drawing Sheets

U.S. PATENT DOCUMENTS

| | | | |
|---|---|---|---|
| 2003/0128283 A1* | 7/2003 | Watanabe et al. | 348/231.9 |
| 2003/0146981 A1* | 8/2003 | Bean et al. | 348/222.1 |
| 2004/0081437 A1* | 4/2004 | Asada et al. | 386/131 |
| 2004/0174439 A1* | 9/2004 | Upton | 348/222.1 |
| 2004/0218902 A1* | 11/2004 | Yanagita | 386/52 |
| 2005/0052553 A1* | 3/2005 | Kido et al. | 348/296 |
| 2007/0030374 A1* | 2/2007 | Ishii | 348/333.01 |
| 2010/0110207 A1* | 5/2010 | Strandwitz et al. | 348/211.2 |

FOREIGN PATENT DOCUMENTS

| | | |
|---|---|---|
| WO | WO 03/063472 | 7/2003 |

OTHER PUBLICATIONS

European Search Report dated Feb. 25, 2011.

* cited by examiner

FIG. 7A
CAPTURE RATE =25p
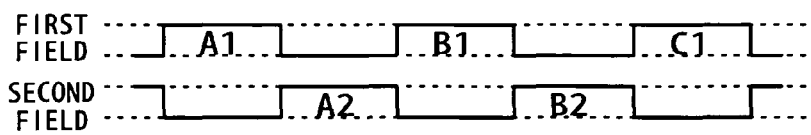
FIG. 7B
CAPTURE RATE =50p
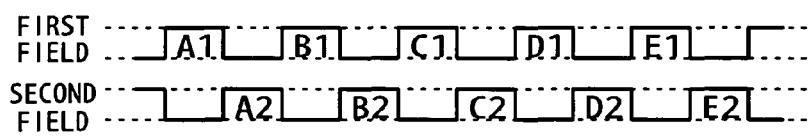
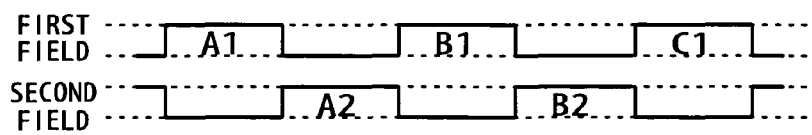
FIG. 7C
CAPTURE RATE =12.5p
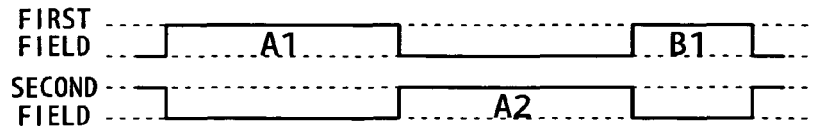
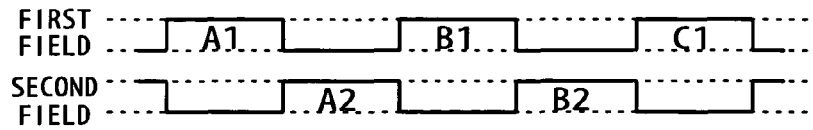

FIG. 11

| FRAME NUMBER | CAPTURE RATE | REC RATE | FORMAT RATE |
|---|---|---|---|
| 0 | 50i | 50i | 50i |
| 1000 | 100i | 100i | 50i |
| 2000 | 25i | 25i | 50i |
| .... | .... | .... | .... |

| FORMAT RATE | REC RATE | CAPTURE RATE | IMAGING RECORD MODE |
|---|---|---|---|
| 50i | 50i | 50i | 50i ONE-TIME SPEED |
| | 100i | 100i | 50i DOUBLE SPEED |
| | 25i | 25i | 50i HALF SPEED |
| | Ni | Ni | 50i (N/50) TIMES SPEED |
| | 50i | 25p | PSF (50i) ONE-TIME SPEED |
| | 100i | 50p | PSF (50i) DOUBLE SPEED |
| | 25i | 12.5p | PSF (50i) HALF SPEED |
| | 2Ni | Np | PSF (50i) (N/25) TIMES SPEED |
| 25p | 25p | 25p | 25p ONE-TIME SPEED |
| | 50p | 50p | 25p DOUBLE SPEED |
| | 12.5p | 12.5p | 25p HALF SPEED |
| | Np | Np | 25p (N/25) TIMES SPEED |
| 60i | 60i | 24p | 2-3 PULL-DOWN (60i 24p) ONE-TIME SPEED |
| | 120i | 48p | 2-3 PULL-DOWN (60i 24p) DOUBLE SPEED |
| | 30i | 12p | 2-3 PULL-DOWN (60i 24p) HALF SPEED |
| | Ri | Sp | 2-3 PULL-DOWN (60i (60×S/R)p) (R/60) TIMES SPEED |

APPARATUS, METHOD, AND PROGRAM FOR PROCESSING INFORMATION

BACKGROUND OF THE INVENTION

The present invention relates to an apparatus, a method, and a program for processing information, and in particular, relates to an apparatus, a method, and a program for processing information so designed as to be effective in playback processing or output processing.

Conventionally, in the case of imaging a subject with an imaging apparatus such as a video camera, in order to provide a variety of video effects, there is a method for e.g. varying the number of obtained frames per second by varying the number of times of outputting data per second at an imager such as a CCD.

With this method, it is possible to perform high-speed imaging which brings about low-speed playback (slow-motion playback) at the time of normal playback by capturing an image at higher speed than in the case of normal imaging (increasing the number of times of capturing, that is, increasing the number of times of photoelectric conversion processing per second at the imager), and low-speed imaging which brings about high-speed playback (fast-forward playback) at the time of the normal playback by decreasing the number of times of capturing the image (i.e., decreasing the number of times of the photoelectric conversion processing per second at the imager), as well as the normal imaging for capturing the image at the same rate as a playback rate (the number of played-back frames per second) of the normal playback (i.e., controlling the number of times of the photoelectric conversion processing per second at the imager to obtain a frame of image data at the same rate as the playback rate).

To be specific, for example, there has been a method for varying an imaging frame rate which is the number of frames of an image obtained with photoelectric conversion at a CCD per second, by controlling a retrace time added to an imaging signal obtained by imaging a subject, with an image signal of the imaging frame rate being an image signal of a CDR system (Common Data Rate: a common sampling frequency system). Further, there has been a method for obtaining an image signal of an output frame rate by generating an image signal of an imaging frame rate and performing frame addition using the image signal of the imaging frame rate. Furthermore, there has been a method for generating an image signal of an output frame rate based on a frame rate setting signal from an image signal of an imaging frame rate by switching the number of additional frames at frame addition in the case where the image signal of the output frame rate based on the frame rate setting signal cannot be obtained even though the imaging frame rate is varied within a specified period (see patent document 1, for example).

Further, there are cases where, for example, an image captured by a CCD with a progressive system is converted into interlaced-system data, or a film image is converted into interlaced-system data, that is, a system of the obtained image data is converted.

Patent document 1: WO 03/063472 A1

In the case of playing back the image data obtained with the image capture rate varied and the converted image data at the time of imaging as described above, effects of outputted images on which the same normal playback is performed differ depending on processing performed on the data at the time of imaging, and there is a problem that it is difficult for a user who plays back the data to grasp correctly what kind of processing has been performed on the data.

In particular, in the case where persons, places, or dates differ between in imaging work and playback and edit work due to large-scale production work such as production of a TV program, it is difficult for an editor who conducts the edit work to grasp correctly what kind of setting a photographer who conducts the imaging work has chosen to image a subject and obtain image data to be edited.

Further, it is desirable to output image data with the interlaced system if the image data has been captured with the interlaced system at the time of imaging for example, but it is possible to output image data converted into data with the progressive system again if the image data has been captured with the progressive system and converted into data with the interlaced system. However, in the case of playing back and outputting image data that has been converted from the progressive system to the interlaced system, there is a problem that a player which is a playback output apparatus cannot play back image data except with the interlaced system because the image data consists with the interlaced system.

SUMMARY OF THE INVENTION

In view of the above problems, it is therefore an object of the present invention to provide a user or an apparatus that plays back data with information regarding settings at the time of imaging and recording so that they can perform more effective playback processing or output processing.

A first aspect of the present invention resides in an information processing apparatus which comprises a creation device for creating a capture rate which is information regarding a data rate at the time of inputting or generating content data, a REC rate which is information regarding a data rate at the time of recording the content data, and a format rate which is a data rate at the time of normal playback of the content data.

In the first aspect, the content data can be image data.

In the first aspect, the information processing apparatus can further comprise an imaging device for imaging a subject and generating image data as the content data and the creation device can create, as the capture rate, information regarding a data rate of the content data at the time when the imaging device generates the content data.

In the first aspect, the information processing apparatus can further comprise a content data record device for recording the content data onto a record medium and the creation device can create, as the REC rate, information regarding a data rate of the content data at the time when the content data record device records the content data onto the record medium.

In the first aspect, the information processing apparatus can further comprise an input reception device for receiving a control instruction regarding input, generation, record, or playback of the content data that a user inputs and the creation device can create the capture rate, the REC rate, and the format rate based on the control instruction received by the input reception device.

In the first aspect, the information processing apparatus can further comprise a rate information record device for recording the capture rate, the REC rate, and the format rate which are created by the creation device onto a record medium.

In the first aspect, the rate information record device can record a transition point of the capture rate, the REC rate, and the format rate onto the record medium.

In the first aspect, the rate information record device can relate information regarding a UMID of the content data to the capture rate, the REC rate, and the format rate and can further record the information regarding the UMID of the content data onto the record medium.

In the first aspect, the information processing apparatus can further comprise a rate information transmission device for transmitting the capture rate, the REC rate, and the format rate which are created by the creation device to a different information processing apparatus.

In the first aspect, the rate information transmission device can transmit a transition point of the capture rate, the REC rate, and the format rate to the different information processing apparatus.

In the first aspect, the rate information transmission device can relate information regarding a UMID of the content data to the capture rate, the REC rate, and the format rate and can further transmit the information regarding the UMID of the content data to the different information processing apparatus.

A second aspect of the present invention resides in a information processing method which comprises a creation step of creating a capture rate which is information regarding a data rate at the time of inputting or generating the content data, a REC rate which is information regarding a data rate at the time of recording the content data, and a format rate which is a data rate at the time of normal playback of the content data.

A third aspect of the present invention resides in a program which makes a computer perform a creation step of creating a capture rate which is information regarding a data rate at the time of inputting or generating the content data, a REC rate which is information regarding a data rate at the time of recording the content data, and a format rate which is a data rate at the time of normal playback of the content data.

A fourth aspect of the present invention resides in a information processing apparatus which comprises a determination device for determining a setting regarding at least one of playback processing and output processing of the content data based on a capture rate which is information regarding a data rate at the time of inputting or generating the content data, a REC rate which is information regarding a data rate at the time of recording the content data, and a format rate which is a data rate at the time of normal playback of the content data.

In the fourth aspect, the content data can be image data.

In the fourth aspect, the information processing apparatus can further comprise a playback device for playing back the content data at a data rate based on the format rate.

In the fourth aspect, the information processing apparatus can further comprise an output device for outputting the content data played back by the playback device.

In the fourth aspect, the information processing apparatus can further comprise a data conversion device for converting the content data played back by the playback device based on a determination result by the determination device and the output device can output the content data converted by the data conversion device.

In the fourth aspect, the information processing apparatus can further comprise an output information creation device for creating output information for outputting a determination result by the determination device or the capture rate, the REC rate, and the format rate and the output device can further output the output information created by the output information creation device.

In the fourth aspect, the information processing apparatus can further comprise an acquisition device for reading and acquiring the capture rate, the REC rate, and the format rate recorded on a record medium and the determination device can determine a setting regarding playback processing and output processing of the content data based on the capture rate, the REC rate, and the format rate which are read and acquired from the record medium by the acquisition device.

In the fourth aspect, the information processing apparatus can further comprise a receiving device for receiving the capture rate, the REC rate, and the format rate which are transmitted from a different information processing apparatus and the determination device can determine a setting regarding playback processing and output processing of the content data based on the capture rate, the REC rate, and the format rate which are received by the receiving device.

A fifth aspect of the present invention resides in a information processing method which comprises a determination step of determining a setting regarding at least one of playback processing and output processing of the content data based on a capture rate which is information regarding a data rate at the time of inputting or generating the content data, a REC rate which is information regarding a data rate at the time of recording the content data, and a format rate which is a data rate at the time of normal playback of the content data.

A sixth aspect of the present invention resides in a program which makes a computer perform a determination step of determining a setting regarding at least one of playback processing and output processing of the content data based on a capture rate which is information regarding a data rate at the time of inputting or generating the content data, a REC rate which is information regarding a data rate at the time of recording the content data, and a format rate which is a data rate at the time of normal playback of the content data.

According to the first to third aspects, the apparatus, the method, and the program create a capture rate which is information regarding a data rate at the time of inputting or generating content data, a REC rate which is information regarding a data rate at the time of recording the content data, and a format rate which is a data rate at the time of normal playback of the content data.

According to the fourth to sixth aspects, the apparatus, the method, and the program determine a setting regarding at least one of playback processing and output processing of the content data based on a capture rate which is information regarding a data rate at the time of inputting or generating the content data, a REC rate which is information regarding a data rate at the time of recording the content data, and a format rate which is a data rate at the time of normal playback of the content data.

The aspects of the present invention aims to process information, in particular, to allow settings at the time of imaging and recording to be obtained at the time of playing back and outputting data so that more effective playback processing and output processing can be performed.

Other and further objects, features and advantages of the invention will appear more fully from the following description.

BRIEF DESCRIPTION OF THE DRAWINGS

FIGS. 7A to 7C are diagrams showing further another group of examples of a relationship between a value of rate information and image data;

FIG. 11 is a diagram showing an example of a transition point table of rate information;

FIG. 17 is a diagram showing an example of a relationship between a value of rate information and an imaging record mode;

DETAILED DESCRIPTION OF THE PREFERRED EMBODIMENTS

Hereinafter, embodiments of the present invention will be described. Before describing these, a description will be made below to exemplify corresponding relationships between constituent features described in the claims and specific examples in the embodiments. This description is to verify that the specific examples which support the invention described in the claims are described in the embodiments of the invention. Therefore, even if there is a specific example that is described in the embodiments of the invention but not described in this description as a specific example corresponding to a constituent feature, it does not mean that the specific example does not correspond to the constituent feature. On the other hand, even if there is a specific example that is described in this description as a specific example corresponding to a constituent feature, it does not mean that the specific example does not correspond to other constituent features than the constituent feature.

Further, this description does not mean that the invention corresponding to the specific examples described in the embodiments is all described in the claims. In other words, this description does not deny existence of an invention that corresponds to the specific examples described in the embodiments and is not described in the claims in this application, that is, existence of an invention that is added by a divisional application or an amendment in the future.

Figure 1:
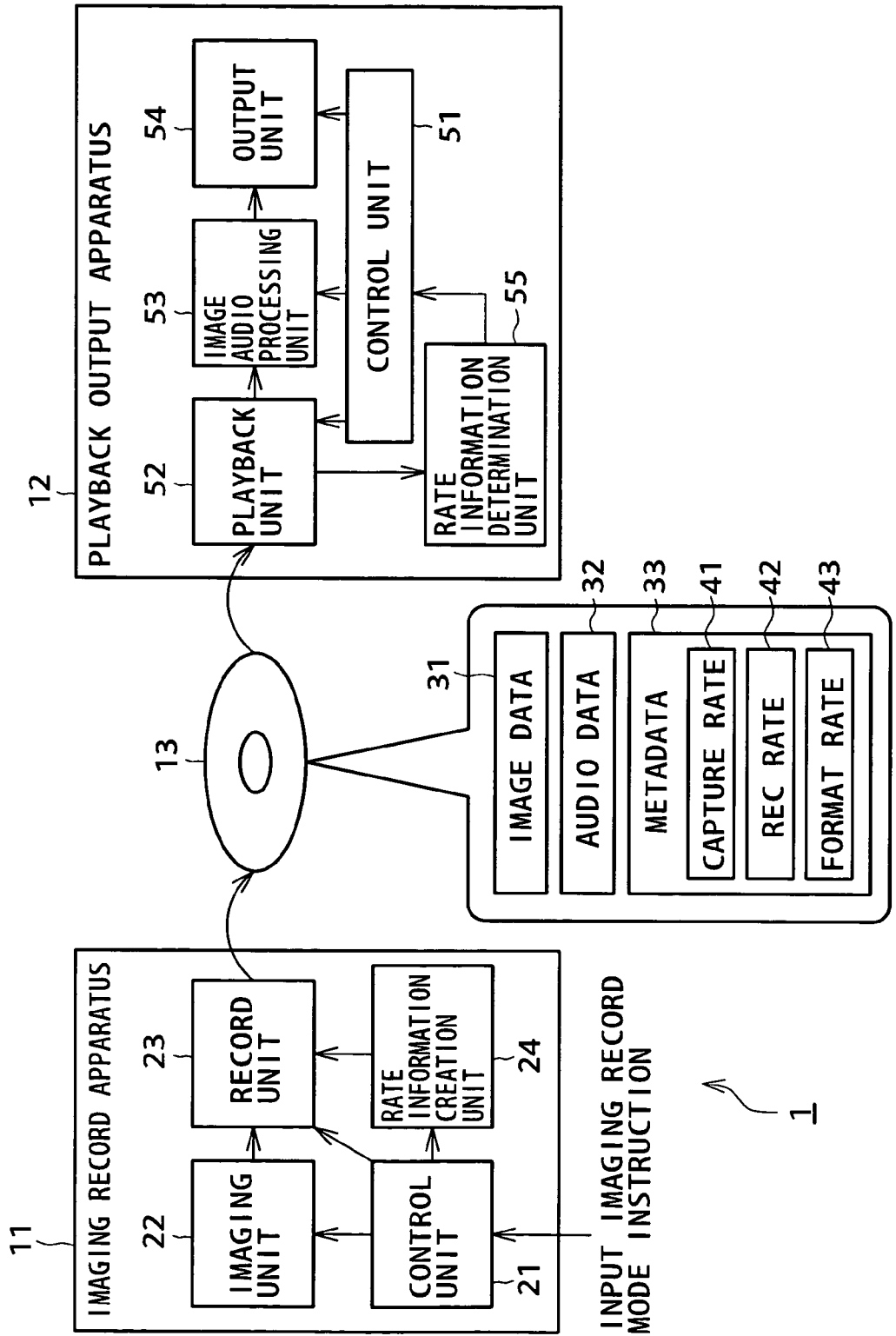
FIG. 1 is a block diagram showing a configuration example of a record playback system according to the present invention.

According to the present invention, there is provided an information processing apparatus (e.g., an imaging record apparatus 11 in FIG. 1) for processing information regarding content data (e.g., image data 31 and audio data 32 in FIG. 1). The information processing apparatus comprises a creation device (e.g., a rate information creation unit 24 in FIG. 1) for creating a capture rate (e.g., a capture rate 41 in FIG. 1) which is information regarding a data rate at the time of inputting or generating the content data, a REC rate (e.g., a REC rate 42 in FIG. 1) which is information regarding a data rate at the time of recording the content data, and a format rate (e.g., a format rate 43 in FIG. 1) which is a data rate at the time of normal playback of the content data.

The content data can be image data (e.g., image data 31 in FIG. 1).

Figure 13:
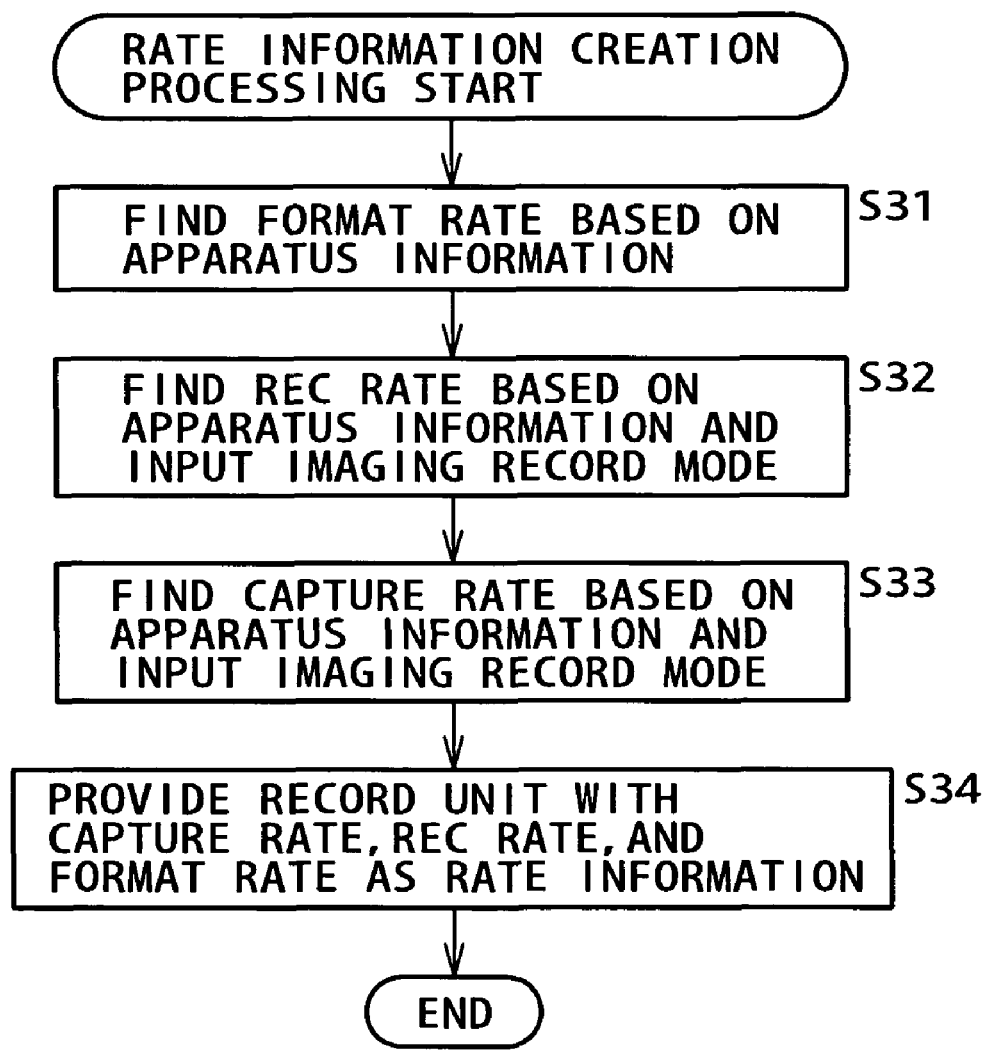
FIG. 13 is a flowchart explaining rate information creation processing.

The information processing apparatus can further comprise an imaging device (e.g., an imaging unit 22 in FIG. 1) for imaging a subject and generating image data as the content data and the creation device can create, as the capture rate, information regarding a data rate of the content data at the time when the imaging device generates the content data (e.g., step S33 in FIG. 13).

The information processing apparatus can further comprise a content data record device (e.g., a record unit 23 in FIG. 1) for recording the content data onto a record medium and the creation device can create, as the REC rate, information regarding a data rate of the content data at the time when the content data record device records the content data onto the record medium (e.g., step S32 in FIG. 13).

The information processing apparatus can further comprise an input reception device (e.g., an input unit 104 in FIG. 2) for receiving a control instruction (an input imaging record mode instruction in FIG. 1) regarding input, generation, record, or playback of the content data that a user inputs and the creation device can create the capture rate, the REC rate, and the format rate based on the control instruction received by the input reception device (e.g., steps S31 to S33 in FIG. 13).

The information processing apparatus can further comprise a rate information record device (e.g., a record unit 23 in FIG. 1) for recording the capture rate, the REC rate, and the format rate which are created by the creation device onto a record medium.

The rate information record device can record a transition point of the capture rate, the REC rate, and the format rate (e.g., a table 191 in FIG. 11) onto the record medium.

Figure 12:
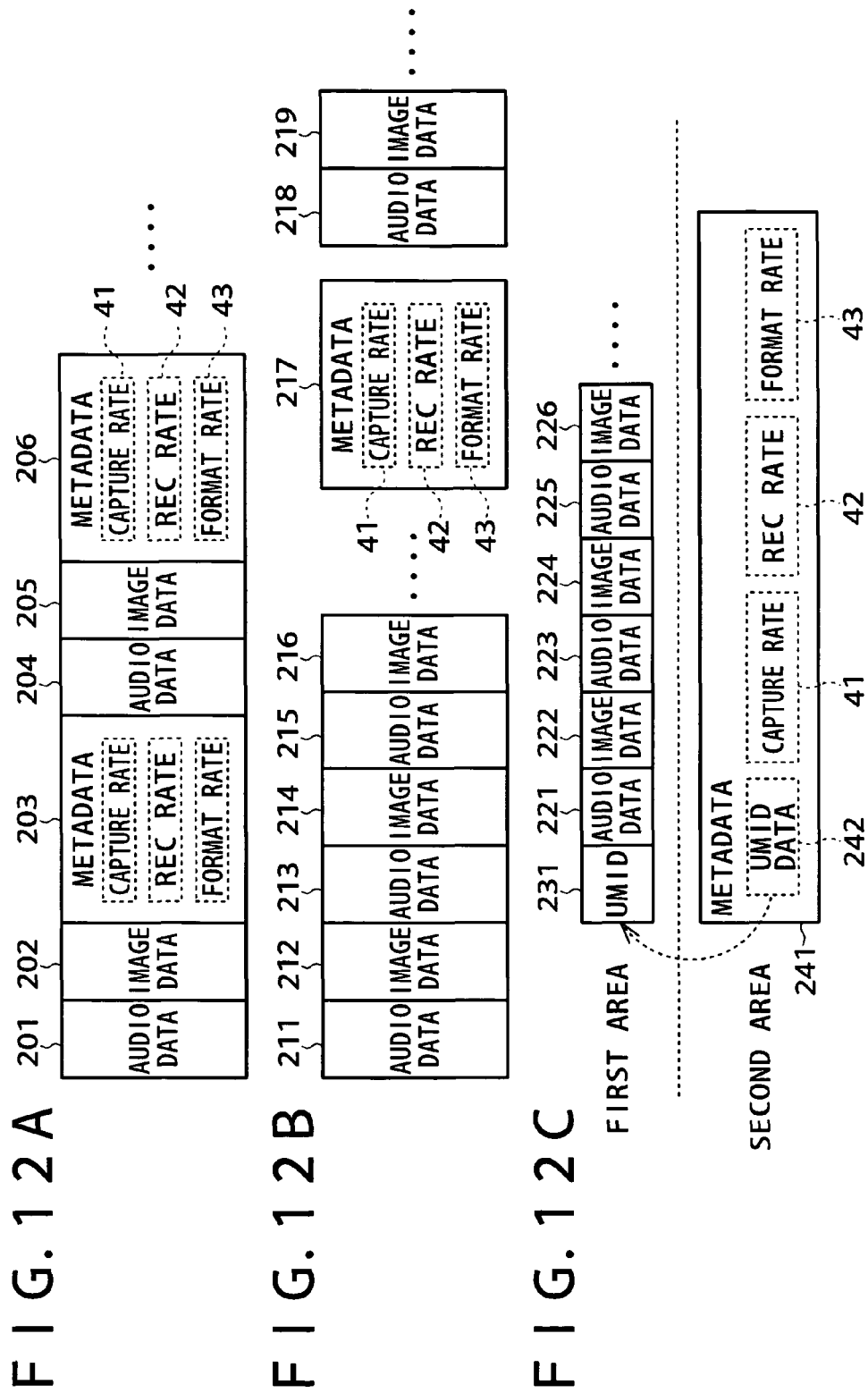
FIGS. 12A to 12C are diagrams showing examples of a record position of rate information.

The rate information record device can relate information (e.g., UMID information 242 in FIG. 12) regarding a UMID (e.g., a UMID 231 in FIG. 12) of the content data to the capture rate, the REC rate, and the format rate which are created by the creation device and can further record the information regarding the UMID of the content data onto the record medium.

The information processing apparatus can further comprise a rate information transmission device (e.g., a communication unit 323 in FIG. 20) for transmitting the capture rate, the REC rate, and the format rate which are created by the creation device to a different information processing apparatus.

The rate information transmission device can transmit a transition point of the capture rate, the REC rate, and the format rate (e.g., a table 191 in FIG. 11) to the different information processing apparatus.

The rate information transmission device can relate information (e.g., UMID information 242 in FIG. 12) regarding a UMID (e.g., a UMID 231 in FIG. 12) of the content data to the capture rate, the REC rate, and the format rate and can further transmit the information regarding the UMID of the content data to the different information processing apparatus.

According to the present invention, there is provided an information processing method of an information processing apparatus (e.g., an imaging record apparatus 11 in FIG. 1) for processing information regarding content data (e.g., image data 31 and audio data 32 in FIG. 1). The information processing method comprises a creation step (e.g., steps S31 to S33 in FIG. 13) of creating a capture rate (e.g., a capture rate 41 in FIG. 1) which is information regarding a data rate at the time of inputting or generating the content data, a REC rate (e.g., a REC rate 42 in FIG. 1) which is information regarding a data rate at the time of recording the content data, and a format rate (e.g., a format rate 43 in FIG. 1) which is a data rate at the time of normal playback of the content data.

According to the present invention, there is provided an information processing apparatus (e.g., a playback output apparatus 12 in FIG. 1) for processing information regarding content data (e.g., image data 31 and audio data 32 in FIG. 1). The information processing apparatus comprises a determination device (e.g., a rate information determination unit in FIG. 1) for determining a setting regarding at least one of playback processing and output processing of the content data based on a capture rate which is information regarding a data rate at the time of inputting or generating the content data, a REC rate which is information regarding a data rate at the time of recording the content data, and a format rate which is a data rate at the time of normal playback of the content data.

The content data can be image data (e.g., image data 31 in FIG. 1).

The information processing apparatus can further comprise a playback device (e.g., a playback processing unit 142 in FIG. 3) for playing back the content data at a data rate based on the format rate.

The information processing apparatus can further comprise an output device (e.g., an output unit 54 in FIG. 1) for outputting the content data played back by the playback device.

The information processing apparatus can further comprise a data conversion device (e.g., a data conversion unit 152 in FIG. 3) for converting the content data played back by the playback device based on a determination result by the determination device and the output device can output the content data converted by the data conversion device.

The information processing apparatus can further comprise an output information creation device (e.g., an output information creation unit 153 in FIG. 3) for creating output information for outputting a determination result by the determination device and the output device can further output the output information created by the output information creation device.

The information processing apparatus can further comprise an acquisition device (e.g., a pickup unit 141 in FIG. 3) for reading and acquiring the capture rate, the REC rate, and the format rate recorded on a record medium and the determination device can determine a setting regarding playback processing and output processing of the content data based on the capture rate, the REC rate, and the format rate which are read and acquired from the record medium by the acquisition device.

The information processing apparatus can further comprise a receiving device (e.g., a communication unit 352 in FIG. 20) for receiving the capture rate, the REC rate, and the format rate which are transmitted from a different information processing apparatus and the determination device can determine a setting regarding playback processing and output processing of the content data based on the capture rate, the REC rate, and the format rate which are received by the receiving device.

According to the present invention, there is provided an information processing method of an information processing apparatus (e.g., a playback output apparatus 12 in FIG. 1) for processing information regarding content data (e.g., image data 31 and audio data 32 in FIG. 1). The information processing method comprises a determination step (e.g., steps S101 to S103 in FIG. 16) of determining a setting regarding at least one of playback processing and output processing of the content data based on a capture rate which is information regarding a data rate at the time of inputting or generating the content data, a REC rate which is information regarding a data rate at the time of recording the content data, and a format rate which is a data rate at the time of normal playback of the content data.

Referring now to the drawings, embodiments of the present invention will hereinafter be described.

FIG. 1 shows a configuration example of a record playback system according to the present invention. The record playback system 1 comprises an imaging record apparatus 11 and a playback output apparatus 12.

The imaging record apparatus 11 images a subject and generates image data and audio data, and records it onto an optical disc 13 as content data. The imaging record apparatus 11 also creates rate information which is regarding data rates of the content data, and relates it with the content data to record it onto the optical disc 13. The playback output apparatus 12 reads out the rate information recorded on the optical disc 13, and plays back and outputs the content data based on the rate information.

Further, for example, in the case of image data, a rate (data rate) refers to the number of frames (fields) per second which constitutes the image data. Besides the number of frames or fields, it also refers to whether the image data consists of frame images or field images (i.e., an image of an interlaced system or a progressive system).

Hereunder is a description of the rate (data rate) of the content data (image data) in various cases such as input, imaging (generation), recording, receiving, playback, output, etc. In any case, the rate (data rate) indicates the rate of the content data itself, but does not indicate processing speed or the like. For example, in the case of image data, the data rate at the time of imaging (a capture rate) refers to the number of times of photoelectric conversion processing per second at an imager, but does not refer to speed or time of the photoelectric conversion processing. Further, this also applies to the data rate at the time of recording for example, and the data rate does not refer to the processing speed, the processing time, or the recording density.

The imaging record apparatus 11 is a video camera which images subjects and records image data of the obtained moving image and still image, audio data, etc. onto a record medium as content data in news gathering or the like. The imaging record apparatus 11 comprises a control unit 21 which controls each unit, an imaging unit 22 which images a subject, a record unit 23 which records the content data (image data and audio data) obtained at the imaging unit onto an optical disc 13, and a rate information creation unit 24 which creates rate information of the content data. A user of the imaging record apparatus 11 inputs a control instruction such as an imaging start instruction and an imaging end instruction to the control unit 21. Furthermore, the user inputs also an input imaging record mode instruction which is a setting instruction of a mode with regard to imaging processing and record processing, such as high-speed imaging, low-speed imaging, etc. The control unit 21 determines the mode with regard to imaging processing and record processing based on the input imaging record mode instruction or the like to control the imaging unit 22 and the record unit 23. Further, the control unit 21 provides the rate information creation unit 24 with information regarding an input imaging record mode. The imaging unit 22 images the subject based on the control of the control unit 21 and acquires audio information and acquires the content data comprising the image data and the audio data to provide it to the record unit 23. The rate information creation unit 24 creates rate information which is regarding rates of the content data at imaging processing, record processing, and the like based on the information provided from the control unit 21, and provides it to the record unit 23. The record unit 23 records the content data provided from the imaging unit 22 and the rate information provided from the rate information creation unit 24 onto the optical disc 13 as being controlled by the control unit 21.

The optical disc 13 is a record medium such as a recordable DVD (Digital Versatile Disc) like Blue-ray Disc (trademark), a CD (Compact Disc), etc. Image data 31, audio data 32, and metadata 33 which is related to the content data are recorded on the optical disc 13. The metadata 33 contains a capture rate 41 which is rate information at the time of capturing an image (photoelectric conversion), that is, generating the content data, a REC rate 42 which is rate information at the time of recording the content data, and a format rate 43 which is rate information at the time of playing back the content data, and the like. The capture rate, the REC rate, and the format rate will be described in detail later.

The playback output apparatus 12 is an apparatus which plays back and outputs the image data and the audio data recorded on the optical disc 13 at edit processing or the like. The playback output apparatus 12 comprises a control unit 51 which controls each unit, a playback unit 52 which reads out and plays back the information recorded on the optical disc 13, an image audio processing unit 53 which performs predetermined processing on the content data (the image data and the audio data) played back by the playback unit 52, an output unit 54 which outputs the content data processed in the image audio processing unit 53 through a monitor, a speaker, etc., and a rate information determination unit 55 which determines modes of playback processing and output processing based on the rate information provided from the playback unit 52 and provides the resulting information to the control unit 51. The playback unit 52 reads out the rate information (the capture rate, the REC rate, and the format rate) recorded on the optical disc 13 and provides the rate information to the rate information determination unit 55, as being controlled by the control unit 51. The rate information determination unit 55 determines processing modes of the playback unit 52, the image audio processing unit 53, and the output unit 54 based on the rate information, and provides the resulting information to the control unit 51. The control unit 51 controls the playback unit 52, the image audio processing unit 53, and the output unit 54 based on this information. The playback unit 52 reads out and plays back the content data recorded on the optical disc 13 and provides it to the image audio processing unit 53, as being controlled by the control unit 51. The image audio processing unit 53 performs predetermined signal processing on the content data and provides the resulting data to the output unit 54. The output unit 54 outputs the content data provided from the image audio processing unit 53 through the monitor, the speaker, and the like.

Figure 2:
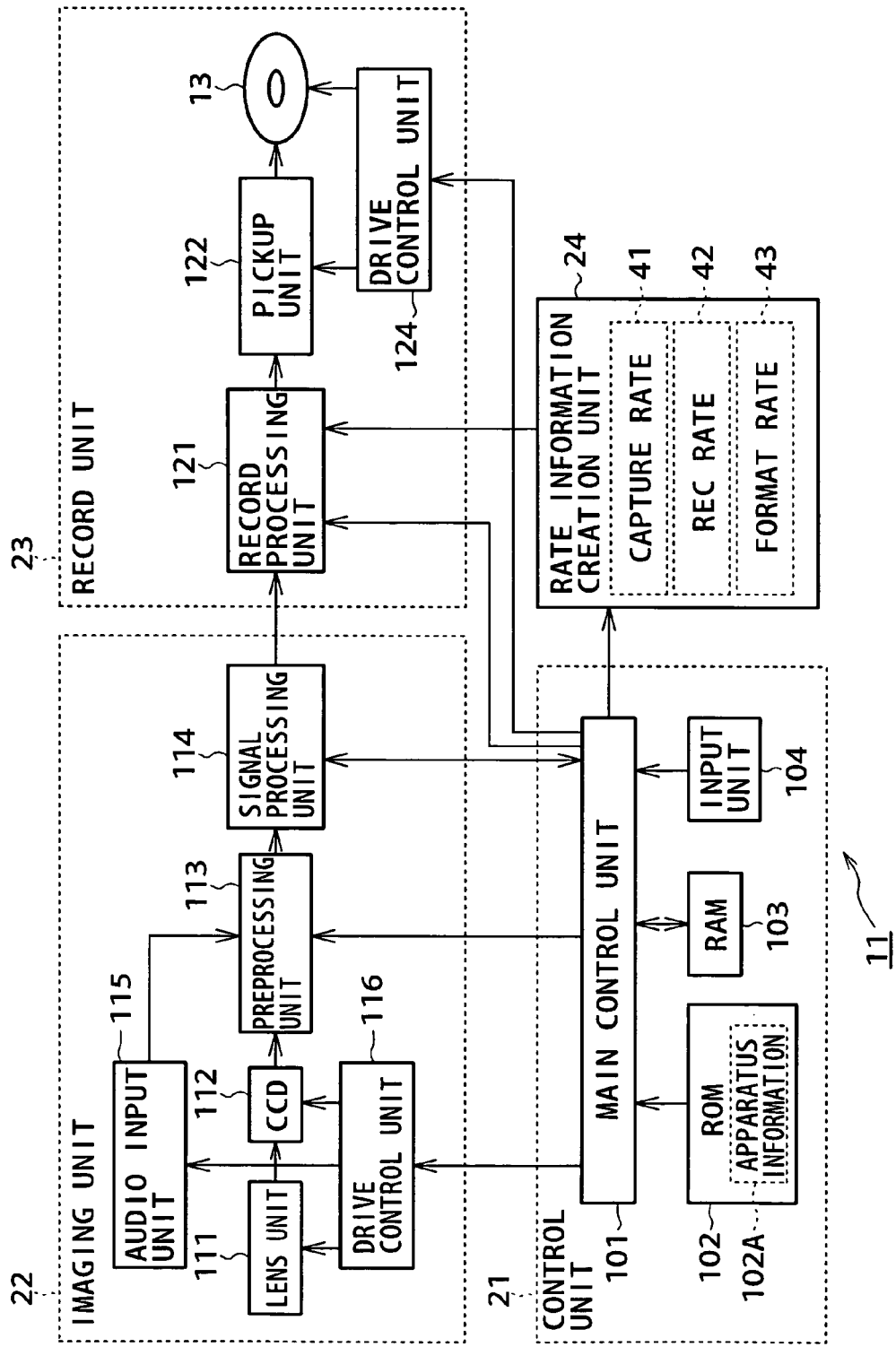
FIG. 2 is a block diagram showing a configuration example of an imaging record apparatus in FIG. 1.

FIG. 2 shows a block diagram of the imaging record apparatus 11 in FIG. 1.

In FIG. 2, a main control unit 101 in the control unit 21 in the imaging record apparatus 11 performs each processing in accordance with a program stored in a ROM (Read Only Memory) 102 or a program loaded into a RAM (Random Access Memory) 103. Apparatus information 102A regarding the imaging record apparatus 11 is stored in the ROM 102. The apparatus information 102A includes information regarding a broadcasting standard that the imaging record apparatus 11 performs record processing based on, and is read out by the main control unit 101 as necessary and provided to the rate information creation unit 24. Further, data that the main control unit 101 requires to perform each processing is stored in the RAM 103 as necessary. Furthermore, an input unit 104 comprises a variety of buttons, switches, etc., and receives input from a user to provide the received user input to the main control unit 101. The main control unit 101 controls each unit based on the user input.

The lens unit 111 comprises a plurality of lenses etc. and adjusts an aperture for incident light and a focus. The incident light into the lens unit 111 is provided to a CCD (Charge Coupled Device) 112. The CCD 112 converts the incident light provided through the lens unit 111 into an electric signal and provides it to a preprocessing unit 113. Further, an audio input unit 115 comprises a microphone etc. and collects sound of the subject and its surroundings and converts it into an electric signal and then provides it to the preprocessing unit 113. The preprocessing unit 113 comprises a CDS circuit, a GCA circuit, an A/D conversion circuit, etc. and eliminates reset noise included in an output signal provided from the CCD 112 and optimizes the gain. The preprocessing unit 113 also converts the output signal of the CCD 112 into a digital signal to provide it to a signal processing unit 114 as image data (moving image data or still image data). Furthermore, the preprocessing unit 113 performs analog-to-digital conversion on an audio signal provided from the audio input unit 115 to provide it to the signal processing unit 114 as audio data. The signal processing unit 114 performs image processing such as adjusting exposure and white balance on the image data provided from the preprocessing unit 113, and performs audio processing such as eliminating a noise on the audio data. Moreover, the signal processing unit 114 compresses the image data and the audio data with a predetermined form to provide it to a record unit 23 as compressed data for recording. Furthermore, a drive control unit 116 is controlled by the main control unit 101 in the control unit 21 and controls driving of the lens unit 111 to adjust the aperture and the focus, and controls electrical operation of the CCD 112, and adjusts capture timing (timing of the photoelectric conversion processing) of the image (stored electric charge)

and controls electrical operation of the audio input unit 115, and adjusts audio input timing, etc.

Furthermore, the rate information creation unit 24 calculates the capture rate 41, the REC rate 42, and the format rate 43 based on the input imaging record mode instruction from the user and the apparatus information 102A which are provided from the main control unit 101 in the control unit 21, and provides them to a record processing unit 121 in the record unit 23 as the rate information.

The record processing unit 121 in the record unit 23 performs encoding, which is required at the time of recording, on the image data and the audio data provided from the signal processing unit 114, the rate information provided from the rate information creation unit 24, etc. and provides them to a pickup unit 122 as recording data. The pickup unit 122 applies laser light for writing data to the optical disc 13 mounted on a drive (not shown) to record the recording data provided from the record processing unit 121 onto the optical disc 13. Furthermore, a drive control unit 124 is controlled by the main control unit 101 in the control unit 21 and controls rotation of a spindle motor in the drive (not shown) and driving of the pickup unit 122 and controls operation of recording data onto the optical disc 13.

Figure 3:
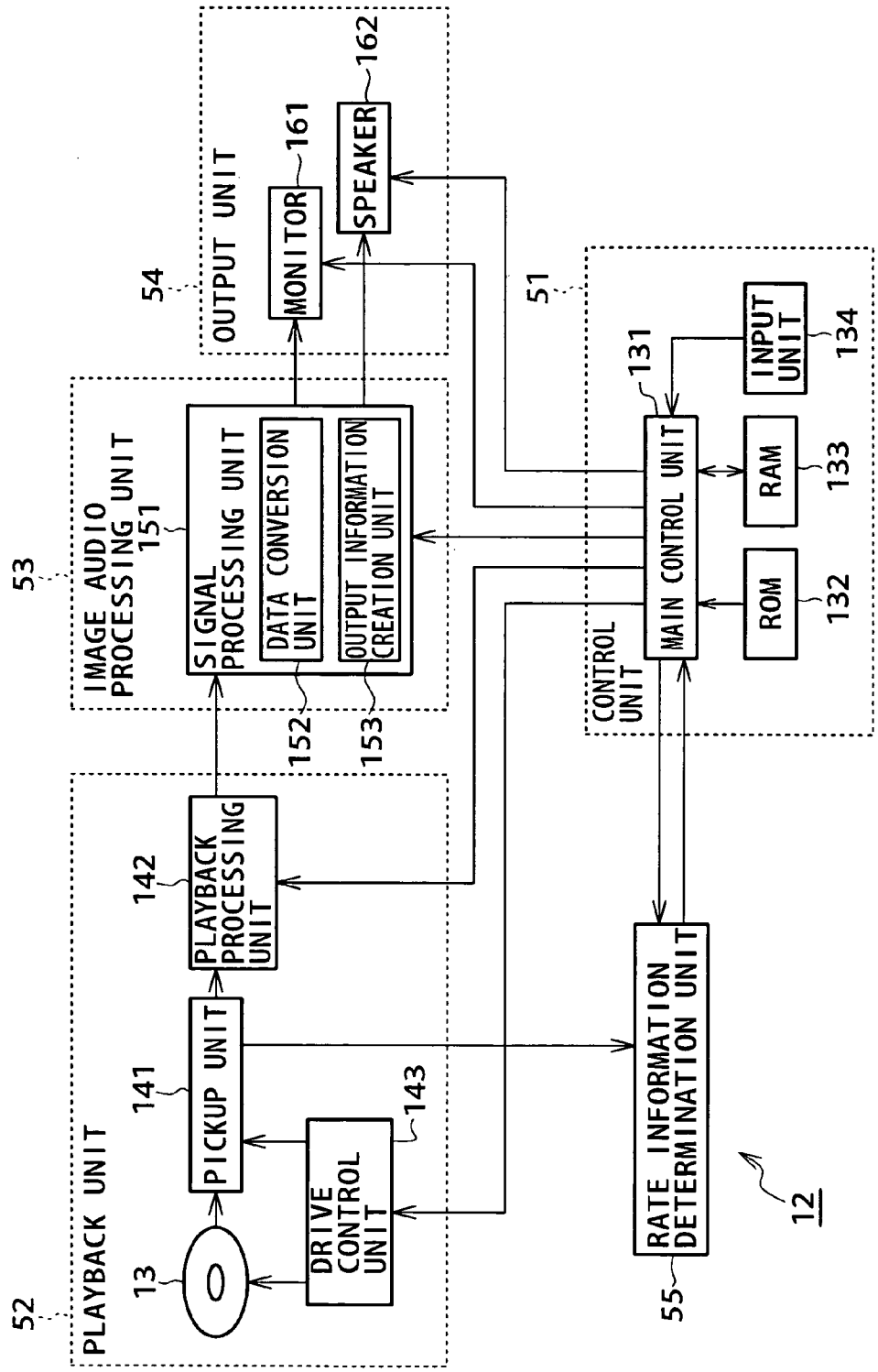
FIG. 3 is a block diagram showing a configuration example of a playback output apparatus in FIG. 1.

FIG. 3 shows a block diagram of the playback output apparatus 12 in FIG. 1.

In FIG. 3, a main control unit 131 in the control unit 51 in the playback output apparatus 12 performs each processing in accordance with a program stored in a ROM 132 or a program loaded into a RAM 133. Further, data that the main control unit 131 requires to perform each processing is stored in the RAM 133 as necessary. Furthermore, an input unit 134 comprises a variety of buttons, switches, etc., and receives input from a user to provide the received user input to the main control unit 131. The main control unit 131 controls each unit based on the user input. Further, the main control unit 131 controls each unit in the playback unit 52, the image audio processing unit 53, and the output unit 54 based on a determination result provided from a rate information determination unit 55, and provides a capture rate, a REC rate, a format rate, etc. provided from the rate information determination unit 55 to the image audio processing unit 53.

The pickup unit 141 in the playback unit 52 applies laser light for reading data to the optical disc 13 mounted on a drive (not shown) to read out the image data and the audio data recorded on the optical disc 13 and provides them to a playback processing unit 142. The pickup unit 141 also reads out the rate information corresponding to the image data and the audio data from the optical disc 13 and provides it to the rate information determination unit 55. The playback processing unit 142 is controlled by the main control unit 131 in the control unit 51 and decodes the image data and the audio data read from the pickup unit 141 to play back the data and provides the played-back data to the image audio processing unit 53. The drive control unit 143 is controlled by the main control unit 131 in the control unit 51 and controls rotation of a spindle motor in the drive (not shown) and driving of the pickup unit 141 so that the pickup unit 141 reads out desired data from the optical disc 13 mounted on the drive.

A signal processing unit 151 in the image audio processing unit 53 performs signal processing on the image data, the audio data, etc. provided from the playback processing unit 142 in the playback unit 52 and creates outputting data to provide it to the output unit 54. The signal processing unit 151 contains a data conversion unit 152 and an output information creation unit 153. The data conversion unit 152 is controlled by the main control unit 131 in the control unit 51 and performs data conversion processing such as scan conversion on the image data as necessary. The output information creation unit 153 is controlled by the main control unit 131 in the control unit 51 and creates image data for displaying the rate information (information regarding the capture rate, the REC rate, the format rate, etc.) and superimposes it on the image data provided from the playback processing unit 142 and provides the resulting data to the output unit 54.

The output unit 54 has a monitor 161 which outputs the image and a speaker 162 which outputs the audio, and outputs the outputting image data and audio data as being controlled by the main control unit 131 in the control unit 51.

The rate information determination unit 55 determines a mode of playback processing at the playback unit 52, a mode of data conversion processing at the data conversion unit 152, and the like based on the rate information (information regarding the capture rate, the REC rate, the format rate, etc.) provided from the pickup unit 141 in the playback unit 52, and provides the determination result and the information regarding the capture rate, the REC rate, the format rate, etc. to the main control unit 131.

Next, the rate information will be described.

The rate information comprises the capture rate, the REC rate, and the format rate.

The capture rate denotes frequency per second with which a CCD 112 of the imaging record apparatus 11 captures electric charge. That is, the CCD 112 is controlled by the drive control unit 116 and captures electric charge (photoelectric conversion processing) with frequency of a specified capture rate, and generates a frame image or a field image. Therefore, the number of frames per second (hereinafter referred to as "frame rate") or the number of fields per second (hereinafter referred to as "field rate") regarding the image data outputted from the CCD 112 is the value that is specified as the capture rate.

The REC rate denotes a frame rate (or field rate) of the image data that the record processing unit 121 in the imaging record apparatus 11 outputs. That is, the record processing unit 121 is controlled by the main control unit 101 and, as necessary, converts the frame rate (or field rate) of the provided image data into a rate specified as the REC rate, and records it onto the optical disc 13 through the pickup unit 122. Therefore, the frame rate (or field rate) of the image data recorded on the optical disc 13 is the value that is specified as the REC rate.

The format rate denotes a frame rate (or field rate) of the image data that the playback processing unit 142 in the playback output apparatus 12 plays back normally. That is, the playback processing unit 142 is controlled by the main control unit 131 and, as necessary, converts the frame rate (or field rate) of the image data provided from the pickup unit 141 into a rate specified as the format rate, and provides it to the image audio processing unit 53. Therefore, in the case of normal playback, the frame rate (or field rate) of the image data outputted from the playback processing unit 142 is the value that is specified as the format rate. Further, in the case where the playback output apparatus 12 plays back the image data with fast-forward playback or rewind playback, the image data may be played back at a different rate from the format rate. That is, the format rate refers to the rate in the case of normal playback which serves as a basis for unusual playback such as fast-forward playback or rewind playback.

These rates are determined at the imaging record apparatus 11 based on the apparatus information 102A, the input imaging record mode inputted by the user, etc. during imaging. That is, in the record playback system 1 in FIG. 1, the capture rate, the REC rate, and the format rate are variable, and the imaging record apparatus 11 or the playback output apparatus 12 can image, record, and play back the data with various modes based on the rate information.

Figure 4:
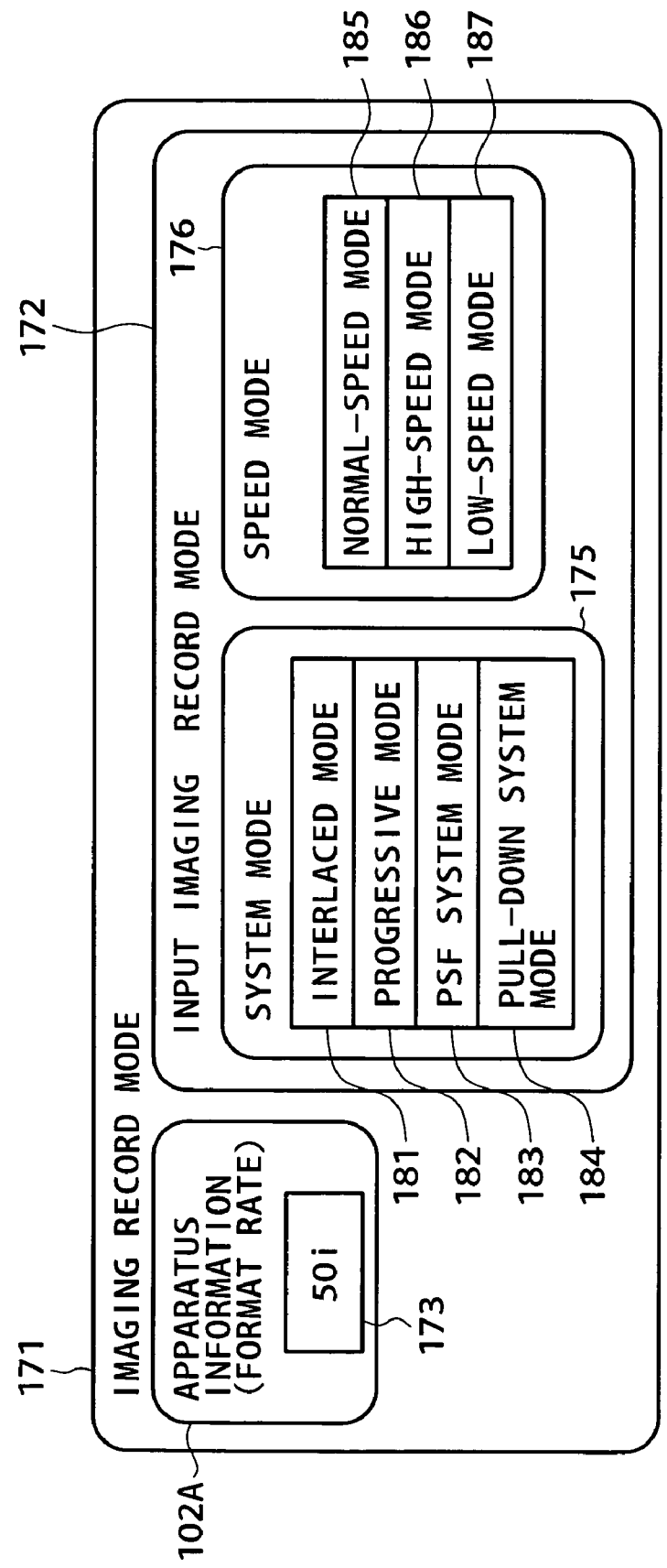
FIG. 4 is a schematic diagram showing a configuration example of an imaging record mode.

Next, modes of imaging and recording will be described. FIG. 4 shows an example of an imaging record mode.

An imaging record mode 171 is determined based on the apparatus information 102A stored in the ROM 102 in the imaging record apparatus 11 and an input imaging record mode 172 inputted from the input unit 104 in the imaging record apparatus 11.

The apparatus information 102A includes information regarding the format rate such as a format rate 173 shown in FIG. 4. The imaging record apparatus 11 specifies a rate that the playback output apparatus 12 plays back the imaged and recorded image data on the basis of. In the record playback system 1, compatibility of the frame rate (or field rate) of the image data is ensured between the imaging record apparatus 11 and the playback output apparatus 12 by the format rate. For example, in the case where the imaging record apparatus 11 generates and records the image data with the PAL (Phase Alternation by Line) system, the playback output apparatus 12 plays back the image data with a interlaced system of which field rate is 50 fields. Further, for example, in the case where the imaging record apparatus 11 generates and records the image data with the NTSC (National Television System Committee) system, the playback output apparatus 12 plays back the image data with a interlaced system of which field rate is 60 fields. In actuality, the vertical synchronization frequency of the NTSC system is 59.94 Hz, but it is put into 60 Hz for simplicity of the description.

Hereafter, a rate in the case where the image data is based on the interlaced system is referred to as "field rate i". For example, in the case of the PAL system, since the rate is 50 fields per second, it is referred to as "50i", and in the case of the NTSC system, since the rate is 60 fields per second, it is referred to as "60i".

On the other hand, a rate in the case where the image data is based on a progressive system is referred to as "frame rate p". For example, image data according to the progressive system of which rate is 25 frames per second is referred to as "25p". That is, the rate indicates a rate of the frame, in this case. Therefore, a rate of the progressive system corresponding to "50i" of the interlaced system is "25p".

The imaging record apparatus 11 usually corresponds to one of broadcasting standards such as PAL, NTSL, and the like, and records the image data obtained by imaging, based on the standard. Therefore, since the format rate is determined by the imaging record apparatus 11 which is used for imaging, it is included in the apparatus information 102A in the imaging record apparatus 11. In the case of FIG., 4, the rate "50i" of the PAL system is set up as the format rate 173.

Further, the imaging record apparatus 11 may be configured such that the apparatus can change the corresponding standard after factory shipment. In this case, the ROM 102 is replaced with a rewritable EEPROM (Electronically Erasable and Programmable Read Only Memory), a flash memory, or the like so that the apparatus information 102A can be stored in it. Furthermore, the user may determine the format rate through the input unit 104 at the time of imaging the subject using the imaging record apparatus 11.

As shown in FIG. 4, there are two modes for setting which are a system mode 175 and a speed mode 176 in the input imaging record mode 172 which the user inputs.

The system mode 175 includes an interlaced mode 181 for generating and recording image data of the interlaced system, a progressive mode 182 for generating and recording image data of the progressive system, a PSF (Progressive Segmented Frame) system mode 183 for generating image data of the progressive system and converting the image data from the progressive system to the interlaced system corresponding to the rate of the progressive system and recording it, and a pull-down system mode 184 for generating image data of the progressive system and changing the rate and converting the image data from the progressive system to the interlaced system and recording it.

In the case of the interlaced mode 181, the imaging unit 22 in the imaging record apparatus 11 generates image data consisting of field images by the interlaced system, and the record unit 23 records the image data consisting of the field images onto the optical disc 13. In the case of the progressive mode 182, the imaging unit 22 in the imaging record apparatus 11 generates image data consisting of frame images by the progressive system, and the record unit 23 records the image data consisting of the frame images onto the optical disc 13.

In the case of the PSF system mode 183, the imaging unit 22 in the imaging record apparatus 11 generates image data consisting of frame images by the progressive system and divides each frame image into two fields of images (an odd field and an even field), and the record unit 23 records the image data consisting of the field images onto the optical disc 13. A relationship between each frame and each field will be described later. However, by converting the image data from the progressive system to the interlaced system in this way, different effect can be obtained at the time of the playback, compared to the image data obtained by the interlaced mode 181.

In the case of the pull-down system mode 184, the imaging unit 22 in the imaging record apparatus 11 generates image data consisting of frame images by the progressive system and converts the frame images into field images at a predetermined ratio (other than a ratio 1:2), and the record unit 23 records onto the optical disc 13 the image data consisting of the field images of which rate is changed. A relationship between each frame and each field will be described later. However, by converting the image data from the progressive system to the interlaced system with the rate changed in this way, different effect can be obtained at the time of the playback, compared to the image data obtained by the interlaced mode 181 or the PSF system mode 183.

The system mode 175 is determined by the relationship between the mode that the user inputs as the input imaging record mode 172 and the format rate. However, in the case where the format rate is set by the apparatus information 102A, since the user of the imaging record apparatus 11 can only set operation of the CCD 112, actually, there may be a system mode which the user cannot set up depending on the format rate. For example, as shown in FIG. 4, in the case where the format rate is set to "50i" by the apparatus information 102A, the user cannot select the progressive mode 182 by which the image data of the progressive system is recorded onto the optical disc 13. That is, the REC rate and the format rate have a common setting regarding the interlaced system or the progressive system.

Further, the speed mode 176 includes a normal-speed mode 185 for generating and recording image data at a rate corresponding to the format rate, a high-speed mode 186 for generating and recording image data at a rate higher than the rate corresponding to the format rate, and a low-speed mode 187 for generating and recording image data at a rate lower than the rate corresponding to the format rate.

In the case of the normal-speed mode 185, the CCD 112 in the imaging record apparatus 11 generates image data at the same rate as at the time of normal playback, that is, at the rate specified as the format rate.

In the case of the high-speed mode 186, the CCD 112 in the imaging record apparatus 11 increases frequency of capturing electric charge (frequency of the photoelectric conversion processing) compared to the case of the normal-speed mode 185 to generate image data of a higher rate than at the time of the normal playback. That is, in the case of the high-speed mode 186, the imaging record apparatus 11 generates and records image data having more frames per second than in the case of the normal-speed mode 185. Therefore, when the playback output apparatus 12 plays back the image data obtained at the high-speed mode 186 normally at the rate specified as the format rate, the outputted image is played back in slow motion which is slower than normal.

In the case of the low-speed mode 187, the CCD 112 in the imaging record apparatus 11 decreases frequency of capturing electric charge (frequency of the photoelectric conversion processing) compared to the case of the normal-speed mode 185 to generate image data of a lower rate than at the time of the normal playback. That is, in the case of the low-speed mode 187, the imaging record apparatus 11 generates and records image data having less frames per second than in the case of the normal-speed mode 185. Therefore, when the playback output apparatus 12 plays back the image data obtained at the low-speed mode 187 normally at the rate specified as the format rate, the outputted image is played back in fast forward which is faster than normal.

The speed mode 176 does not set a shutter speed or a data capture speed at the CCD 112 and sets a frame rate (or field rate) of image data to be generated and a frame rate (or field rate) of image data to be recorded onto the optical disc 13.

The user of the imaging record apparatus 11 selects a desired mode from the speed mode 176 and inputs it as the input imaging record mode 172.

Further, the frame rate (or field rate) of the image data obtained in the case where the user of the imaging record apparatus 11 specifies the high-speed mode 186 or the low-speed mode 187 may be a predetermined value or a value that the user specifies as the input imaging record mode instruction. Furthermore, in the case where the user specifies it, the user may specify the frame rate (or field rate) directly or by the ratio of it to the rate in the case of the normal-speed mode 185. That is, the user of the imaging record apparatus 11 may specify the speed mode 176 as the input imaging record mode instruction, in the form of a mode name such as "high-speed mode" or "low-speed mode", or in the form of a rate such as "100i" or "25i", or in the form of the ratio of it to the normal-speed mode 185 such as "double" or "one-half".

Next, a description will be made of a specific relationship between the capture rate, the REC rate, and the format rate, and the imaging record mode 171.

FIGS. 5 to 8 is diagrams explaining examples of the capture rate, the REC rate, and the format rate in each mode.

Figure 5A:
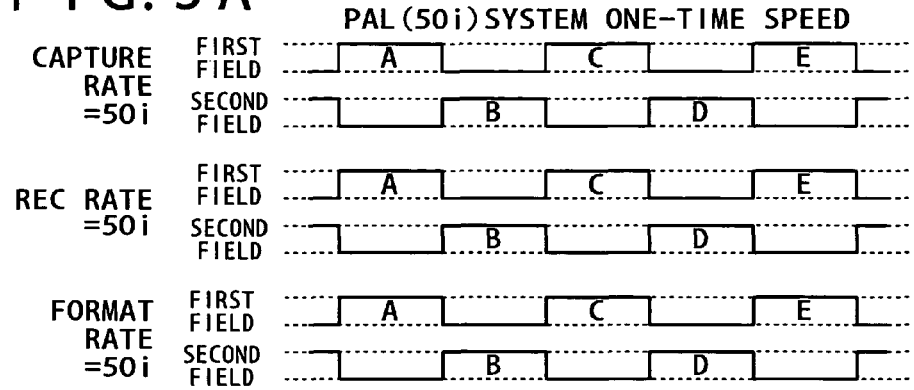
FIGS. 5A to 5C are diagrams showing examples of a relationship between a value of rate information and image data.
Figure 5B:
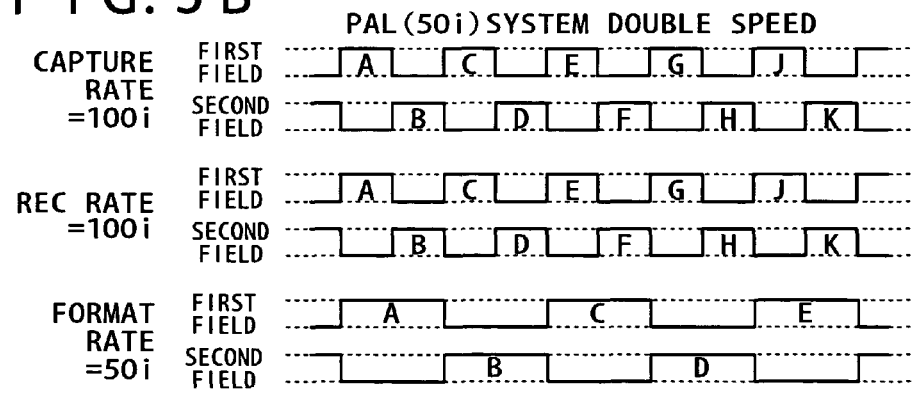
Figure 5C:
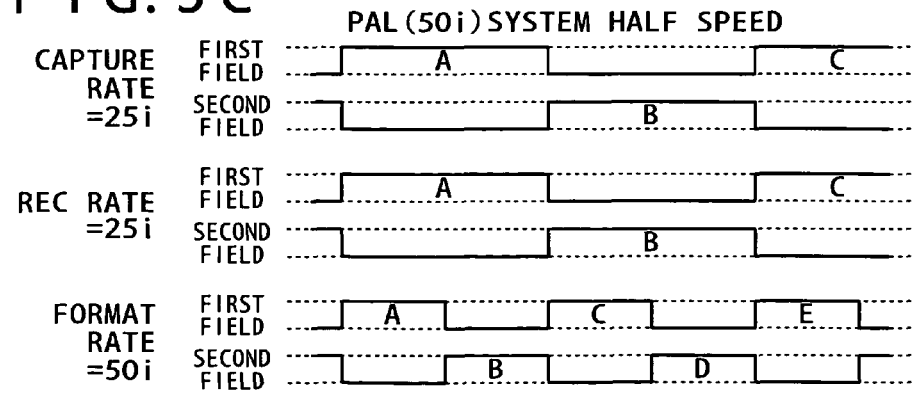

FIG. 5 shows examples in the case where the format rate is "50i" (PAL system). FIG. 5A shows an example in the case of the normal-speed mode (one-time speed). FIG. 5B shows an example in the case of the high-speed mode (double speed). FIG. 5C shows an example in the case of the low-speed mode (half speed). That is, FIG. 5A shows the example of a relationship between each value of the capture rate, the REC rate, and the format rate, and field images at the time of generation, recording, and playback, in the case where the imaging record apparatus 11 operates with the PAL system and the user selects the interlaced mode 181 as the system mode 175 and the normal-speed mode 185 as the speed mode 176. FIG. 5B shows the example of a relationship between each value of the capture rate, the REC rate, and the format rate, and field images at the time of generation, recording, and playback, in the case where the imaging record apparatus 11 operates with the PAL system and the user selects the interlaced mode 181 as the system mode 175 and the high-speed mode 186 as the speed mode 176. FIG. 5C shows the example of a relationship between each value of the capture rate, the REC rate, and the format rate, and field images at the time of generation, recording, and playback, in the case where the imaging record apparatus 11 operates with the PAL system and the user selects the interlaced mode 181 as the system mode 175 and the low-speed mode 187 as the speed mode 176.

In the case of FIG. 5A, the capture rate, the REC rate, and the format rate are set to common "50i". That is, in this case, the CCD 112 in the imaging record apparatus 11 generates the first field images (A, C, and E) and the second field images (B and D) alternately with frequency of 50 fields per second. The record processing unit 121 records each field image at the same field rate, and the playback processing unit 142 in the playback output apparatus 12 plays back each field image at the same field rate.

Thus, the playback output apparatus 12 outputs each field image of the image data generated by the imaging record apparatus 11 over the same time by the normal playback.

In the case of FIG. 5B, the capture rate and the REC rate are set to "100i" which is double the format rate "50i". That is, in this case, the CCD 112 in the imaging record apparatus 11 shortens a time interval for capturing electric charge to the half compared to that of FIG. 5A, and increases the number of times of the photoelectric conversion processing per second to the double, and generates the first field images (A, C, E, G and J) and the second field images (B, D, F, H, and K) alternately with frequency of 100 fields per second. The record processing unit 121 records each field image at the field rate (100 fields per second). However, since the format rate is the same as in FIG. 5A, the playback processing unit 142 in the playback output apparatus 12 plays back each field image at the same field rate (50 fields per second) as in FIG. 5A.

Thus, the playback output apparatus 12 outputs each field image of the image data generated by the imaging record apparatus 11 over double the time by the normal playback. That is, in this case, the images by the normal playback at the playback output apparatus 12 is played back in slow motion. This kind of imaging way is used at the time of imaging a fast-moving subject such as sport imaging, movement of water droplets, etc.

In the case of FIG. 5C, the capture rate and the REC rate are set to "25i" which is half the format rate "50i". That is, in this case, the CCD 112 in the imaging record apparatus 11 extends a time interval for capturing electric charge to the double compared to that of FIG. 5A, and decreases the number of times of the photoelectric conversion processing per second to the half, and generates the first field images (A and C) and the second field image (B) alternately with frequency of 25 fields per second. The record processing unit 121 records each field image at the field rate (25 fields per second). However, since the format rate is the same as in FIG. 5A, the playback processing unit 142 in the playback output apparatus 12 plays back each field image at the same field rate (50 fields per second) as in FIG. 5A.

Thus, the playback output apparatus 12 outputs each field image of the image data generated by the imaging record apparatus 11 over half the time by the normal playback. That is, in this case, the images by the normal playback at the playback output apparatus 12 is played back in fast forward. This kind of imaging way is used at the time of imaging change of a subject over long time such as stationary observation and the like.

Figure 6A:
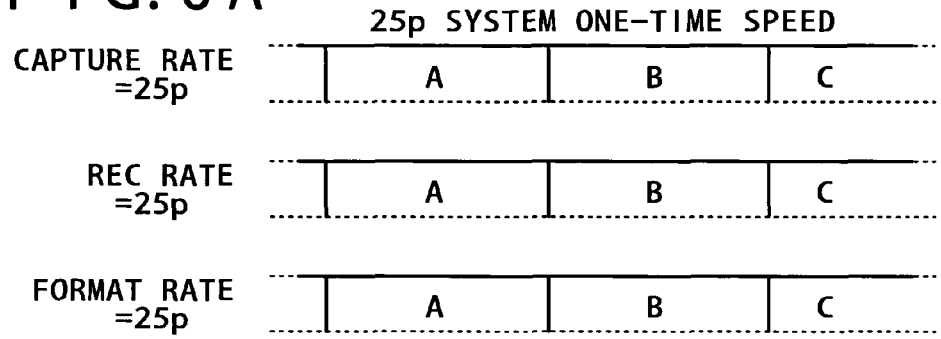
FIGS. 6A to 6C are diagrams showing another group of examples of a relationship between a value of rate information and image data.
Figure 6B:
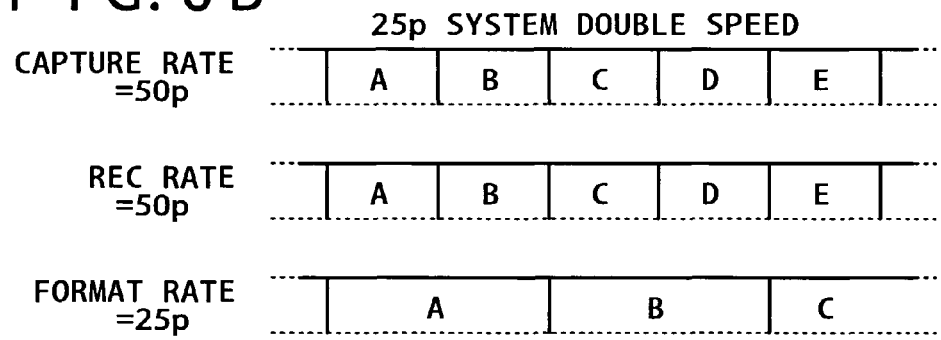
Figure 6C:
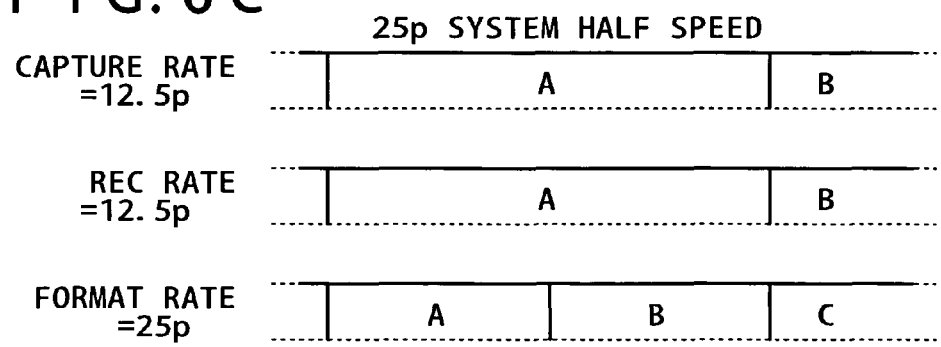

FIG. 6 shows examples in the case where the format rate is "25p". FIG. 6A shows an example in the case of the normal-speed mode (one-time speed). FIG. 6B shows an example in the case of the high-speed mode (double speed). FIG. 6C shows an example in the case of the low-speed mode (half speed). That is, FIG. 6A shows the example of a relationship between each value of the capture rate, the REC rate, and the format rate, and field images at the time of generation, recording, and playback, in the case where the imaging record apparatus 11 can generate and record a progressive image (the format rate is set to "25p") and the user selects the progressive mode 182 as the system mode 175 and the normal-speed mode 185 as the speed mode 176. FIG. 6B shows the example of a relationship between each value of the capture rate, the REC rate, and the format rate, and field images at the time of generation, recording, and playback, in the case where the imaging record apparatus 11 can generate and record a progressive image (the format rate is set to "25p") and the user selects the progressive mode 182 as the system mode 175 and the high-speed mode 186 as the speed mode 176. FIG. 6C shows the example of a relationship between each value of the capture rate, the REC rate, and the format rate, and field images at the time of generation, recording, and playback, in the case where the imaging record apparatus 11 can generate and record a progressive image (the format rate is set to "25p") and the user selects the progressive mode 182 as the system mode 175 and the low-speed mode 187 as the speed mode 176.

In the case of FIG. 6A, the capture rate, the REC rate, and the format rate are set to common "25p". That is, in this case, the CCD 112 in the imaging record apparatus 11 generates frame images (A, B, and C) with frequency of 25 frames per second. The record processing unit 121 records each frame image at the same frame rate, and the playback processing unit 142 in the playback output apparatus 12 plays back each frame image at the same frame rate.

Thus, the playback output apparatus 12 outputs each frame image of the image data generated by the imaging record apparatus 11 over the same time by the normal playback.

In the case of FIG. 6B, the capture rate and the REC rate are set to "50p" which is double the format rate "25p". That is, in this case, the CCD 112 in the imaging record apparatus 11 shortens a time interval for capturing electric charge to the half compared to that of FIG. 6A, and increases the number of times of the photoelectric conversion processing per second to the double, and generates frame images (A to E) with frequency of 50 frames per second. The record processing unit 121 records each frame image at the frame rate (50 frames per second). However, since the format rate is the same as in FIG. 6A, the playback processing unit 142 in the playback output apparatus 12 plays back each frame image at the same frame rate (25 frames per second) as in FIG. 6A.

Thus, the playback output apparatus 12 outputs each frame image of the image data generated by the imaging record apparatus 11 over double the time by the normal playback.

In the case of FIG. 6C, the capture rate and the REC rate are set to "12.5p" which is half the format rate "25p". That is, in this case, the CCD 112 in the imaging record apparatus 11 extends a time interval for capturing electric charge to the double compared to that of FIG. 6A, and decreases the number of times of the photoelectric conversion processing per second to the half, and generates frame images (A and B) with frequency of 12.5 frames per second. The record processing unit 121 records each frame image at the frame rate (12.5 frames per second) However, since the format rate is the same as in FIG. 6A, the playback processing unit 142 in the playback output apparatus 12 plays back each frame image at the same frame rate (25 frames per second) as in FIG. 6A.

Thus, the playback output apparatus 12 outputs each frame image of the image data generated by the imaging record apparatus 11 over half the time by the normal playback.

FIG. 7 shows examples in the case where the format rate is "50i" and the image data is recorded with the PSF system. FIG. 7A shows an example in the case of the normal-speed mode (one-time speed). FIG. 7B shows an example in the case of the high-speed mode (double speed). FIG. 7C shows an example in the case of the low-speed mode (half speed). That is, FIG. 7A shows the example of a relationship between each value of the capture rate, the REC rate, and the format rate, and field images at the time of generation, recording, and playback, in the case where the imaging record apparatus 11 can record PAL-system image data (the format rate is set to "50i") and the user selects the PSF system mode 183 as the system mode 175 and the normal-speed mode 185 as the speed mode 176. FIG. 7B shows the example of a relationship between each value of the capture rate, the REC rate, and the format rate, and field images at the time of generation, recording, and playback, in the case where the imaging record apparatus 11 can record PAL-system image data (the format rate is set to "50i") and the user selects the PSF system mode 183 as the system mode 175 and the high-speed mode 186 as the speed mode 176. FIG. 7C shows the example of a relationship between each value of the capture rate, the REC rate, and the format rate, and field images at the time of generation, recording, and playback, in the case where the imaging record apparatus 11 can record PAL-system image data (the format rate is set to "50i") and the user selects the PSF system mode 183 as the system mode 175 and the low-speed mode 187 as the speed mode 176.

In the case of FIG. 7A, the capture rate is set to "25p", and the REC rate and the format rate are set to "50i" of the PAL system. That is, in this case, the CCD 112 in the imaging record apparatus 11 generates frame images (A, B, and C) with frequency of 25 frames per second. The signal processing unit 114 generates the first field images (odd fields) (A1, B1, and C1) and the second field images (even fields) (A2, B2, and C2) from each frame image. The record processing unit 121 records each field image in sequence at the field rate (50 fields per second) corresponding to the frame rate (25 frames per second) which is set as the capture rate (i.e., one frame makes two fields). The playback processing unit 142 in the playback output apparatus 12 plays back each field image at the same field rate (50 fields per second).

In this case, as shown in FIG. 7A, one frame image generates two field images. For example, the frame image A generates the first field image A1 and the second field image A2. That is, in this case, the timing when the image is generated (the timing when electric charge is captured at the CCD 112) is the same between the first field image and the second field image which correspond with each other. Therefore, unlike in FIG. 5A, the image data in this case, after the playback, can be converted into the progressive system again (field images are combined into a frame image).

In the case of FIG. 7B, the REC rate is set to "100i" which is double the format rate "50i", and the capture rate is set to "50p" corresponding to the REC rate. That is, in this case, the CCD 112 in the imaging record apparatus 11 shortens a time interval for capturing electric charge to the half compared to that of FIG. 7A, and increases the number of times of the photoelectric conversion processing per second to the double, and generates frame images (A to E) with frequency of 50 frames per second. The signal processing unit 114 generates the first field images (odd fields) (A1, B1, C1, D1, and E1) and the second field images (even fields) (A2, B2, C2, D2, and E2) from each frame image. The record processing unit 121 records each field image in sequence at the field rate (100 fields per second) corresponding to the frame rate (50 frames per second) which is set as the capture rate. The playback processing unit 142 in the playback output apparatus 12 plays back each field image at the same field rate (50 fields per second) as in FIG. 7A.

Thus, the playback output apparatus 12 outputs each field image of the image data recorded by the imaging record apparatus 11 over double the time by the normal playback.

In the case of FIG. 7C, the REC rate is set to "25i" which is half the format rate "50i", and the capture rate is set to "12.5p" corresponding to the REC rate. That is, in this case, the CCD 112 in the imaging record apparatus 11 extends a time interval for capturing electric charge to the double compared to that of FIG. 7A, and decreases the number of times of the photoelectric conversion processing per second to the half, and generates frame images (A and B) with frequency of 12.5 frames per second. The signal processing unit 114 generates the first field images (odd fields) (A1 and B1) and the second field images (even fields) (A2 and B2) from each frame image. The record processing unit 121 records each field image in sequence at the field rate (25 fields per second) corresponding to the frame rate (12.5 frames per second) which is set as the capture rate. The playback processing unit 142 in the playback output apparatus 12 plays back each field image at the same field rate (50 fields per second) as in FIG. 7A.

Thus, the playback output apparatus 12 outputs each field image of the image data recorded by the imaging record apparatus 11 over half the time by the normal playback.

Figure 8A:
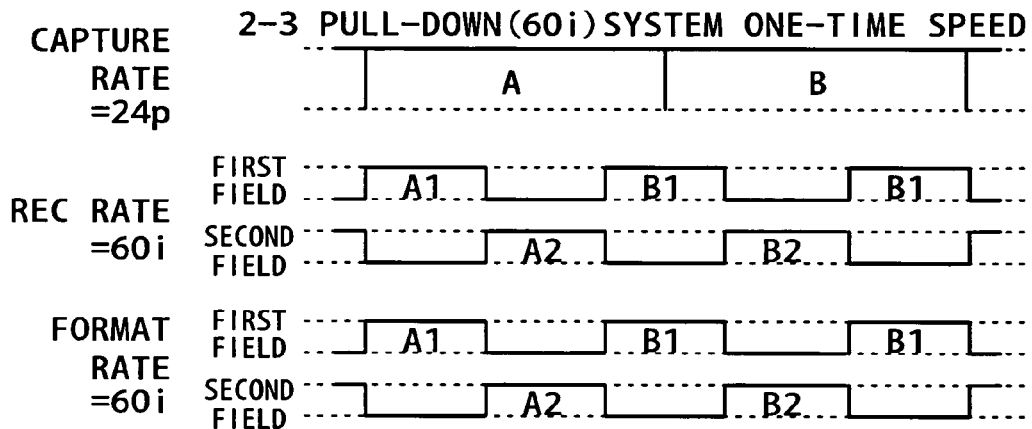
FIGS. 8A to 8C are diagrams showing further another group of examples of a relationship between a value of rate information and image data.
Figure 8B:
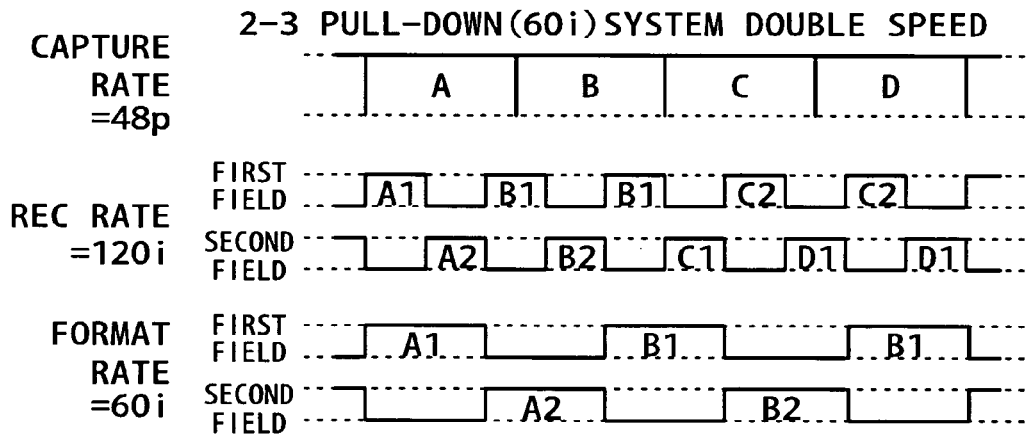
Figure 8C:
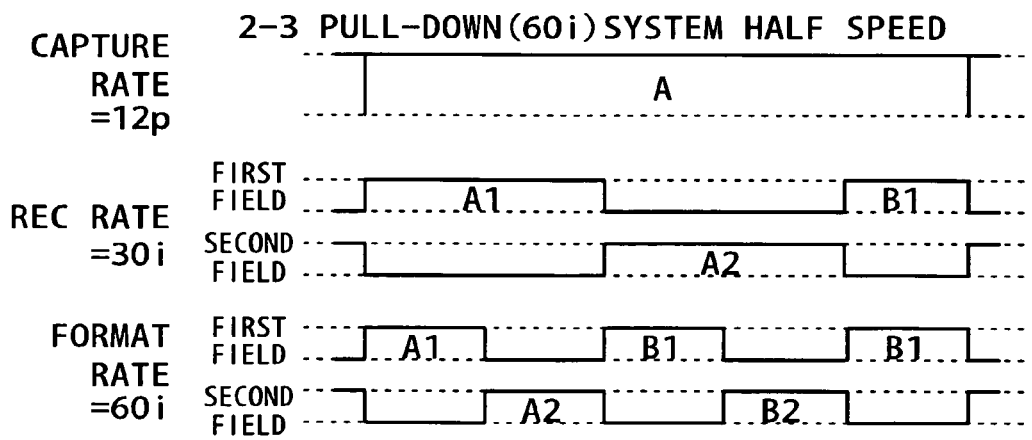

FIG. 8 shows examples in the case where the format rate is "60i" and the image data is recorded with a 2-3 pull-down system. FIG. 8A shows an example in the case of the normal-speed mode (one-time speed). FIG. 8B shows an example in the case of the high-speed mode (double speed). FIG. 8C shows an example in the case of the low-speed mode (half speed). That is, FIG. 8A shows the example of a relationship between each value of the capture rate, the REC rate, and the format rate, and field images at the time of generation, recording, and playback, in the case where the format rate is set to "60i" and the user selects the pull-down system mode 184 (2-3 pull-down system) as the system mode 175 and the normal-speed mode 185 as the speed mode 176. FIG. 8B shows the example of a relationship between each value of the capture rate, the REC rate, and the format rate, and field images at the time of generation, recording, and playback, in the case where the format rate is set to "60i" and the user selects the pull-down system mode 184 (2-3 pull-down system) as the system mode 175 and the high-speed mode 186 as the speed mode 176. FIG. 8C shows the example of a relationship between each value of the capture rate, the REC rate, and the format rate, and field images at the time of generation, recording, and playback, in the case where the format rate is set to "60i" and the user selects the pull-down system mode 184 (2-3 pull-down system) as the system mode 175 and the low-speed mode 187 as the speed mode 176.

In the case of FIG. 8A, the capture rate is set to "24p", and the REC rate and the format rate are set to "60i" of the NTSC system. That is, in this case, the CCD 112 in the imaging record apparatus 11 generates frame images (A and B) with frequency of 24 frames per second. The signal processing unit 114 generates the first field images (odd fields) (A1 and B1) and the second field images (even fields) (A2 and B2) in the order shown in FIG. 8A from each frame image. The record processing unit 121 records each field image in sequence at the field rate (60 fields per second) corresponding to the frame rate (24 frames per second) which is set as the capture rate (i.e., two frames make five fields). The playback processing unit 142 in the playback output apparatus 12 plays back each field image at the same field rate (60 fields per second).

Thus, the image data based on a different system and rate such as movie film can conform to a TV broadcasting standard such as the NTSC system.

In the case of FIG. 8B, the REC rate is set to "120i" which is double the format rate "60i", and the capture rate is set to "48p" corresponding to the REC rate. That is, in this case, the CCD 112 in the imaging record apparatus 11 shortens a time interval for capturing electric charge to the half compared to that of FIG. 8A, and increases the number of times of the photoelectric conversion processing per second to the double, and generates frame images (A to D) with frequency of 48 frames per second. The signal processing unit 114 generates the first field images (odd fields) (A1, B1, C2, and D2) and the second field images (even fields) (A2, B2, C1, and D1) in the order shown in FIG. 8B from each frame image. The record processing unit 121 records each field image in sequence at the field rate (120 fields per second) corresponding to the frame rate (48 frames per second) which is set as the capture rate (i.e., two frames make five fields). The playback processing unit 142 in the playback output apparatus 12 plays back each field image at the same field rate (60 fields per second) as in FIG. 8A.

Thus, the playback output apparatus 12 outputs each field image of the image data recorded by the imaging record apparatus 11 over double the time by the normal playback.

In the case of FIG. 8C, the REC rate is set to "30i" which is half the format rate "60i", and the capture rate is set to "12p" corresponding to the REC rate. That is, in this case, the CCD 112 in the imaging record apparatus 11 extends a time interval for capturing electric charge to the double compared to that of FIG. 8A, and decreases the number of times of the photoelectric conversion processing per second to the half, and generates frame images (A and B) with frequency of 12 frames per second. The signal processing unit 114 generates the first field images (odd fields) (A1 and B1) and the second field images (even fields) (A2 and B2) in the order shown in FIG. 8C from each frame image. The record processing unit 121 records each field image in sequence at the field rate (30 fields per second) corresponding to the frame rate (12 frames per second) which is set as the capture rate (i.e., two frames make five fields). The playback processing unit 142 in the playback output apparatus 12 plays back each field image at the same field rate (60 fields per second) as in FIG. 8A.

Thus, the playback output apparatus 12 outputs each field image of the image data recorded by the imaging record apparatus 11 over half the time by the normal playback.

The control unit 21 in the imaging record apparatus 11 controls the imaging unit 22 and the record unit 23 as described above, based on the inputted input imaging record mode instruction and the apparatus information 102A stored in the ROM 102, and also provides the input imaging record mode instruction and the apparatus information 102A to the rate information creation unit 24. The rate information creation unit 24 creates the capture rate, the REC rate, and the format rate base on the input imaging record mode instruction and the apparatus information 102A provided from the control unit 21, and provides them to the record unit 23. The record unit 23 relates the rate information provided from the rate information create unit 24 to the image data and the audio data provided from the imaging unit 22, and records it onto the optical disc 13.

Thus, in the case where the playback output apparatus 12 plays back the image data and the audio data recorded on the optical disc 13, the playback output apparatus 12 can display the rate information at the time of imaging and recording such as the capture rate and the REC rate on the monitor, as well as acquiring the rate information required for the playback processing and the output processing. That is, the imaging record apparatus 11 can provide the rate information to the playback output apparatus 12 by recording the rate information on the optical disc 13 as described above.

Next, specific flows of the above processing will be described.

For example, when the imaging record apparatus 11 is turned on, the main control unit 101 performs imaging record control processing to control each unit in the imaging record apparatus 11. Referring to flowcharts in FIG. 9 and FIG. 10, the imaging record control processing will be described.

First, the main control unit 101 performs initialization processing to initialize a state of each unit at step S1, and initializes an imaging record control setting which is stored in, for example, the RAM 103 or the like, at step S2. The imaging record control setting is setting information for the main control unit 101 to control the imaging unit 22 and the record unit 23, and includes, for example, the apparatus information 102A stored in the ROM 102 and the input imaging record mode instruction inputted by the user. That is, the main control unit 101 controls the imaging unit 22 and the record unit 23 with the capture rate and the REC rate determined based on the imaging record control setting.

After completing step S2, the main control unit 101 controls the input unit 104 at step S3 to determine whether or not the input unit 104 has received the input imaging record mode 172. If the main control unit 101 determines that the input unit 104 has received the input imaging record mode 172, the process moves to step S4 where the main control unit 101 reads out the apparatus information 102A stored in the ROM 102 and determines the capture rate and the REC rate according to the apparatus information 102A and the input imaging record mode inputted from the input unit 104 and updates the imaging record control setting.

After completing step S4, the main control unit 101 determines at step S5 whether the imaging unit 22 and the record unit 23 are currently performing the imaging processing and the record processing. That is, the main control unit 101 determines whether the subject is in the process of being imaged. If the main control unit 101 determines that the subject is in the process of being imaged (the imaging processing and the record processing are being performed), the process moves to step S6 where the main control unit 101 applies the updated data of the imaging record control setting to the control of the imaging unit 22 and the record unit 23. Further, at step S7, the main control unit 101 provides the apparatus information 102A read from the ROM 102 and the inputted input imaging record mode to the rate information creation unit 24 and makes the rate information creation unit 24 create the rate information (the capture rate, the REC rate, and the format rate) and provide the rate information to the record unit 23. At step S8, the main control unit 101 controls the record unit 23 to make the record unit 23 relate the rate information to the image data and the audio data and record it onto the optical disc 13. After completing step S8, the main control unit 101 moves the process to step S11 in FIG. 10.

Figure 9:
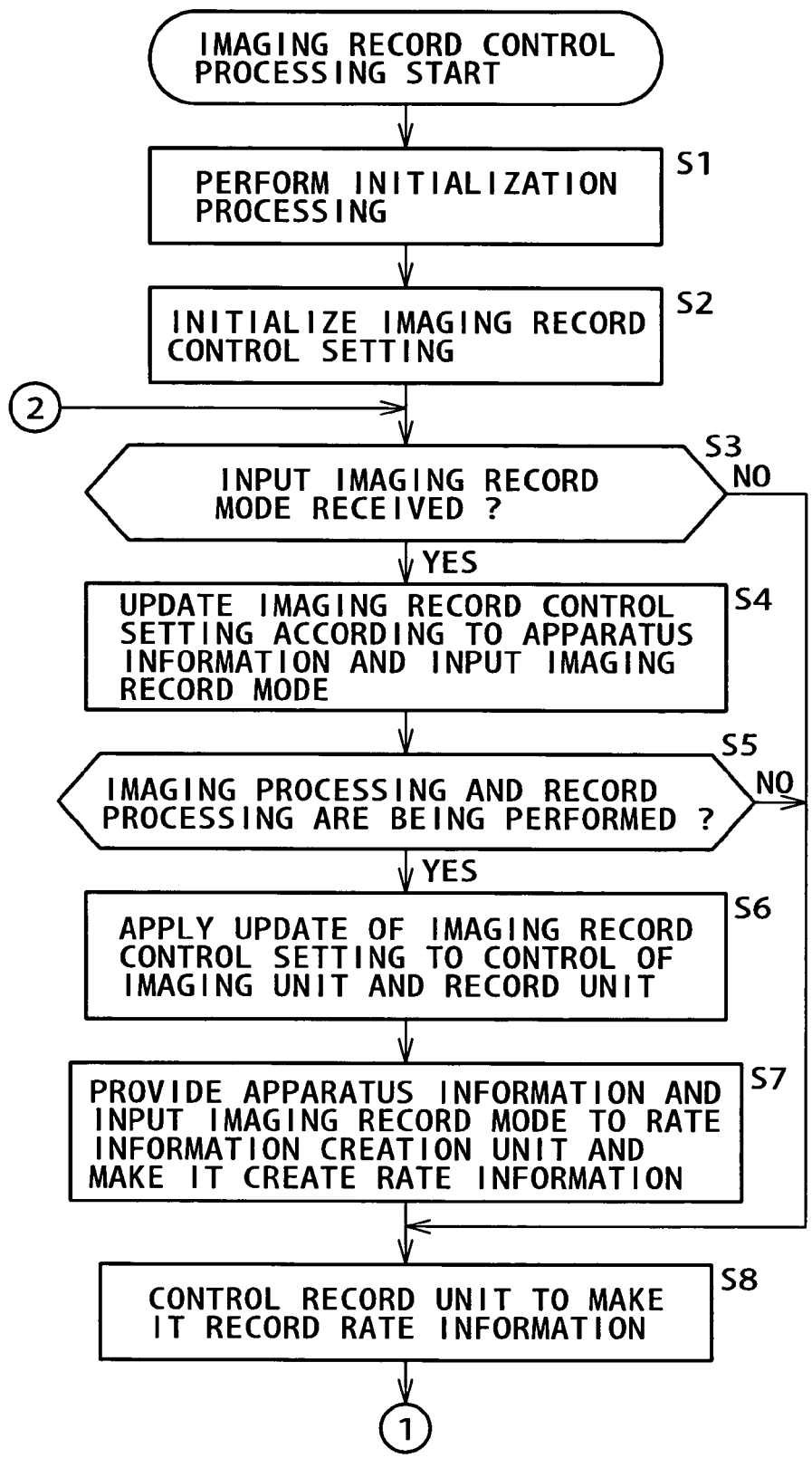
FIG. 9 is a flowchart explaining imaging record control processing.
Figure 10:
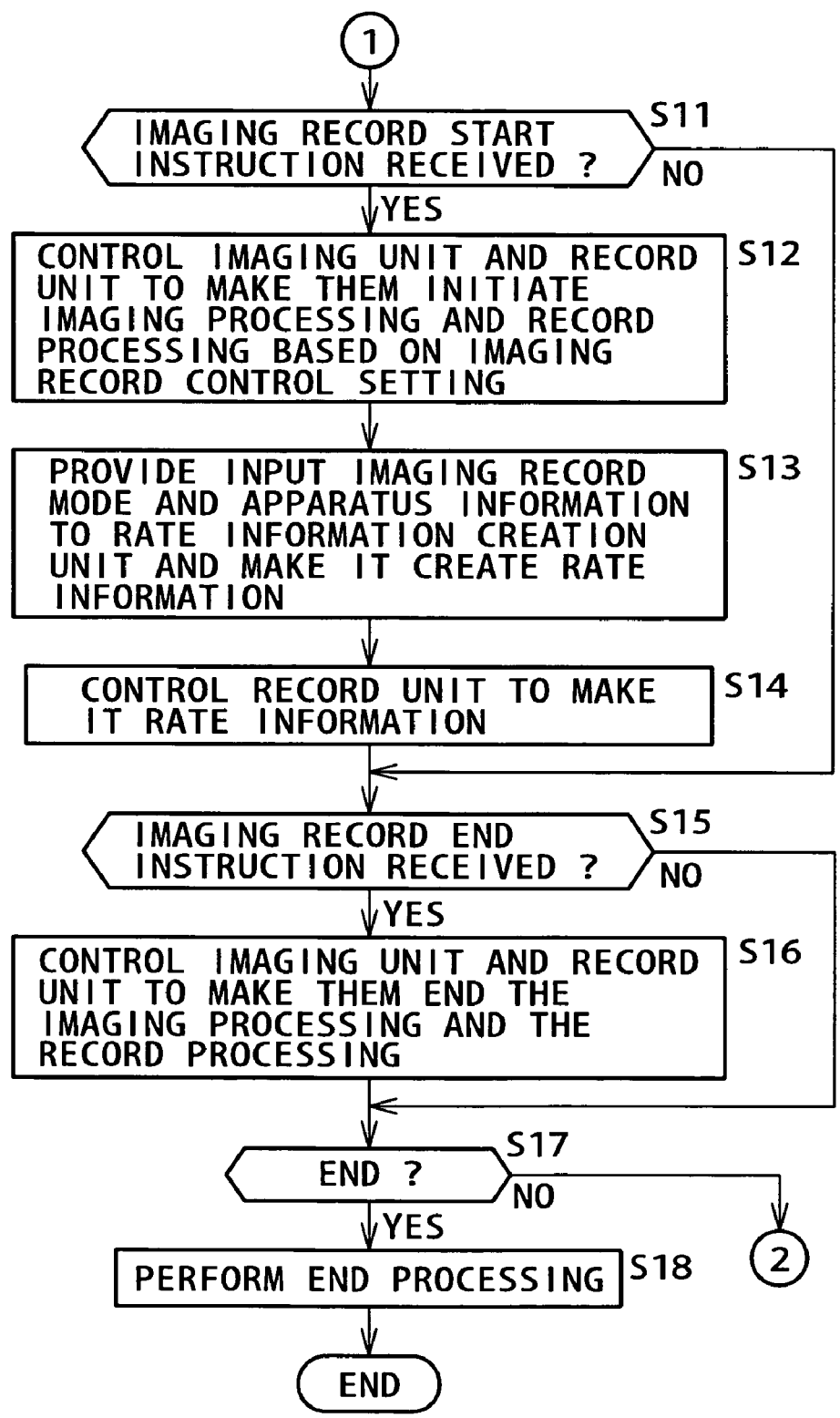
FIG. 10 is a flowchart (continued from FIG. 9) explaining imaging, record control processing.

Further, at step S5 in FIG. 9, if the main control unit 101 determines that the imaging processing and the record processing are not being performed, the main control unit 101 omits steps 6 to 8 and moves the process to step S11 in FIG. 10. Furthermore, at step S3 in FIG. 9, if the main control unit 101 determines that the input unit 104 has not received the input imaging record mode, the main control 101 omits steps 4 to 8 and moves the process to step S11 in FIG. 10. That is, only during imaging, the main control unit 101 applies the inputted input imaging record mode 172 to the control of the imaging unit 22 and the record unit 23 and makes the rate information creation unit 24 create the new rate information and makes the record unit 23 relate the rate information to the image data and the audio data and record it onto the optical disc 13. If not during imaging, the main control unit 101 does not perform the update to the control of the imaging unit 22 and the record unit 23 or the creation of the new rate information, etc., which respond to the input imaging record mode 172. Further, if the input imaging record mode 172 is not inputted, the main control unit 101 does not update the imaging record control setting either.

At step S11 in FIG. 10, the main control unit 101 controls the input unit 104 to determine whether the input unit 104 has received an imaging record start instruction. If the main control unit 101 determines that the input unit 104 has received the imaging record start instruction, the main control unit 101 controls the imaging unit 22 and the record unit 23 to make the imaging unit 22 and the record unit 23 initiate the imaging processing and the record processing at step S12 based on the imaging record control setting stored in the RAM 103. Further, at step S13, the main control unit 101 provides the input imaging record mode 172 and the apparatus information 102A to the rate information creation unit 24 and makes the rate information creation unit 24 create the rate information (the capture rate, the REC rate, and the format rate) and provide the rate information to the record unit 23. At step S14, the main control unit 101 controls the record unit 23 to make the record unit 23 relate the rate information to the image data and the audio data and record it onto the optical disc 13.

After completing step S14, the main control unit 101 moves the process to step S15. Further, at step S11, if the main control unit 101 determines that the input unit 104 has not received the imaging record start instruction, the main control unit 101 omits steps 12 to 14 and moves the process to step S15.

At step S15, the main control unit 101 determines whether the input unit 104 has received an imaging record end instruction. If the main control unit 101 determines that the input unit 104 has received the imaging record end instruction, the main control unit 101 controls the imaging unit 22 and the record unit 23 to make the imaging unit 22 and the record unit 23 end the imaging processing and the record processing at step S16 and moves the process to step S17. Further, at step S15, if the main control unit 101 determines that the input unit 104 has not received the imaging record end instruction, the main control unit 101 omits steps 16 and moves the process to step S17.

At step S17, the main control unit 101 determines whether to end the imaging record control processing. If the main control unit 101 determines that it does not end the imaging record control processing, the process returns to step S3 in FIG. 9 and repeats from step S3. Further, at step S17 in FIG. 10, if the main control unit 101 determines that it ends the imaging record control processing, the main control unit 101 moves the process to step S18 and performs end processing to end the imaging record control processing.

That is, when the imaging processing and the record processing are initiated or the input imaging record mode is changed by the user, the main control unit 101 makes the rate information creation unit 24 create the updated new rate information (the capture rate, the REC rate, and the format rate) and makes the record unit 23 relate the rate information to the image data and the audio data and record it onto the optical disc 13.

By this control of the main control unit 101, as shown in FIG. 11, a transition point table 191 which shows a transition point (frame) of the capture rate, the REC rate, and the format rate is recorded on the optical disc 13.

In the case of FIG. 11, a transition point of each rate information of the capture rate, the REC rate, and the format rate is related to a frame number in the transition point table 191. For example, the capture rate, the REC rate, and the format rate that correspond to the frame number "0" (i.e., a start frame) are all "50i". The capture rate and the REC rate that correspond to the frame number "1000" are "100i" and a format rate is "50i". The capture rate and the REC rate that correspond to the frame number "2000" are "25i" and the format rate is "50i".

That is, the transition point table 191 shows that the imaging record apparatus 11 generates the image data corresponding to the PAL system and the user specifies the interlaced mode 181 and the normal-speed mode 185 as the input imaging record mode 172 at the start of imaging, and the interlaced mode 181 and the high-speed mode 186 (double speed) as the input imaging record mode 172 at the 1000th frame, and the interlaced mode 181 and the low-speed mode 187 (half speed) as the input imaging record mode 172 at the 2000th frame.

In FIG. 11, the transition point of each rate information is related to the frame number; however, this is not limited to the frame number, but it may be related to a field number or a time code.

Further, in the optical disc 13, the rate information may be recorded as metadata corresponding to the audio data and the image data in a predetermined unit as shown in FIG. 12A, or may be recorded as metadata corresponding to the audio data the and image data obtained by one-time imaging processing (processing from imaging start through imaging end) (hereinafter referred to as "clip") as shown in FIG. 12B, or maybe recorded in a different area from that of the audio data and the image data as shown in FIG. 12C.

In the case of FIG. 12A, as metadata 203 corresponding to the audio data 201 and the image data 202 in units of frames for example, the capture rate 41, the REC rate 42, and the format rate 43 are recorded. That is, in this case, in the optical disc 13, the audio data and the image data are divided in units of frames, and a frame of audio data 201, a frame of image data 202, their metadata 203, a subsequent frame of audio data 204, a subsequent frame of audio data 205, and their metadata 206 are recorded in the above order. Each metadata corresponds to the preceding image data and audio data, and the capture rate 41, the REC rate 42, and the format rate 43 also corresponds to the preceding image data and audio data.

In the case of FIG. 12B, as the metadata corresponding to the audio data and the image data in units of clips, the capture rate, the REC rate, and the format rate are recorded. That is, in this case, in the optical disc 13, audio data and image data in units of frames are arranged in a predetermined order such as the audio data 211, the image data 212, the audio data 213, the image data 214, the audio data 215, and the image data 216, and a clip of audio data and image data is collected. As the metadata 217 corresponding to a clip of audio data and image data, the capture rate 41, the REC rate 42, and the format rate 43 are recorded. After the metadata 217, another clip data such as the audio data 218 and the image data 219 is recorded subsequently.

In the case of FIG. 12C, the capture rate, the REC rate, and the format rate are recorded in a different area from that of the audio data and the image data. That is, in this case, in the optical disc 13, the audio data and the image data are recorded in a first area of a predetermined memory area as the audio data 211 to the image data 216, and the metadata 241 including the capture rate 41, the REC rate 42, and the format rate 43 of the corresponding rate information is recorded in a second area which is a different memory area from the first area. In this case, a UMID (Unique Material IDentifier) 231 is assigned to the audio data and the image data in a predetermined unit, and the metadata 241 includes UMID information 242 which specifies the UMID. That is, in this case, each rate information is related by the UMID, and the metadata 241 is related to the audio data and the image data by the UMID 231 described in the UMID information 242.

Further, the rate information (the capture rate, the REC rate, and the format rate) may be recorded on a different record medium than the image data and the audio data are recorded on. In this case, in the same way as in FIG. 12C, the rate information is related to the image data and the audio data using an identifier such as the UMID or the like.

Next, referring to FIG. 13, rate information creation processing which is performed by the rate information creation unit 24 controlled by the main control unit 101 will be described.

The rate information creation unit 24, which is provided with the apparatus information 102A and the input imaging record mode and instructed to create the rate information by the main control unit 101, finds the format rate at step 31 based on the provided apparatus information. The rate information creation unit 24 finds the REC rate at step S32 based on the apparatus information and the input imaging record mode and the capture rate at step S33 based on the apparatus information and the input imaging record mode.

Further, at step S34, the rate information creation unit 24 provides the record unit 23 with the capture rate, the REC rate, and the format rate obtained through steps 31 to 33 as the rate information, and the rate information creation processing ends.

For example, in the case of FIG. 5A, since the format rate is set to "50i" in the apparatus information 102A, the rate information creation unit 24 determines that the format rate is "50i". Further, in the case of FIG. 5A, since the interlace mode and the normal-speed mode are specified as the input imaging record mode, the rate information creation unit 24 determines that the capture rate and the REC rate is the same "50i" as the format rate. Thus, the rate information creation unit 24 can determine the rate information based on the apparatus information and the input imaging record mode and can make the optical disc 13 record it. That is, the imaging record apparatus 11 can provide the rate information created based on the user input and the like to the playback output apparatus 12.

Next, operation of the playback output apparatus will be described.

The main control unit 131 in the playback output apparatus 12 performs playback output control processing when, for example, the power is turned on or the optical disc 13 on which the rate information along with the image data and the audio data is recorded is mounted onto a drive (not shown).

Figure 14:
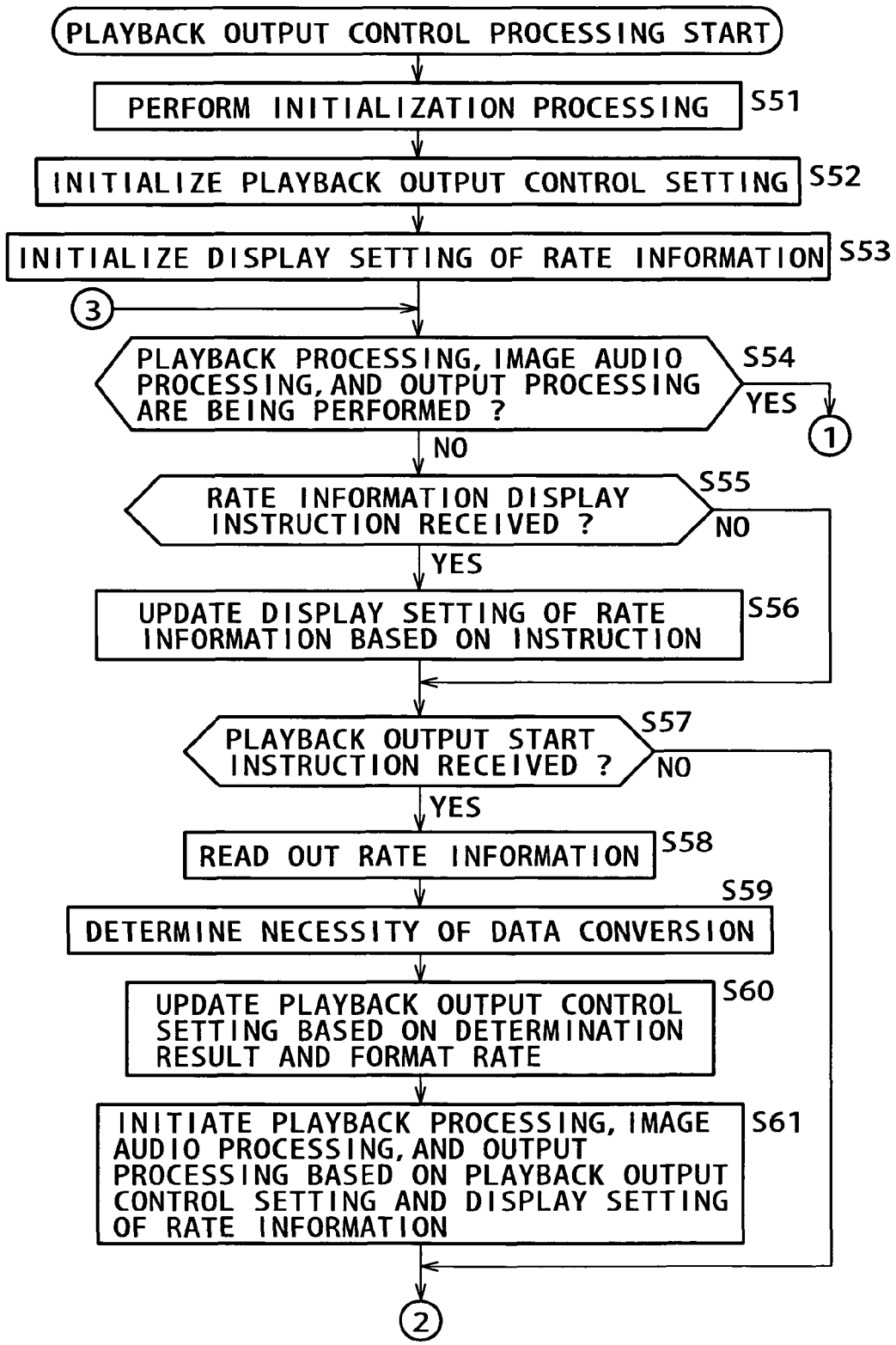
FIG. 14 is a flowchart explaining playback output control processing.
Figure 15:
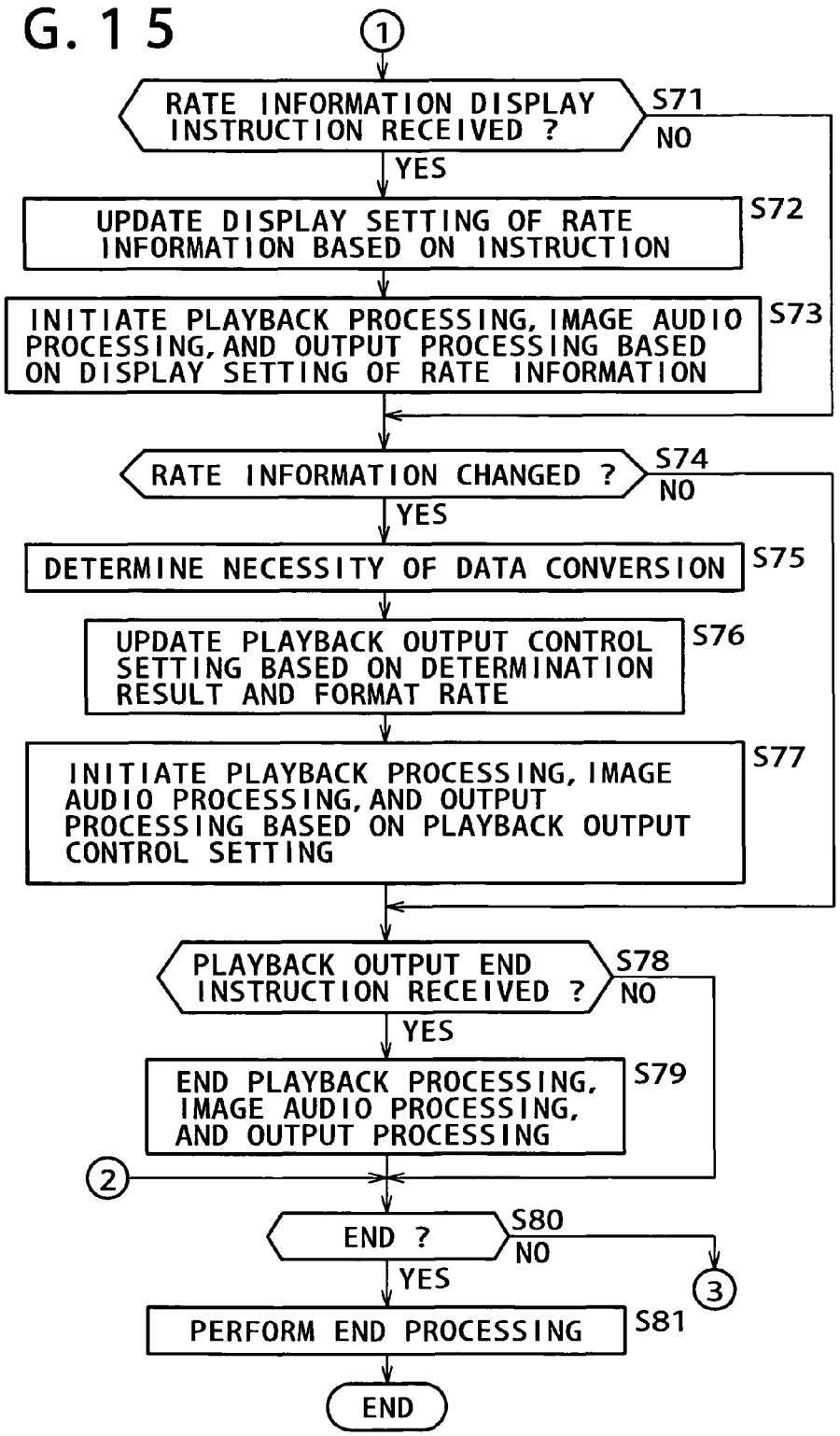
FIG. 15 is a flowchart (continued from FIG. 14) explaining playback output control processing.

Referring to FIG. 14 and FIG. 15, the playback output control processing will be described.

First, the main control unit 131 in the playback output apparatus 12 performs initialization processing to initialize a state of each unit at step S51, and initializes a playback output control setting which is information regarding operation setting of each unit controlled by the main control unit 131, at step S52. At step S53, the main control unit 131 initializes a display setting of the rate information (for example, no-display setting).

At step S54, the main control unit 131 determines whether the playback processing, the image audio processing, and the output processing are being performed. If the main control unit 131 determines that they are not being performed, the main control unit 131 controls the input unit 134 at step S55 to determine whether it has received a rate information display instruction inputted by the user. If the main control unit 131 determines that the input unit 134 has received the rate information display instruction (the instruction of display or no display) from the user, the main control unit 131 moves the process to step S56 where the main control unit 131 updates the display setting of the rate information based on the inputted instruction and moves the process to step S57. Further, at step S55, if the main control unit 131 determines that the input unit 134 has not received the rate information display instruction, the main control unit 131 omits step S56 and moves the process to step S57.

At step S57, the main control unit 131 controls the input unit 134 to determine whether it has received a playback output start instruction inputted by the user. If the main control unit 131 determines that the input unit 134 has received the playback output start instruction, the process moves to step S58 where the main control unit 131 controls the drive control unit 143 in the playback unit 52 to make it read out the rate information. The pickup unit 141 is controlled by the drive control unit 143 to read the rate information corresponding to desired image data (and audio data) from the optical disc 13 mounted on the drive (not shown) and provide the rate information to the rate information determination unit 55.

At step S59, the main control unit 131 controls the rate information determination unit 55 to make the rate information determination unit 55 determine necessity of data conversion processing of the image data at the data conversion unit 152 based on the rate information provided from the pickup unit 141, and acquires the determination result and the rate information. Further, at step S60, the main control unit 131 updates the playback output control setting based on the determination result and the format rate. At step 61, the main control unit 131 controls operation of the playback processing unit 142 and the drive control unit 143 in the playback unit 52, the signal processing unit 151 in the image audio processing unit 53, and the monitor 161 and the speaker 162 in the output unit 54 to make them initiate the playback processing, the image audio processing, and the output processing based on the playback output control setting and the display setting of the rate information.

By this processing, the playback processing unit 142 in the playback unit 52 can initiate the playback processing based on the rate information. That is, the playback processing unit 142 can initiate the normal playback at the format rate specified by the imaging record apparatus 11.

Further, the data conversion unit 152 in the signal processing unit 151 can initiate the data conversion processing as necessary by this control of the main control unit 131. For example, as described later, in the case where the image data recorded on the optical disc 13 is the image data according to the PSF system, if the rate information determination unit 55 determines that the data conversion is required, the data conversion unit 152 acquires the determination result by the playback output control setting and can initiate processing of converting the image data from the interlaced system to the progressive system. Further, if the data conversion unit 152 acquires the determination result that indicates no data conversion, the data conversion unit 152 can also initiate processing of outputting the provided image data without conversion.

Further, the output information creation unit 153 determines whether to output the provided rate information through the monitor 161 based on the display setting of the rate information provided from the main control unit 131. If the output information creation unit 153 determines that it outputs the rate information, the output information creation unit 153 creates an image for displaying the rate information and can initiate processing of superimposing it on the image data read from the optical disc 13.

Further, the monitor 161 and the speaker 162 in the output unit 54 can initiate processing of outputting the image and the audio provided from the image audio processing unit 53 by the control of the main control unit 131.

As described above, the main control unit 131 which has made each unit initiate each processing moves the process to step 80 in FIG. 15. Further, at step S57 in FIG. 14, if the main control unit 131 determines that the input unit 134 has not received the playback output start instruction, the main control unit 131 omits steps S58 to S61 and moves the process to step S80 in FIG. 15.

At step S80 in FIG. 15, the main control unit 131 determines whether to end the playback output control processing. If the main control unit 131 determines that it does not end the playback output control processing, the process returns to step S54 in FIG. 14 and repeats from step S54. At step S80 in FIG. 15, if the main control unit 131 determines that it ends the playback output control processing, the main control unit 131 performs end processing at step S81 to end the playback output control processing.

Further, at step S54 in FIG. 14, if the main control unit 131 determines that the playback processing, the image audio processing, and the output processing are being performed, the main control unit 131 moves the process to step S71 in FIG. 15 and then controls input unit 134 to determine whether it has received a rate information display instruction. If the main control unit 131 determines that the input unit 134 has received the rate information display instruction, the main control unit 131 updates the display setting of the rate information at step S72 based on the received instruction. At step S73, the main control unit 131 controls each unit such that the playback processing, the image audio processing, and the output processing are performed, and the rate information is displayed or not displayed, based on the updated display setting of the rate information.

After completing step S73, the main control unit 131 moves the process to step S74. Further, at step S71, if the main control unit 131 determines that the input unit 134 has not received the rate information display instruction, the main control unit 131 omits steps S72 and S73 and moves the process to step S74.

At step S74, if the main control unit 131 determines whether or not the image data read from the optical disc 13 corresponds to the transition point of the rate information and the rate information corresponding to the image data has changed. If the main control unit 131 determines that the rate information has changed, the main control unit 131 moves the process to step S75 and then controls the rate information determination unit 55 to determine whether the data conversion is required. At step 76, based on the determination result and the format rate, the main control unit 131 updates the playback output control setting. At step S77, based on the updated playback output control setting, the playback processing, the image audio processing, and the output processing are performed.

By this control of the main control unit 131, the playback processing unit 142 can perform the normal playback at the format rate specified by the imaging record apparatus 11 based on the rate information, and the data conversion unit 152 can perform the data conversion processing of the image data as necessary, and the output unit 54 can perform the processing of outputting the image and the audio provided from the image audio processing unit 53.

After completing step S77, the main control unit 131 moves the process to step S78. Further, at step S74, if the main control unit 131 determines that the rate information corresponding to the read image data has not changed, the main control unit 131 omits steps 75 to 77 and moves the process to step S78.

At step S78, the main control unit 131 controls the input unit 134 to determine whether it has received a playback output end instruction inputted by the user. If the main control unit 131 determines that the input unit 134 has received the playback output end instruction, the process moves to step S79 where the main control unit 131 controls each unit such that the playback processing, the image audio processing, and the output processing are ended, and moves the process to step S80. Further, at step S78, if the main control unit 131 determines that the input unit 134 has not received the playback output end instruction, the main control unit 131 omits step S79 and moves the process to step S80.

Description of steps S80 and S81 is omitted here since it is the same as the above-mentioned.

As described above, by the playback output control processing of the main control unit 131, each unit in the playback output apparatus 12 can perform more effective playback processing, image audio processing, output processing, and the like based on the rate information recorded on the optical disc 13.

Next, determination processing performed by the rate information determination unit 55 will be described with reference to a flowchart in FIG. 16.

When the rate information determination unit 55 is provided with the rate information from the pickup unit 141 and instructed to initiate the determination processing by the main control unit 131, the rate information determination unit 55 initiates the determination processing and, at step S101, refers to the rate information to determine the format rate. At step S102, the rate information determination unit 55 refers to the rate information to determine the system mode and the speed mode, and at step S103, determines the necessity of the data conversion at the data conversion unit 152 based on the determination result of the system mode.

Further, at step S104, the rate information determination unit 55 outputs the determination results along with the rate information to the main control unit 131 and ends the determination processing.

By the determination processing, the playback output apparatus 12 can display the rate information recorded on the optical disc 13 to the user and can perform the normal playback at the format rate specified by the imaging record apparatus 11 and can convert the playback data as necessary. That is, the playback output apparatus 12 can perform more effective playback processing, image audio processing, output processing, and the like based on the rate information recorded on the optical disc 13.

A specific example of the determination processing in steps S102 and S103 will be described with reference to relationship between the rate information and the imaging record mode shown in FIG. 17.

A table 215 shown in FIG. 17 shows a list of imaging record modes corresponding to the settings of the format rate, the REC rate, and the capture rate.

The rate information determination unit 55 can determine the system mode in FIG. 4 by comparing the system mode of the format rate with that of the capture rate. For example, in the case where the format rate is set to the interlaced system such as "50i" and the capture rate is set to the interlaced system (e.g., an example from the first line to the fourth line in the table 251), the rate information determination unit 55 determines that the interlaced mode is specified as the system mode in FIG. 4 since the interlaced image data obtained by imaging is recorded with the same system. Further, for example, in the case where the format rate is set to the interlaced system such as "50i" or "60i" and the capture rate is set to the progressive system (e.g., examples from the fifth line to the eighth line and from thirteenth line to sixteenth line in the table 251), the rate information determination unit 55 determines that the PSF system mode or the pull-down system mode is specified as the system mode in FIG. 4 since the progressive image data obtained by imaging is converted into the interlaced image data to be recorded. Furthermore, for example, in the case where the format rate is set to the progressive system such as "25p" and the capture rate is also set to the progressive system (e.g., an example from the ninth line to the twelfth line in the table 251), the rate information determination unit 55 determines that the progressive mode is specified as the system mode in FIG. 4 since the progressive image data obtained by imaging is recorded with the same system.

Further, in the case of the interlaced mode, the rate information determination unit 55 can determine the speed mode in FIG. 4 by comparing the field rate of the format rate with that of the REC rate. For example, in the case where the format rate and the REC rate are set to "50i" (e.g., an example of the first line in the table 251), the rate information determination unit 55 determines that the normal-speed mode is specified as the speed mode since the format rate and the REC rate are the same. Further, for example, in the case where the format rate is set to "50i" and the REC rate is set to "100i" (e.g., an example of the second line in the table 251), the rate information determination unit 55 determines that the high-speed mode is specified as the speed mode since the REC rate is higher than the format rate. Furthermore, for example, in the case where the format rate is set to "50i" and the REC rate is set to "25i" (e.g., an example of the third line in the table 251), the rate information determination unit 55 determines that the low-speed mode is specified as the speed mode since the REC rate is lower than the format rate. Moreover, in the case where the speed mode is specified with the rate, if the format rate is set to "50i" and the REC rate is "Ni" (e.g., an example of the fourth line in the table 251), the speed mode is an "N/50" times speed since the REC rate is "N/50" times the format rate.

In the case of the progressive mode, the rate information determination unit 55 can determine the speed mode in FIG. 4 in the same way as in the interlaced mode by comparing the frame rate of the format rate with that of the REC rate. For example, in the case where the format rate and the REC rate are set to "25p" (e.g., an example of the ninth line in the table 251), the rate information determination unit 55 determines that the normal-speed mode is specified as the speed mode. Further, in the case where the format rate is set to "25p" and the REC rate is set to "50p" (e.g., an example of the tenth line in the table 251), the rate information determination unit 55 determines that the high-speed mode is specified as the speed mode. Furthermore, in the case where the format rate is set to "25p" and the REC rate is set to "12.5p" (e.g., an example of the eleventh line in the table 251), the rate information determination unit 55 determines that the low-speed mode is specified as the speed mode. Moreover, in the case where the speed mode is specified with the rate, if the format rate is set to "25p" and the REC rate is "Np", the speed mode is an "N/25" times speed.

Further, the rate information determination unit 55 can determine whether the PSF system mode or the pull-down system mode is specified as the system mode in FIG. 4 by comparing the field rate of the REC rate with the frame rate of the capture rate. For example, in the case where the REC rate is set to "50i" and the capture rate is "25p" (e.g., an example of the fifth line in the table 251), the rate information determination unit 55 determines that the PSF system mode is specified as the system mode since the field rate of the REC rate corresponds with the frame rate of the capture rate (the rate ratio of 2:1). Further, in the case where the REC rate is set to "100i" and the capture rate is "50p", and the REC rate is set to "25i" and the capture rate is "12.5p" (e.g., examples of the sixth line and the seventh line in the table 251), the rate information determination unit 55 determines that the PSF system mode is also specified as the system mode. Moreover, in the case where the speed mode is specified with the rate, if the field rate of the REC rate is set to "2Ni" and the frame rate of the capture rate is "Np" (e.g., an example of the eighth line in the table 251), that is, the field rate of the REC rate is twice the frame rate of the capture rate, the rate information determination unit 55 determines that the PSF system mode is specified as the system mode.

On the other hand, in the case where the field rate of the REC rate does not correspond with the frame rate of the capture rate (the rate ratio is not 2:1) (e.g., examples from the thirteenth line to the sixteenth line in the table 251), the rate information determination unit 55 determines that the pull-down system mode is specified as the system mode. Further, a pull-down ratio can be calculated from the ratio of the REC rate and the capture rate.

Further, in the case of the PSF system mode or the pull-down system mode, the rate information determination unit 55 can determine the speed mode in FIG. 4 in the same way as in the interlaced mode and the progressive mode by comparing the format rate with the REC rate. Furthermore, in the case where the speed mode is specified with the rate, if the PSF system mode is specified as the system mode and the format rate is set to "50i" and the REC rate is "2Ni" (e.g., an example of the eighth line in the table 251), the speed mode is an "N/25" times speed. Moreover, in the case where the speed mode is specified with the rate, if the pull-down system mode is specified as the system mode and the format rate is set to "60i" and the REC rate is "Ri" (e.g., an example of the sixteenth line in the table 251), the speed mode is a "R/60" times speed.

Figure 16:
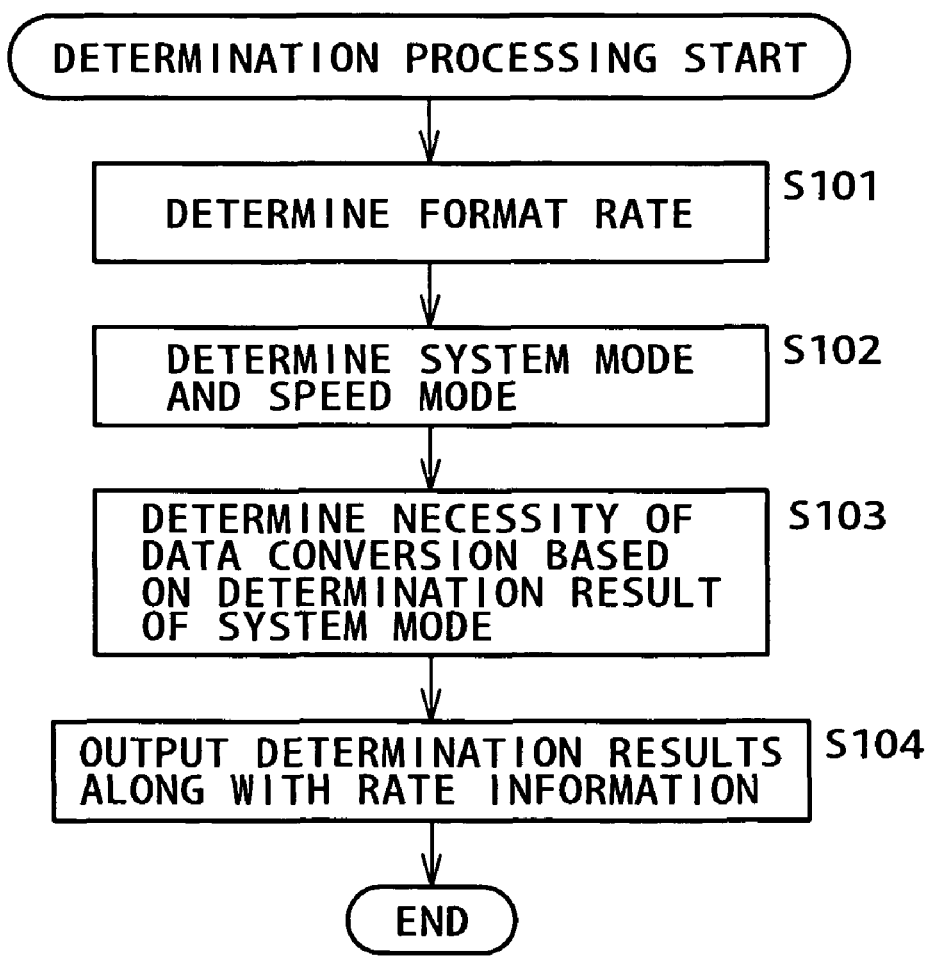
FIG. 16 is a flowchart explaining determination processing.

The rate information determination unit 55 determines the system mode and the speed mode in the above way at step S102 in FIG. 16. Further, in the case where the system mode determined in the above way is the PSF system mode, the rate information determination unit 55 determines that the data conversion unit 152 performs the data conversion processing.

According to the above description, the rate information determination unit 55 determines the system mode and the speed mode from the rate information based on predetermined conditions. However, for simplicity of the processing, the rate information determination unit 55 may retain the table 251 shown in FIG. 17 beforehand and determine the imaging record mode to which the rate information applies, referring to the table 251.

Further, the determination processing is performed under the control of the main control unit 131 with each transition point of the rate information.

Figure 18:
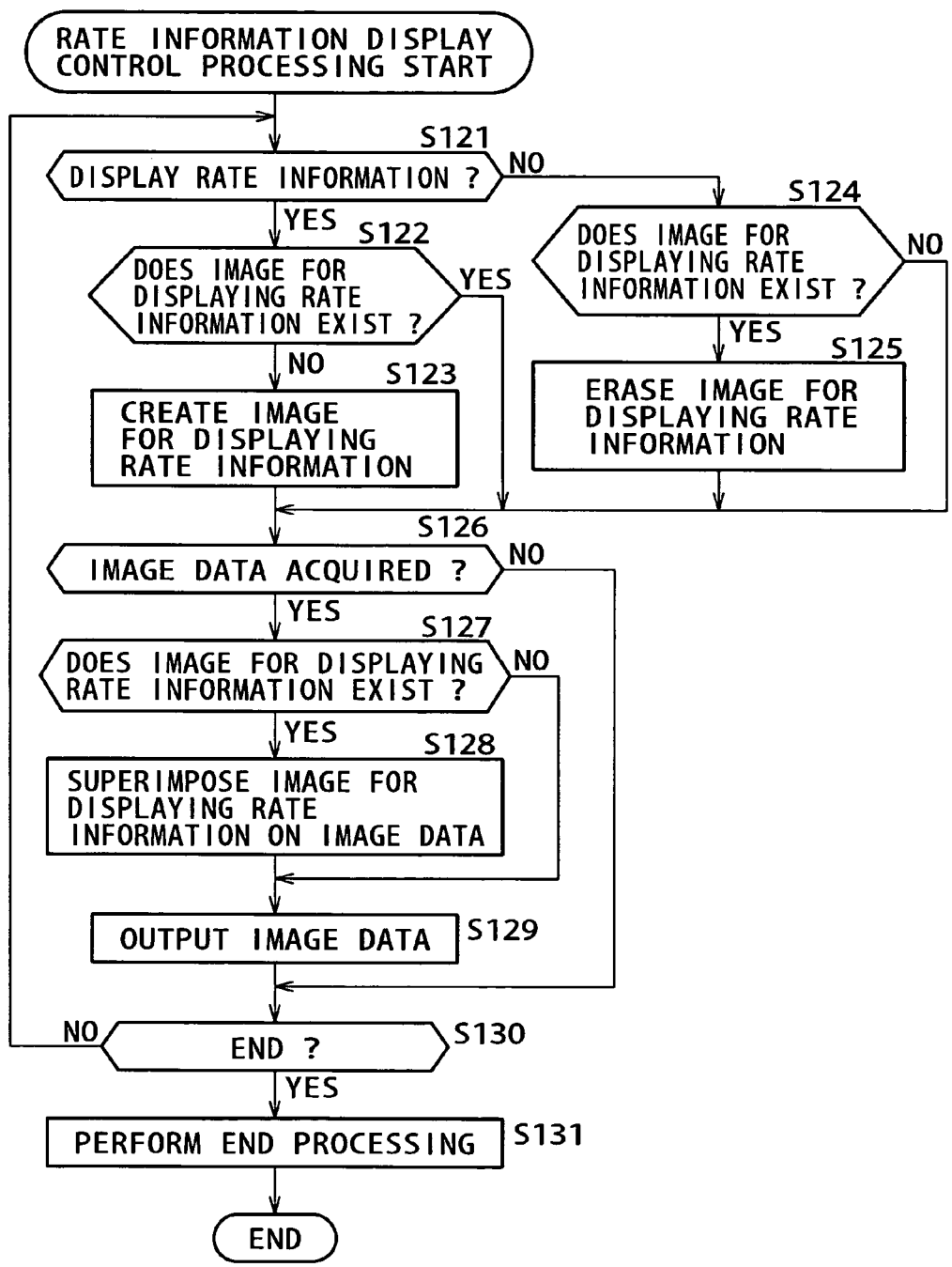
FIG. 18 is a flowchart showing an example of rate information display control processing.

Next, a description will be made of rate information display control processing by the output information creation unit 153 in the signal processing unit 151 with reference to a flowchart in FIG. 18.

When the output information creation unit 153 is provided with the rate information and the display setting of the rate information and instructed to initiate the rate information display control processing by the main control unit 131, the output information creation unit 153 determines at step S121 whether to display the rate information based on the provided display setting of the rate information. If the output information creation unit 153 determines that it displays the rate information, the output information creation unit 153 moves the process to step S122 and determines whether the image for displaying the rate information already exists. If the output information creation unit 153 determines that the image for displaying the rate information does not exist, the output information creation unit 153 moves the process to step S123 where the output information creation unit 153 creates the image for displaying the rate information based on the provided rate information and moves the process to step S126. At step S122, if the output information creation unit 153 determines that the image for displaying the rate information already exists since the output information creation unit 153 has created the image for displaying the rate information before and retains it, the output information creation unit 153 omits step S123 and moves the process to step S126.

Further, at step S121, if the output information creation unit 153 determines that it does not display the rate information, the output information creation unit 153 moves the process to step S124 and determines whether the image for displaying the rate information already exists. If the output information creation unit 153 determines that the image for displaying the rate information already exists since the output information creation unit 153 has created the image for displaying the rate information before and retains it, the output information creation unit 153 moves the process to step S125 where the output information creation unit 153 erases the retained image for displaying the rate information and moves the process to step S126. Further, at step S124, if the output information creation unit 153 determines that the image for displaying the rate information does not exist, the output information creation unit 153 omits step S125 and moves the process to step S126.

At step S126, the output information creation unit 153 determines whether it has acquired the image data read from the optical disc 13. If the output information creation unit 153 determines that it has acquired the image data read from the optical disc 13, the output information creation unit 153 determines at step S127 whether the image for displaying the rate information exists. If the output information creation unit 153 determines that the image for displaying the rate information exists, the output information creation unit 153 superimposes the image for displaying the rate information on the image data at step S128 and moves the process to step S129. At step S127, if the output information creation unit 153 determines that the image for displaying the rate information does not exist, the output information creation unit 153 omits step S128 and moves the process to step S129.

At step S129, the output information creation unit 153 outputs the image data and moves the process to step S130. Further, at step S126, if the output information creation unit 153 determines that it has not acquired the image data read from the optical disc 13, the output information creation unit 153 omits steps S127 to S129 and moves the process to step S130. At step 130, the output information creation unit 153 determines whether to end the rate information display control processing. If the output information creation unit 153 determines that it does not end the rate information display control processing, the process returns to step S121 and repeats from step S121. Further, if the output information creation unit 153 determines that it ends the rate information display control processing, the output information creation unit 153 moves the process to step S131 where the output information creation unit 153 performs end processing to end the rate information display control processing.

The output information creation unit 153 performs the rate information display control processing, in the above way. Thus, the playback output apparatus 12 can display the rate information recorded on the optical disc 13 to the user. That is, the playback output apparatus 12 can perform more effective playback processing, image audio processing, output processing, and the like based on the rate information recorded on the optical disc 13.

Further, the imaging record mode determined at the rate information determination unit 55 may be displayed instead of the rate information. In this case as well, the same processing as in the case of displaying the rate information is performed. Thus, for example, in the table 251 in FIG. 17, the imaging record mode corresponding to the rate information of the format rate, the REC rate, and the capture rate is displayed on the monitor. That is, the rate information and the imaging record mode are the same meaning. It is desirable to display information that is easier for the user to understand, or both of them may be displayed, or the user may select which to display.

Figure 19:
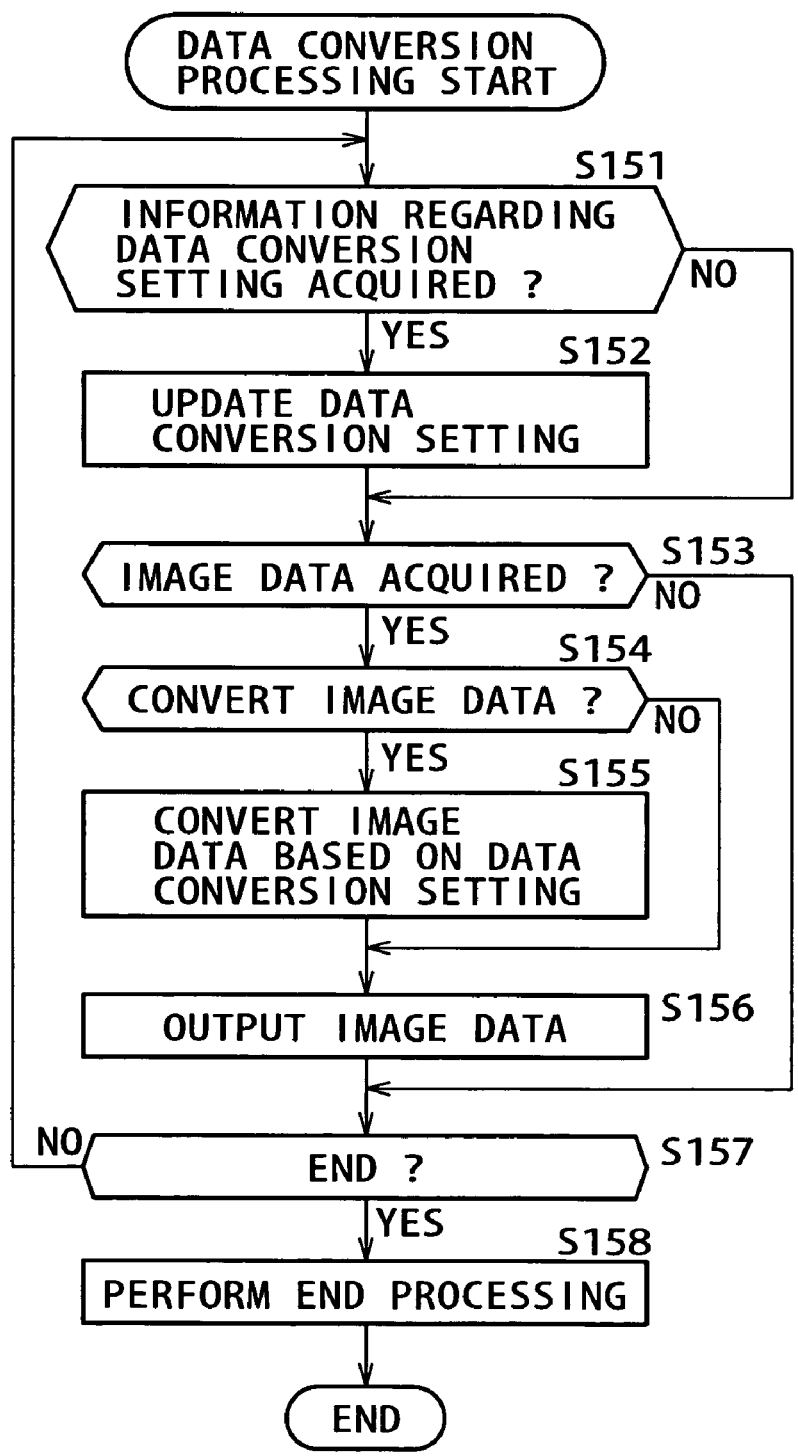
FIG. 19 is a flowchart showing an example of data conversion processing.

Next, the data conversion processing by the data conversion unit 152 in the signal processing unit 151 will be described with reference to a flowchart in FIG. 19.

The data conversion unit 152 determines at step S151 whether it has acquired information regarding a data conversion setting. If the data conversion unit 152 determines that it has acquired the information regarding the data conversion setting, the data conversion unit 152 moves the process to step S152 where the data conversion unit 152 updates the retained data conversion setting and moves the process to step S153. Further, at step S151, if the data conversion unit 152 determines that it has not acquired the information regarding the data conversion setting, the data conversion unit 152 omits step S152 and moves the process to step S153.

At step S153, the data conversion unit 152 determines whether it has acquired the image data played back from the optical disc 13. If the data conversion unit 152 determines that it has acquired the image data, the data conversion unit 152 moves the process to step S154 and determines whether it converts the acquired image data based on the data conversion setting. If the data conversion unit 152 determines that it converts the image data, the data conversion unit 152 converts the image data at step S155 based on the data conversion setting and moves the process to step S156. Further, at step S154, if the data conversion unit 152 determines that it does not convert the image data, the data conversion unit 152 omits step S155 and moves the process to step S156.

At step 156, the data conversion unit 152 outputs the image data. After outputting the image data, the data conversion unit 152 moves the process to step S157. Further, at step S153, if the data conversion unit 152 determines that it has not acquired the image data, the data conversion unit 152 omits steps S154 to S156 and moves the process to step S157.

At step S157, the data conversion unit 152 determines whether to end the data conversion processing. If the data conversion unit 152 determines that it does not end the data conversion processing, the process returns to step S151 and repeats from step S151. Further, if the data conversion unit 152 determines that it ends the data conversion processing, the data conversion unit 152 performs end processing at step S158 to end the data conversion processing.

The data conversion unit 152 performs the data conversion processing in the above way. Thus, the playback output apparatus 12 can play back the image data recorded on the optical disc 13 and change the system of the image data as necessary to output it. That is, the playback output apparatus 12 can perform more effective playback processing, image audio processing, output processing, and the like based on the rate information recorded on the optical disc 13.

Further, in the record playback system 1 in FIG. 1, the image data and the audio data are provided from the imaging record apparatus 11 to the playback output apparatus 12 through the optical disc 13 which is a record medium; however, the record medium is not limited to the optical disc, but any kind of medium that is, for example, a magnetic record medium such as a magnetic disk or a magnetic tape, a magneto-optical disk, or a semiconductor memory such as a flash memory or a RAM maybe utilized. Further, the image data and the audio data may be transmitted to another apparatus without being recorded. In this case, as shown below (for example, in FIG. 20), by configuring a transmission medium between a transmitting buffer and a receiving buffer such that it is equivalent to the record medium, the REC rate can be defined as in the case of the above explanation.

Figure 20:
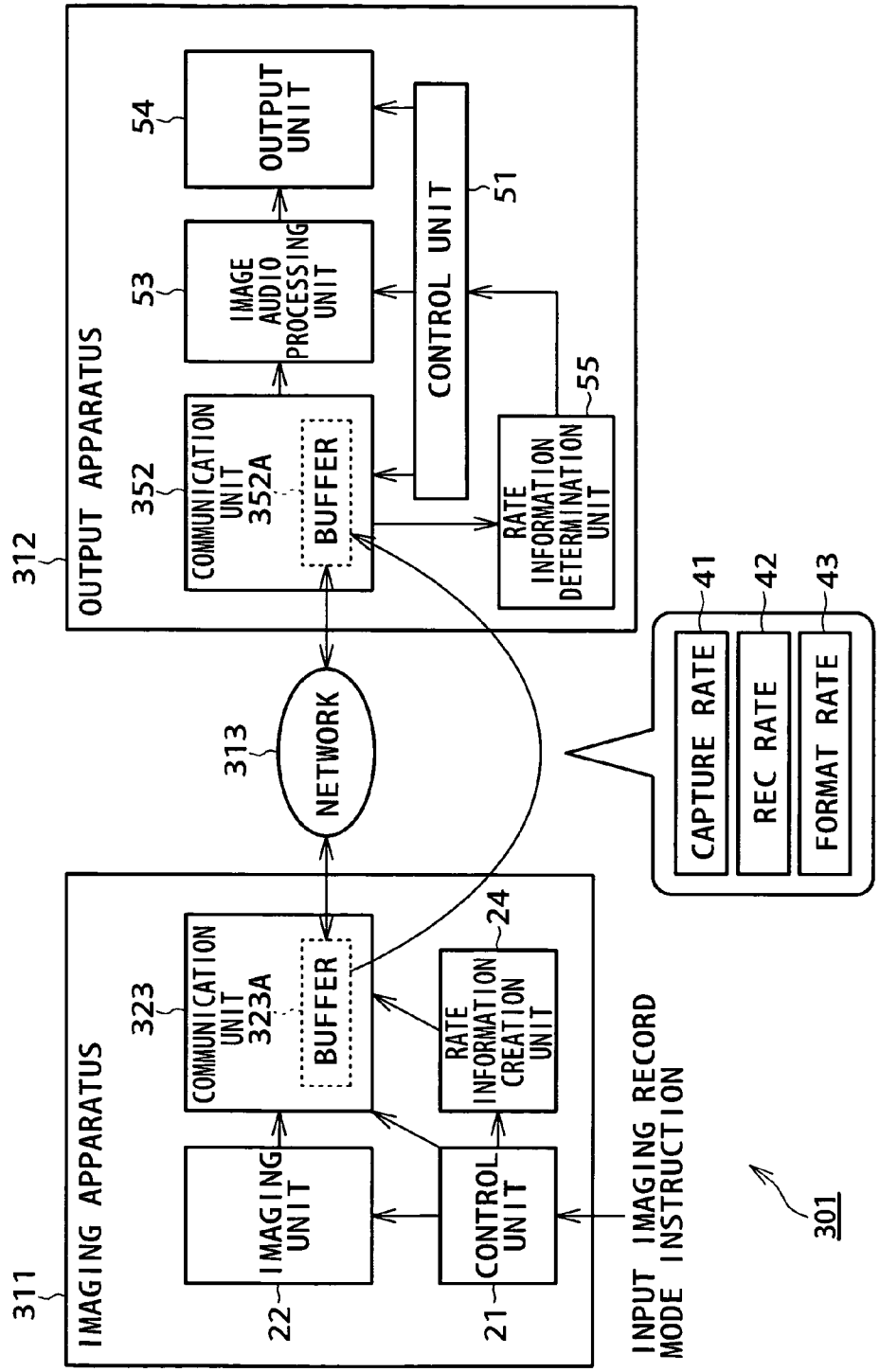
FIG. 20 is a block diagram showing a configuration example of a communication system according to the present invention.

FIG. 20 shows an example of a communication system according to the present invention.

A communication system 301 comprises an imaging apparatus 311 and an output apparatus 312 as shown in FIG. 20. The imaging apparatus 311 is equipped with a communication unit 323 instead of the record unit 23 in the imaging record apparatus 11 in FIG. 1 and connected with the output apparatus 312 through a network 313. The output apparatus 312 is equipped with a communication unit 352 instead of the playback unit 52 in the playback output apparatus 12 in FIG. 1 and connected with the imaging apparatus 311 through the network 313.

The communication unit 323 in the imaging apparatus 311 and the communication unit 352 in the output apparatus 312 include a buffer 323A and a buffer 352A such as RAM respectively. The communication unit 323 in the imaging apparatus 311 stores the image data and the audio data provided from the imaging unit 22 and the rate information etc. provided from the rate information creation unit in the buffer 323A temporarily, and transmits these items of data to the output apparatus 312 at a predetermined communication rate. The data transmitted from the imaging apparatus 311 is provided to the output apparatus 312 through the network 313. The communication unit 352 in the output apparatus 312 receives the provided data and stores it in the buffer 352A temporarily. Further, the communication unit 352 reads out the data and provides it to the image audio processing unit 53 and the rate information determination unit 55 at a predetermined rate as being controlled by the control unit 51.

That is, in a communication system 301, by regarding the transmission medium between the buffer 323A in the communication unit 323 in the imaging apparatus 311 and the buffer 352A in the communication unit 352 in the output apparatus 312 as an equivalent to the record medium in the record playback system in FIG. 1 (the optical disc 13), the same processing as in the record playback system in FIG. 1 can be performed. That is, in the case of the communication system 301 in FIG. 20, the capture rate 41 refers to the data rate at the time of capturing the image (generating the content data) at the imaging unit 22 in the imaging apparatus 311 as in the case of FIG. 1 (i.e., the frame rate or the field rate of the image data obtained by the photoelectric conversion processing). The REC rate 42 refers to the data rate of the image data at the time of storing the image data in the buffer 323A in the communication unit 323 (the data rate at the time of transmitting the content data) (not the transmission rate that indicates the communication speed). The format rate 43 refers to the data rate of the image data at time when the communication unit 352 in the output apparatus 312 reads the image data stored in the buffer 352A and provides it to the image audio processing unit 53 (the frame rate or the field rate, that is, the data rate at the time of the normal playback of the content data). This also applies to the audio data.

Therefore, in the communication system 301 as well, the imaging apparatus 311 provides the output apparatus 312 with the image data and the audio data and also the capture rate, the REC rate, and the format rate which are related to the image data and the audio data. Thus, in the communication system 301, the imaging apparatus 311 can make the output apparatus 312 perform more effective playback processing, image audio processing, output processing, and the like. The output apparatus 312 can perform more effective playback processing, image audio processing, output processing, and the like based on the rate information transmitted from the imaging apparatus 311.

Figure 21:
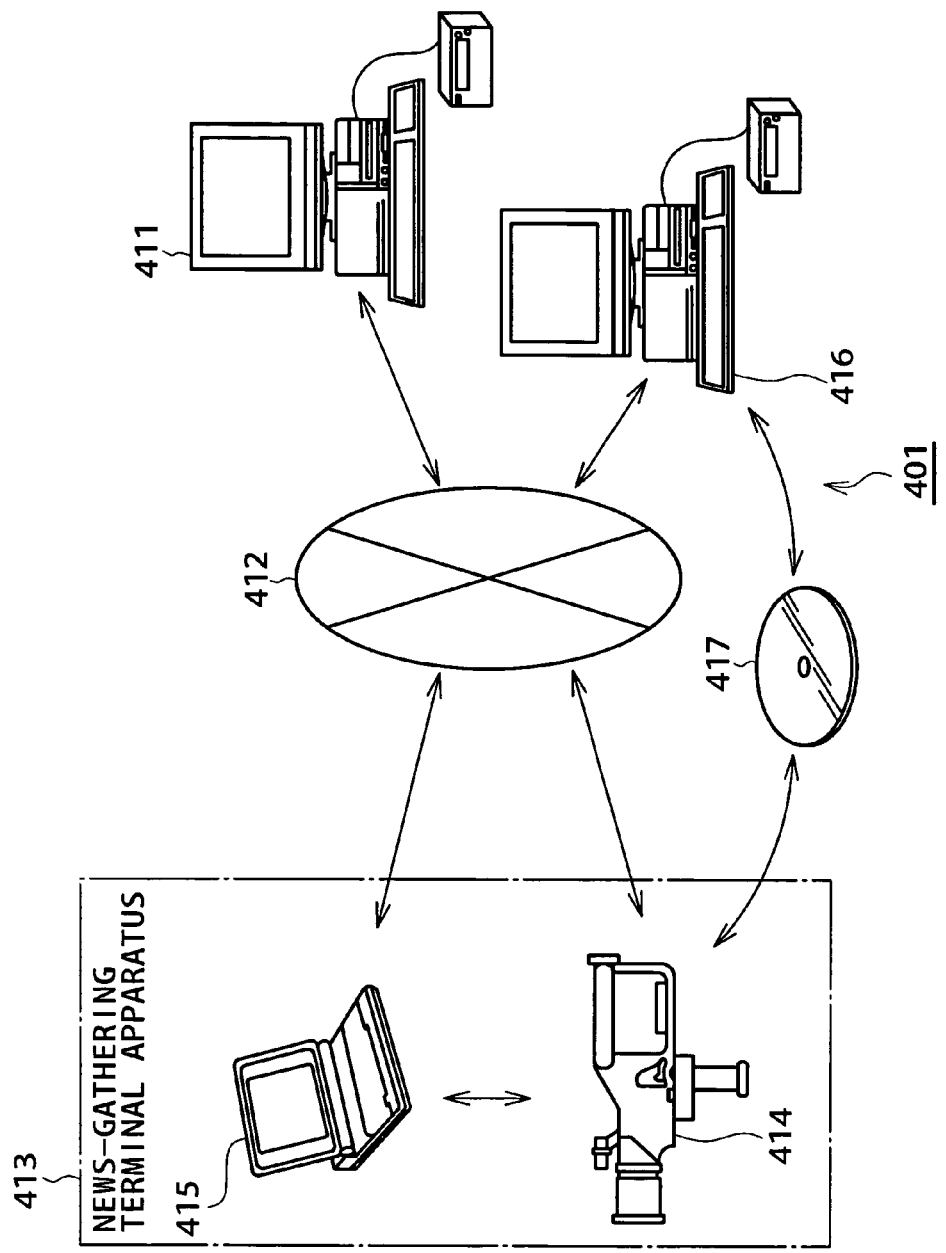
FIG. 21 is a block diagram showing a configuration example of a picture program production support system according to the present invention.

FIG. 21 shows a specific example of a system according to the present invention.

In FIG. 21, a picture program production support system 401 is a system that is set up, for example, in a TV station which broadcasts TV signals, a production company of picture contents such as a video, a movie, etc., and is a system for producing a picture program which is a picture work for a TV program, a movie, etc. The picture program production support system 401 is a system for utilizing metadata that is configured in the form of an electronic file and added to the picture program consistently among a plurality of departments that share the production of the picture program and creating the picture program effectively.

As shown in FIG. 21, the picture program production support system 401 comprises a planning terminal apparatus 411 which plans the picture program; a network 412 which the planning terminal apparatus 411 is connected to; a news-gathering terminal apparatus 413 which is connected to the network 412; an imaging apparatus 414 and a field PC/PDA (Personal Computer/Personal Digital Assistants) 415 (hereinafter referred to as PC 415) which constitute the news-gathering terminal apparatus 413; an editing terminal apparatus 416 which is connected to the network 412; and an optical disc 417 which is a record medium.

The planning terminal apparatus 411 comprises, for example, an information processing apparatus such as a personal computer and its peripheral apparatus, and is set up at a planning structuring department or the like which plans the picture program. The planning structuring department is a department that controls the whole production of the picture program and instructs other departments such as a news-gathering department and an editorial department (later described) on the production work, as well as planning the picture program to be produced to write a scenario for the picture program. The planning terminal apparatus 411 performs processing such as creating structure-list metadata of each picture program which includes policy instruction information corresponding to the scenario for the picture program and is formed in an electronic file. The planning terminal apparatus 411 provides the created structure-list metadata to the news-gathering terminal apparatus 413 and the like through the network 412. By this processing, the planning structuring department instructs the news-gathering department etc. on scenes and contents to be collected or imaged.

The news-gathering terminal apparatus 413 is a group of terminal apparatuses used by the news-gathering department which collects news materials. The news-gathering terminal apparatus 413 comprises the imaging apparatus 414 and the PC 415 for example. The news-gathering department is a department which actually collects news materials at the scene according to a production instruction or a scenario from the planning structuring department for example and collects imaging situations as well as imaging each scene picture constituting the picture program.

The imaging apparatus 414 is a video camera such as a camcorder (registered trademark) and is used for news gathering for broadcasting news programs, imaging sports games, and imaging picture contents such as movies. The imaging apparatus 414 is connected to the network 412 and acquires structure-list metadata from, for example, the planning terminal apparatus 411 through the network 412. Further, the imaging apparatus 414 displays the acquired structure-list metadata on a predetermined display unit to make imaging staff such as cameramen recognize the details to be imaged. Furthermore, the imaging apparatus 414 is operated by the imaging staff and images respective scenes that constitute the picture program based on the production instruction information of the acquired structure-list metadata. Moreover, the imaging apparatus 414 records the image data and the audio data obtained by the imaging onto a record medium such as the optical disc 417.

Further, the imaging apparatus 414 can record not only the original image data obtained by the imaging for example but also low resolution image data onto the optical disc 417. Since the original image data is a large amount of data but high-quality image data, it is used for a finished product of the picture program. On the other hand, the low resolution image data is image data that is generated with pixels of each frame thinned out from the original image data and corresponds to an image of frames of fewer pixels. Further, the low resolution image data may be encoded in MPEG4 format for example. The low resolution image data is a low quality image compared to the original image data. However, since the data amount is small, the load of processing such as transmission and playback is light, so that the low resolution image data is mainly used for rough edit processing and the like.

Further, the imaging apparatus 414 records the rate information such as the capture rate, the REC rate, and the format rate onto the optical disc 417, as in the case of the imaging record apparatus 11 in FIG. 1.

The optical disc 417 on which the image data, the audio data, and the like are recorded is conveyed to the editorial department, the field PC 415, etc. to be utilized. However, since it takes some time to convey the optical disc 417, the imaging apparatus 414 may provide the picture content to the planning terminal apparatus 411, the field PC 415, the editing terminal apparatus 416, etc. through the network 412. In this case, it is desirable for the imaging apparatus 414 to provide the low resolution image data which has a small data amount and corresponds to the original image data, instead of the image data obtained by the imaging in order to reduce the transfer time (reduce the load of transfer processing).

As in the case of the imaging apparatus 311 in FIG. 20, the imaging apparatus 414 may transmit the rate information such as the capture rate, the REC rate, and the format rate through the network 412 to the planning terminal apparatus 411, the field PC 415, the editing terminal apparatus 416, etc. which the picture content etc are sent to.

Further, the transfer processing of the low resolution image data by the imaging apparatus 414 may be performed with any timing. It may be performed in parallel with the imaging processing or may be performed by one operation after the completion of the imaging processing. Furthermore, the transfer processing of the rate information such as the capture rate, the REC rate, and the format rate may also be performed with any timing. However, it is desirable for the rate information to be transmitted along with the image data corresponding to the rate information or ahead of it.

Thus, by transferring the low resolution image data before conveying the optical disc 417, the editorial department can edit it at a comparatively early stage (for example, at the same time as the imaging processing) before the optical disc 417 arrives, so that production efficiency of the picture program can be improved. Further, in the case where the low resolution image data is transmitted through the network 412 as described above, for example, the imaging apparatus 414 may record only the original image data and audio data onto the optical disc 417 (the imaging apparatus 414 may not record the low resolution image data onto the optical disc 417).

Further, the record medium on which the imaging apparatus 414 records the picture content and the like is not limited to the optical disc 417, but any kind of medium may be utilized. For example, a magneto-optical disk such as an MD (Mini-Disc) (registered trademark) and an MO (Magneto Optical disk), a magnetic disk such as a flexible disk, a magnetic tape used for a DV (Digital Video) and VHS (Video Home System), and a semiconductor memory such as a flash memory may be utilized.

The field PC 415 comprises a portable information processing apparatus such as a notebook personal computer and a PDA, and the peripheral apparatus, etc. The field PC 415 is connected with the imaging apparatus 414 through various kinds of wire or wireless lines, and can share, for example, the structure-list metadata and the picture content with the imaging apparatus 414.

The field PC 415 acquires, for example, the structure-list metadata from the planning terminal apparatus 411 through the network 412 and acquires the structure-list metadata from the imaging apparatus 414. The field PC 415 displays the acquired structure-list metadata on a predetermined display unit to make a person in the news-gathering department recognize the details to be collected or imaged.

Further, the field PC 415 creates imaging state information which is information regarding news gathering and imaging state based on input by the person in the news-gathering department who is a user of the PC 415, and adds the created imaging state information to the relevant space in the structure-list metadata. The imaging state information is text data that is, for example, described from various viewpoints for each take and for each news-gathering spot, and it is useful information at the time of the edit processing. Thus, the field PC 415 edits the structure-list metadata by writing the imaging state information. Further, the field PC 415 provides the imaging state information to the imaging apparatus 414 as the metadata to add it to the image data and the audio data obtained at the imaging apparatus 414.

The editing terminal apparatus 416 comprises an information processing apparatus such as a personal computer and the peripheral apparatus and is set up in the editorial department which edits the picture content. The editorial department is a department which edits the image data and the audio data obtained from the imaging apparatus 414 on the basis of the structure-list metadata which reflects the production instruction and the scenario by the planning structuring department and the new-gathering state in the news-gathering department and completes the picture program.

The editing terminal apparatus 416 acquires, for example, the structure-list metadata and the low resolution image data from the imaging apparatus 414 through the network 412. Further, the editing terminal apparatus 416 acquires the original image data and audio data from the optical disc 417 on which the image data and the audio data are recorded at the imaging apparatus 414. Furthermore, the editing terminal apparatus 416 can acquire also a direct production instruction (an instruction regarding the edit) from the planning terminal apparatus 411, the field PC 415, or the like through the network 412. Furthermore, the editing terminal apparatus 416 acquires the rate information as well as the above data and utilizes these items of information at the time of playing back the image data and the audio data in the same way as in the playback output apparatus 12 to perform more effective playback processing and output processing. For example, the editing terminal apparatus 416 displays the image for displaying the rate information as well as the image displayed on the monitor to present it to the user, and thereby can offer information that supports the edit processing by the user. Moreover, for example, in the case where the image data is the PSF-system data, by converting the image data from the interlaced mode to the progressive mode and then outputting it, the editing terminal apparatus 416 can offer an optimum output image to the user.

The editing terminal apparatus 416 appropriately plays back the acquired picture content to display it based on the acquired structure-list metadata. For example, the editing terminal apparatus 416 is operated by the user to display the acquired low resolution image data through the network 412 and the original image data and audio data recorded on the optical disc 417 continuously in the order according to the scenario and to display only the image data of the desired clip. Further, in the case of playing back the original image data recorded on the optical disc 417, the editing terminal apparatus 416 utilizes a disk apparatus or the like which is a record playback apparatus that reads out data recorded on the optical disc 417 and writes data onto the optical disc 417.

Further, for example, the editing terminal apparatus 416 performs the edit processing of the image data etc. obtained by the news gathering as well as playing back and displaying, based on the structure-list metadata, the required image data etc. in the appropriate order. The edit processing includes rough edit processing and main edit processing.

The rough edit processing is simple edit processing for the image data and the audio data. For example, in the rough edit processing, in the case where the editing terminal apparatus 416 acquires multiple pieces of data regarding the picture content including the image data, the audio data, etc. which data corresponds to a clip which is a unit representing one imaging processing (which data is hereinafter referred to as clip data), the editing terminal apparatus 416 selects clip data to be used in the main edit processing out of these multiple pieces of clip data and further selects a required picture portion (Logging) and sets an edit start point (In point) and an edit end point (Out point) corresponding to the selected picture portion using e.g. a time code and extracts the corresponding portion out of the above clip data (Ingesting).

Further, the clip is a unit that refers to time from imaging start to imaging end of the imaging processing as well as one imaging processing and refers to also length of each data obtained by the image processing and refers to also data amount of each data obtained by the image processing. Furthermore, the clip may refer to an aggregate itself of each data.

The main edit processing is processing for connecting each clip data which the rough edit processing is performed for and performing a final image quality adjustment etc. for the image data to create complete package data for broadcasting it in a TV program.

Further, each apparatus such as the planning terminal apparatus 411, the imaging apparatus 414, the field PC 415, the editing terminal apparatus 416, etc. may be configured in a plurality of pieces. For example, one editing terminal apparatus 416 may acquire the image data etc. obtained by a plurality of imaging apparatuses 414, through the optical disc 417 or the network 412, and may perform the edit processing for the data. A plurality of editing terminal apparatuses 416 may edit the data provided from one imaging apparatus 414.

Furthermore, it is explained that each apparatus such as the planning terminal apparatus 411, the imaging apparatus 414, the field PC 415, the editing terminal apparatus 416, etc. is configured as a separate unit; however, it is not limited to this configuration, but a part or whole of functions of each apparatus may be integrated with each other.

Furthermore, for example, the picture program production support system 401 may be configured as a client server system in which a center server (not shown) which is different from the planning terminal apparatus 411, the imaging apparatus 414, the field PC 415, and the editing terminal apparatus 416 and is connected to the network 412 is set up and the planning terminal apparatus 411, the imaging apparatus 414, the field PC 415, the editing terminal apparatus 416, etc. are utilized as clients.

As described above, the present invention can also apply to a support system for producing a picture program such as a TV program.

Furthermore, each unit in the imaging record apparatus 11 and in the playback output apparatus 12 in FIG. 1 may be configured as a separate unit, so that the imaging record apparatus 11 may be an imaging record system which comprises al plurality of apparatuses, and the playback output apparatus 12 may be a playback output system which comprises a plurality of apparatuses.

Figure 22:
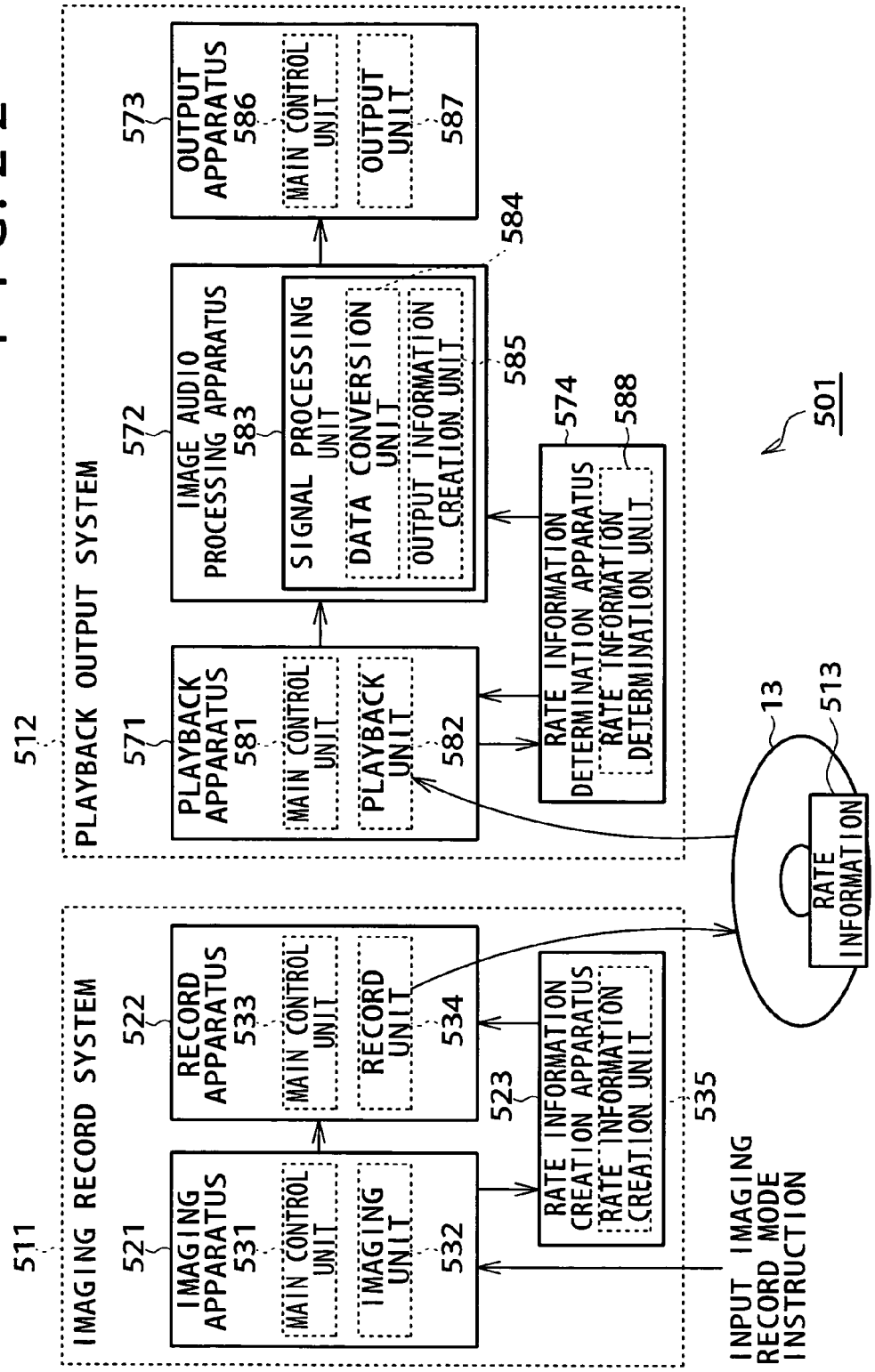
FIG. 22 is a block diagram showing another configuration example of a record playback system according to the present invention.

FIG. 22 shows another example of a record playback system according to the present invention.

As shown in FIG. 22, the record play back system 501 comprises two systems that are an imaging record system 511 which records the image data, the audio data, and the like on the record medium and a playback output system 512 which plays back and outputs the image data, the audio data, and the like recorded on the record medium.

The imaging record system 511 corresponds to the imaging record apparatus 11 in FIG. 1. The imaging record system 511 comprises an imaging apparatus 521 which images the subject; a record apparatus 522 which records the image data, the audio data, and the like obtained at the imaging apparatus 521 onto the optical disc 13; and a rate information creation apparatus 523 which creates the rate information at the imaging apparatus 521 and the record apparatus 522.

The imaging apparatus 521 has a main control unit 531 which controls each unit of the imaging apparatus 521 and an imaging unit 532 which images the subject, and corresponds to the imaging unit 22 in the imaging record apparatus 11 shown in FIG. 2. The imaging apparatus 521 has the configuration similar to that of the imaging unit 22 basically except having the main control unit 531 in order to be independent as an apparatus, and performs the same processing as in the imaging unit 22. The record apparatus 522 has a main control unit 533 which controls each unit of the record apparatus 522 and a record unit 534 which records the image data, the audio data, and the like obtained at the imaging unit onto the optical disc 13, and corresponds to the record unit 23 in the imaging record apparatus 11 shown in FIG. 2. The record apparatus 522 has the configuration similar to that of the record unit 23 basically except having the main control unit 533 in order to be independent as an apparatus, and performs the same processing as in the record unit 23. The rate information creation apparatus 523 has a rate information creation unit 535 which creates rate information, and corresponds to the rate information creation unit 24 in the imaging record apparatus 11 shown in FIG. 2.

In the imaging record system 511, the user who operates the imaging apparatus 521 inputs an input imaging record mode instruction to the imaging apparatus 521, and the imaging apparatus 521 determines an imaging record mode based on the input imaging record mode instruction and the retained apparatus information. The information regarding the imaging record mode is provided to the rate information creation apparatus 523 as well as being used for operation control of the imaging apparatus 521 and the record apparatus 522. The rate information creation apparatus 523 creates the rate information based on the information and provides it to the record apparatus 522. The record apparatus 522 records the provided rate information onto the optical disc 13 as rate information 513.

The playback output system 512 corresponds to the playback output apparatus 12 in FIG. 1. The playback output system 512 comprises a playback apparatus 571 which reads out and plays back the image data, the audio data, and the like recorded on the optical disc 13; an image audio processing apparatus 572 which performs predetermined processing on the image data, the audio data, and the like played back by the playback apparatus 571; an output apparatus 573 which outputs the image data and the audio data processed in the image audio processing apparatus 572; and a rate information determination apparatus 574 which determines each determination processing based on the rate information 513 which is recorded on the optical disc 13 and read out by the playback apparatus 571.

The playback apparatus 571 has a main control unit 581 which controls each unit of the playback apparatus 571 and a playback unit 582 which performs playback processing, and corresponds to the playback unit 52 in the playback output apparatus 12 shown in FIG. 3. The playback apparatus 571 has the configuration similar to that of the playback unit 52 basically except having the main control unit 581 in order to be independent as an apparatus, and performs the same processing as in the playback unit 52. The image audio processing apparatus 572 has signal processing unit 583 which performs image audio processing, and corresponds to the image audio processing unit 53 in the playback output apparatus 12 shown in FIG. 3. The image audio processing apparatus 572 has the configuration similar to that of the image audio processing unit 53 basically, and performs the same processing as in the image audio processing unit 53. Further, the signal processing unit 583 has a data conversion unit 584 and an output information creation unit 585 as in the signal processing unit 151 in FIG. 3. The output apparatus 573 has a main control unit 586 which controls each unit of the output apparatus 573 and an output unit 587 which performs output processing, and corresponds to the output unit 54 in the playback output apparatus 12 shown in FIG. 3. The output apparatus 573 has the configuration similar to that of the output unit 54 basically, and performs the same processing as in the output unit 54. The rate information determination apparatus 574 has a rate information determination unit 588 which determines each mode based on the rate information read by the playback apparatus 571 and provides the image audio processing apparatus 572 with the determination result, the rate information, and the like.

In the playback output system 512, the playback apparatus 571 in which the optical disc 13 is mounted on a drive (not shown) reads out the rate information 513 recorded on the record medium and provides it to the rate information determination apparatus 574. The rate information determination apparatus 574 determines modes of the playback processing and the output processing based on the rate information and provides setting information regarding the playback and the output to the image audio processing apparatus 572. The image audio processing apparatus 572 performs processing on the image data and the audio data based on the setting information, and the output apparatus 573 outputs the image data and the audio data.

Figure 23:
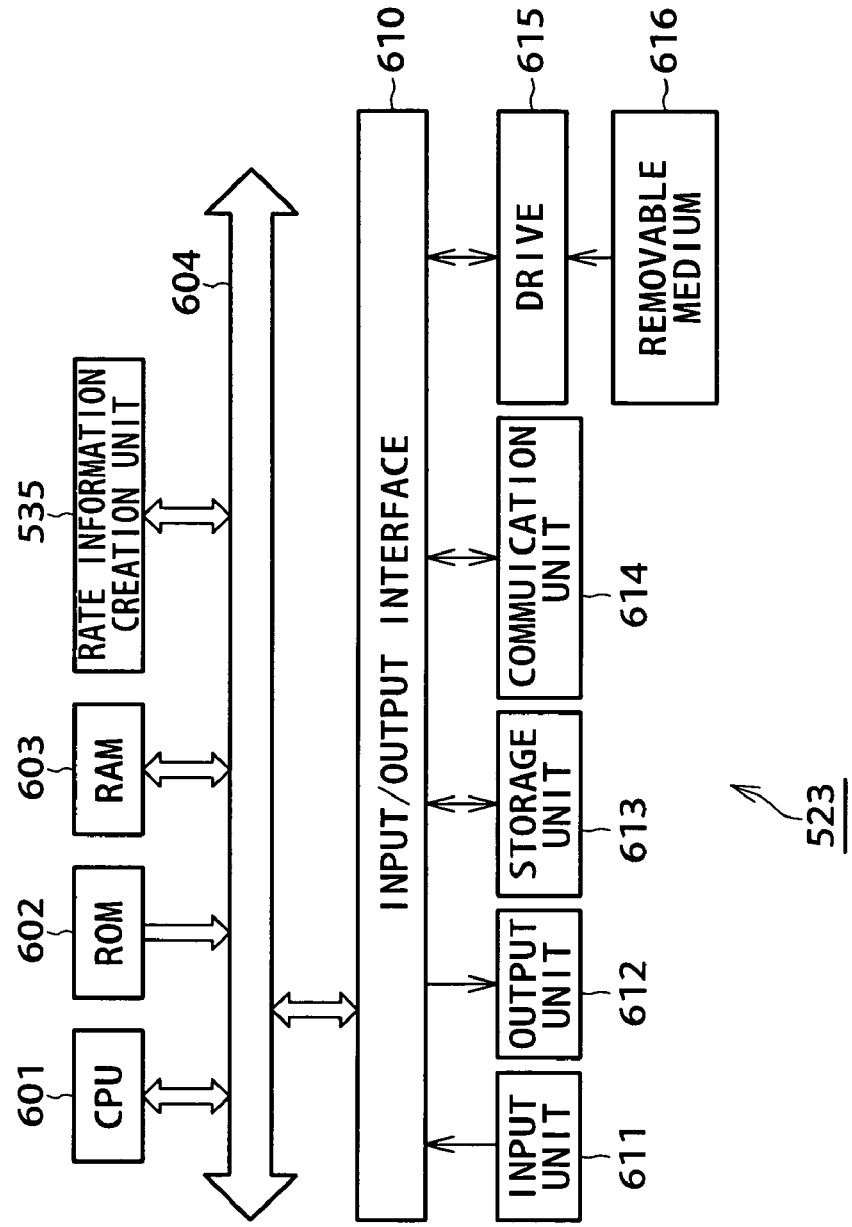
FIG. 23 is a block diagram showing a configuration example of a rate information creation apparatus in FIG. 22.

FIG. 23 is a block diagram showing a detailed configuration example of the rate information creation apparatus 523 in the imaging record system 511.

In FIG. 23, a CPU (Central Processing Unit) 601 in the rate information creation apparatus 523 performs each processing according to a program stored in a ROM 602. Data and a program that are required for the CPU 601 to perform each processing are stored in a RAM 603 as necessary.

The CPU 601, the ROM 602, and the RAM 603 are interconnected via a bus 604. Further, the rate information creation unit 535 is connected to the bus 604. The rate information creation unit 535 has the configuration similar to that of the rate information creation unit 24 in the imaging record apparatus 11 as described with reference to FIG. 1 and FIG. 2 and performs the same processing to create the rate information such as the capture rate, the REC rate, the format rate, and the like.

Further, an input/output interface 610 is connected to the bus 604.

An input unit 611 comprising a keyboard and a mouse is connected to the input/output interface 610, and outputs a signal inputted into the input unit 611 to the CPU 601. Further, an output unit 612 comprising a display, a speaker, etc. is connected to the input/output interface 610.

Further, a storage unit 613 comprising a hard disk etc. and a communication unit 614 which performs data communication of the rate information etc. with the imaging apparatus 521 and the record apparatus 522 are connected to the input/output interface 610. A drive 615 reads data from and writes data to a removable medium 616 comprising a record medium such as a magnetic disk, an optical disc, a magneto-optical disk, a semiconductor memory, or the like.

When the information such as the apparatus information, the input imaging record mode instruction, etc. is provided from the imaging apparatus 521 through the communication unit 614, the CPU 601 controls each unit to provide the information to the rate information creation unit 535. The rate information creation unit 535 performs the rate information creation processing as described with reference to the flowchart in FIG. 13 and obtains the capture rate, the REC rate, and the format rate based on the provided information, and provides the rate information to the record apparatus 522 through the communication unit 614.

Figure 24:
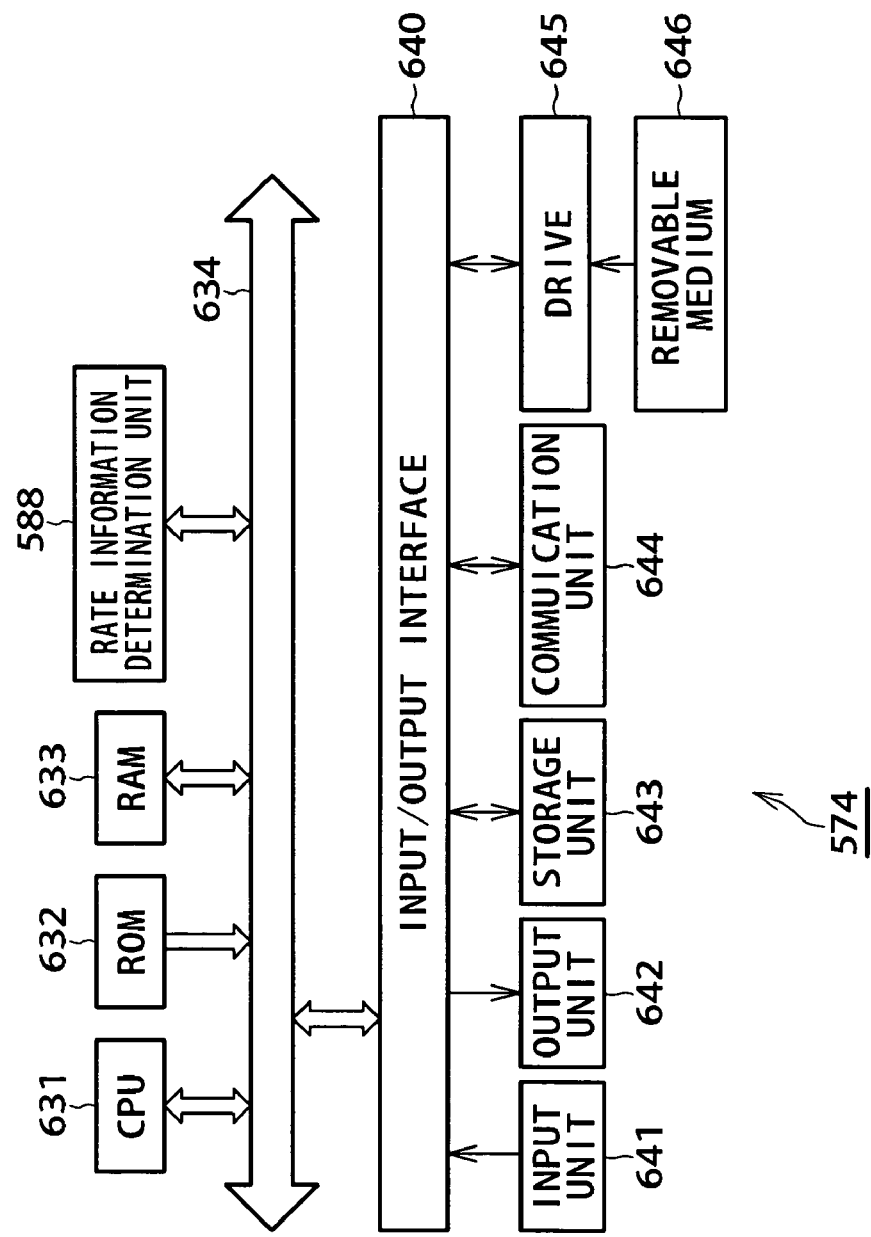
FIG. 24 is a block diagram showing a configuration example of a rate information determination apparatus in FIG. 22.

FIG. 24 is a block diagram showing a detailed configuration example of the rate information determination apparatus 574 in the playback output system 512 in FIG. 22.

In FIG. 24, a CPU (Central Processing Unit) 631 in the rate information determination apparatus 574 performs each processing according to a program stored in a ROM 632. Data and a program that are required for the CPU 631 to perform each processing are stored in a RAM 633 as necessary.

The CPU 631, the ROM 632, and the RAM 633 are interconnected via a bus 634. Further, the rate information determination unit 588 is connected to the bus 634. The rate information determination unit 588 has the configuration similar to that of the rate information determination unit 55 in the playback output apparatus 12 as described with reference to FIG. 1 and FIG. 3 and performs the same processing to determine a mode such as the system mode and the speed mode based on the rate information read from the optical disc 13 at the playback apparatus 571 and also determine whether to make the image audio processing apparatus 572 perform data conversion on the image data.

Further, an input/output interface 640 is connected to the bus 634.

An input unit 641 comprising a keyboard and a mouse is connected to the input/output interface 640, and outputs a signal inputted into the input unit 641 to the CPU 631. Further, an output unit 642 comprising a display, a speaker, etc. is connected to the input/output interface 640.

Further, a storage unit 643 comprising a hard disk etc. and a communication unit 644 which performs data communication of the rate information, the playback output control setting, etc. with the playback apparatus 571 and the image audio processing apparatus 572 are connected to the input/output interface 640. A drive 645 reads data from and writes data to a removable medium 646 comprising a record medium such as a magnetic disk, an optical disc, a magneto-optical disk, a semiconductor memory, or the like.

When the playback apparatus 571 reads out the rate information 513 recorded on the optical disc 13 and provides it to the communication unit 644 in the rate information determination apparatus 574, the CPU 631 controls each unit to provide the provided information to the rate information determination unit 588. The rate information determination unit 588 determines modes of the playback processing and the output processing and determines whether to perform data conversion on the played-back image data, based on the provided rate information. Further, the rate information determination unit 588 provides the determination result to the playback apparatus 571 and the image audio processing apparatus 572 through the communication unit 644. The playback apparatus 571 and the image audio processing apparatus 572 perform the playback processing and the signal processing based on the information.

Figure 25:
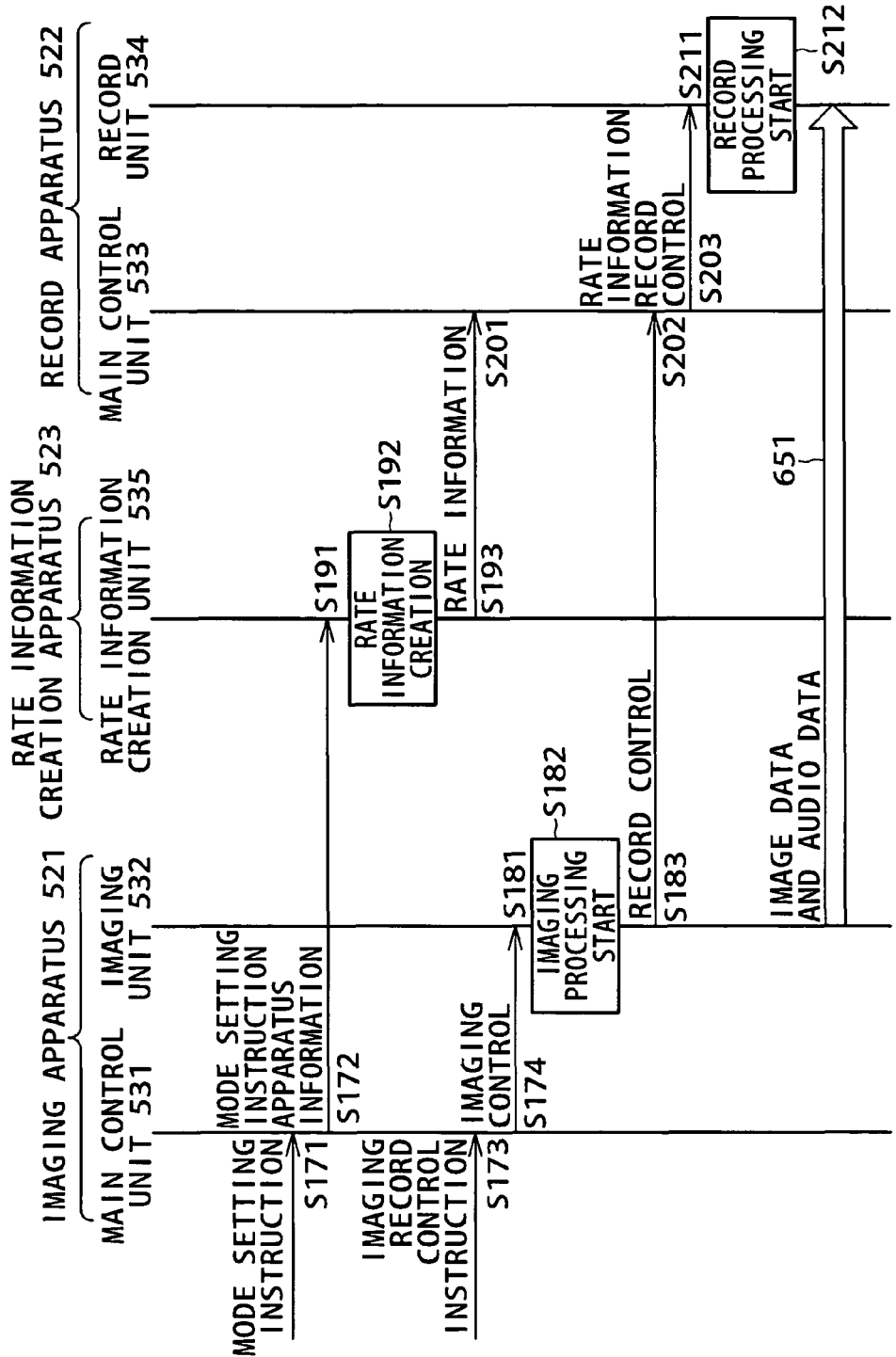
FIG. 25 is a flowchart explaining a flow of processing performed at an imaging record system in FIG. 22.

Next, a flow of imaging record processing at the imaging record system 511 in the record playback system 501 in FIG. 22 will be described with reference to a flowchart in FIG. 25. Basically, the processing is similar to that of the record playback system 1 in FIG. 1. In FIG. 25, only processing performed by main processing units in each apparatus will be described. For example, the communication unit in each apparatus actually sends and receives data between apparatuses; however, the communication unit only performs processing of sending and receiving data and is not so related to the point of the present invention; therefore, a description of this kind of processing is omitted here.

When the user who operates the imaging apparatus 521 inputs a mode setting instruction, the main control unit 531 in the imaging apparatus 521 accepts the instruction at step S171 and provides the inputted mode setting instruction and the apparatus information stored in the ROM beforehand to the rate information creation unit 535 in the rate information creation apparatus 523 at step S172. Upon acquiring these items of information at S191, the rate information creation unit 535 performs rate information creation processing at step S192 as described with reference to the flowchart in FIG. 13 to create the capture rate, the REC rate, and the format rate based on the provided information. At step 193, the rate information creation unit 535 provides the created rate information to the main control unit 533 in the record apparatus 522. At step S201, the main control unit 533 in the record apparatus 522 acquires the rate information.

Further, when the user who operates the imaging apparatus 521 inputs an imaging record control instruction, the main control unit 531 in the imaging apparatus 521 receives the instruction at step S173, and provides the inputted imaging record control instruction to the imaging unit 532 at step S174. Upon acquiring the imaging record control instruction at step S181, the imaging unit 532 initiates imaging processing at step S182. Further, the imaging unit 532 provides a record control instruction to the main control unit 533 in the record apparatus 522 at step S183. Upon acquiring the record control instruction at step S202, the main control unit 533 in the record apparatus 522 provides the record control instruction and the rate information to the record unit 534 at step S203. Upon acquiring these items of information at step S211, the record unit 534 initiates record processing according to the record control at step S212 and records the image data and the audio data provided from the imaging unit 532 as shown by an arrow 651 onto the optical disc 13 and also records information regarding the rate information corresponding to these items of data onto the optical disc 13.

In the imaging record system 511, besides the image data and the audio data, the rate information corresponding to these items of data is recorded on the optical disc 13 in the above way.

As described above, the imaging record system 511 records the image data and the audio data onto the optical disc 13, and records also the capture rate, the REC rate, and the format rate corresponding to these items of data. By this processing, the imaging record system 511 can provide the rate information to the playback output system 512. That is, the playback output system 512 can perform more effective playback processing, signal processing, and output processing.

Figure 26:
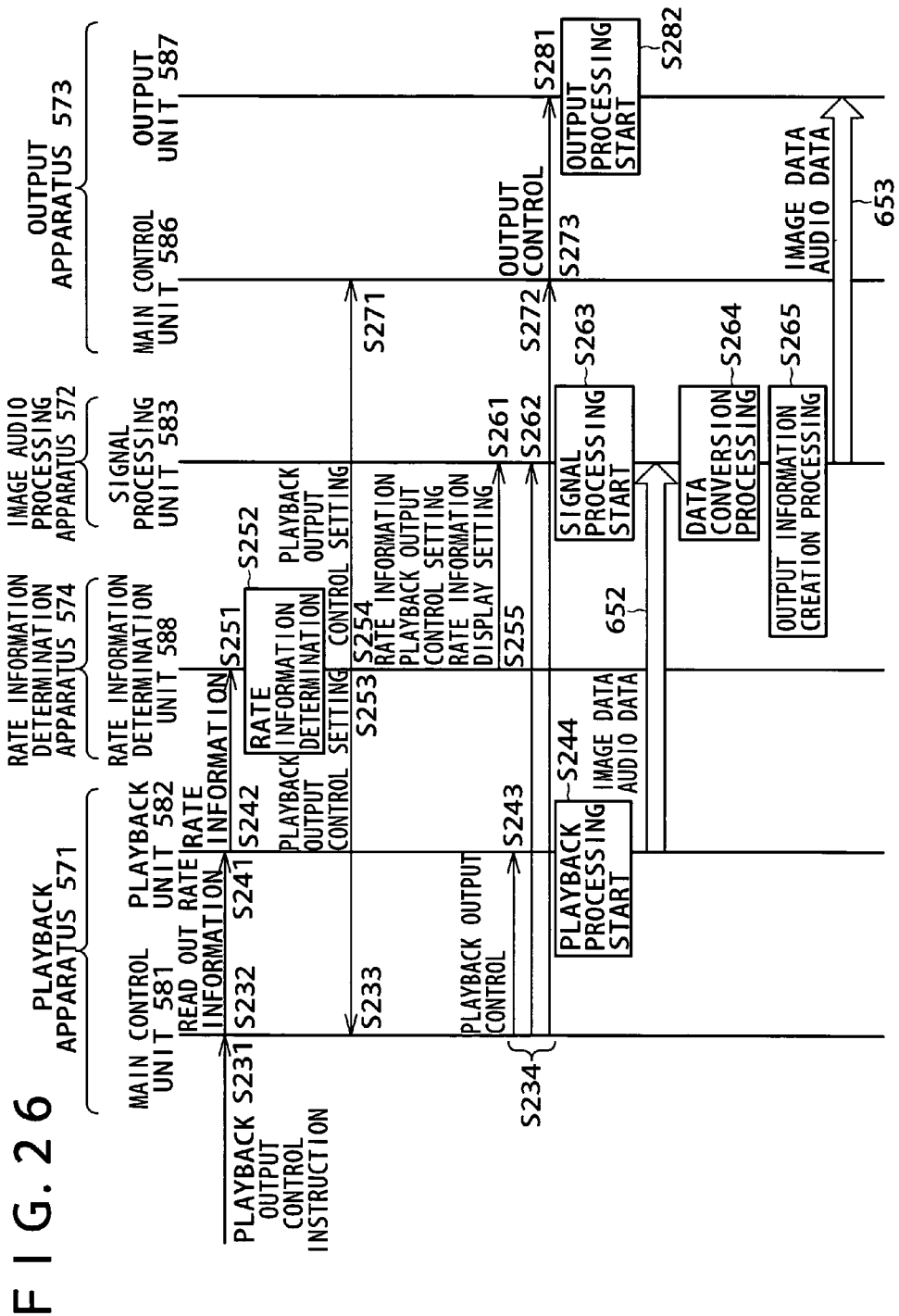
FIG. 26 is a flowchart explaining a flow of processing performed at a playback output system in FIG. 22.

Next, a flow of playback output processing at the playback output system 512 in the record playback system 501 will be described with reference to a flowchart in FIG. 26. Basically, the processing is similar to that of the record playback system 1 in FIG. 1. In FIG. 26, as in the case of FIG. 25, only processing performed by main processing units in each apparatus will be described.

When the user who operates the playback apparatus 571 inputs a playback output control instruction, the main control unit 581 in the playback apparatus 571 accepts the instruction at step S231 and requests the playback unit 582 at step S232 to read out the rate information based on the instruction. Upon acquiring the request at step S241, the playback unit 582 reads the rate information from the optical disc 13 and provides the read rate information to the rate information determination unit 588 in the rate information determination apparatus 574 at step S242. Upon acquiring the rate information at step S251, the rate information determination unit 588 performs rate information determination processing at step S252 based on the acquired rate information. Further, the rate information determination unit 588 provides a playback output control setting which is set based on the determination result to the main control unit 581 in the playback apparatus 571 at step S253 and also to the main control unit 586 in the output apparatus 573 at step S254. The main control unit 581 in the playback apparatus 571 acquires the playback output control setting at step S233. The main control unit 586 in the output apparatus 573 acquires the playback output control setting at step S271. Further, at step S255, the rate information determination unit 588 provides the rate information, the playback output control setting, a rate information display setting, etc. to the signal processing unit 583 in the image audio processing apparatus 572. The signal processing unit 583 acquires these items of information at step S261.

Further, at step S234, the main control unit 581 in the playback apparatus 571 provides playback output control to the playback unit 582, the signal processing unit 583 in the image audio processing apparatus 572, and the main control unit 586 in the output apparatus 573, and instructs each unit to initiate each processing. Upon acquiring the instruction at step S243, the playback unit 582 initiates playback processing at step S244 and provides the image data and the audio data recorded on the optical disc 13 to the signal processing unit 583 in the image audio processing apparatus 572 as shown by an arrow 652.

Upon acquiring the playback output control from the playback apparatus 571 at step S262, the signal processing unit 583 in the image audio processing apparatus 572 initiates signal processing at step S263 based on the playback output control. Further, at step S264, the signal processing unit 583 performs data conversion processing as necessary based on the rate information and the playback output control setting acquired at step S261. Furthermore, the signal processing unit 583 moves the process to step S265 where the signal processing unit 583 performs output information creation processing based on the rate information display setting acquired at step S261 and creates an image for displaying the rate information as necessary and superimposes it on an outputting image. After the above processing, the signal processing unit 583 provides the outputting image data and audio data to the output unit 587 in the output apparatus 573 as shown by an arrow 653.

Upon acquiring at step 272 the playback output control provided from the main control unit 581 in the playback apparatus 571, the main control unit 586 in the output apparatus 573 provides the output control to the output unit 587 at step S273. Upon acquiring the output control at step S281, the output unit 587 initiates output control processing based on the output control and, as shown by the arrow 653, outputs the outputting image data and audio data provided from the signal processing unit 583.

Thus, the playback output system 512 can control the playback processing, the signal processing, and the output processing based on the capture rate, the REC rate, and the format rate which are recorded on the optical disc 13 along with the image data and the audio data. By this processing, the playback output system 512 can display the rate information, and can convert the image data from the interlace system to the progressive system to out put it in the case where the played-back image data is the PSF-system data. That is, the playback output system 512 can perform more effective playback processing, signal processing, and output processing.

As described above, each unit in the imaging record apparatus 11 and in the playback output apparatus 12 in FIG. 1 can be configured as a separate unit; however, the configuration is not limited to the example of FIG. 22, but other configurations may be applied.

Figure 27A:
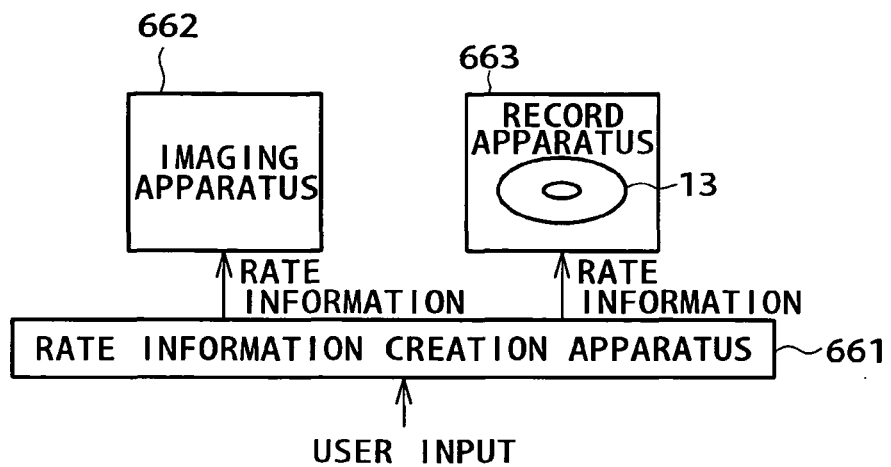
FIGS. 27A to 27C are block diagrams explaining another group of configuration examples of an imaging record system in FIG. 22.

For example, as shown in FIG. 27A, the imaging record system 511 may comprise a rate information creation apparatus 661 which receives the user input, an imaging apparatus 662 which images the subject, a record apparatus 663 which records the image data and the audio data obtained at the imaging apparatus 662 onto the optical disc 13. In this case, the rate information creation apparatus 661 creates the rate information based on the user input regarding the imaging record mode and provides the rate information to the imaging apparatus 662 and the record apparatus 663. The imaging apparatus 662 and the record apparatus 663 performs the imaging processing and the record processing respectively based on the provided rate information.

Figure 27B:
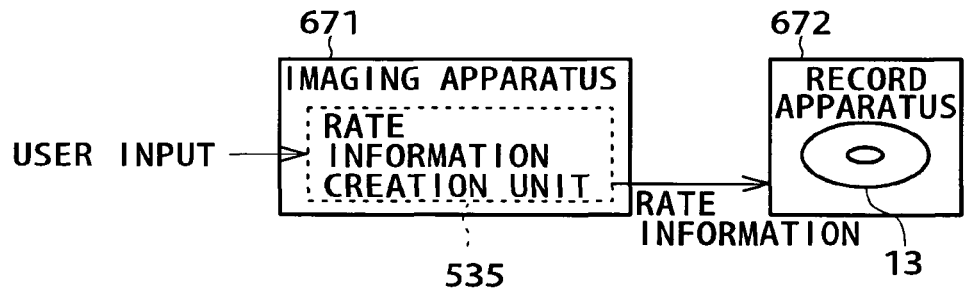

Further, for example, as shown in FIG. 27B, the imaging apparatus may include the rate information creation unit. In FIG. 27B, an imaging apparatus 671 has a rate information creation unit 535. That is, in this case, the rate information is created in the imaging apparatus 671 and provided to a record apparatus 672.

Figure 27C:
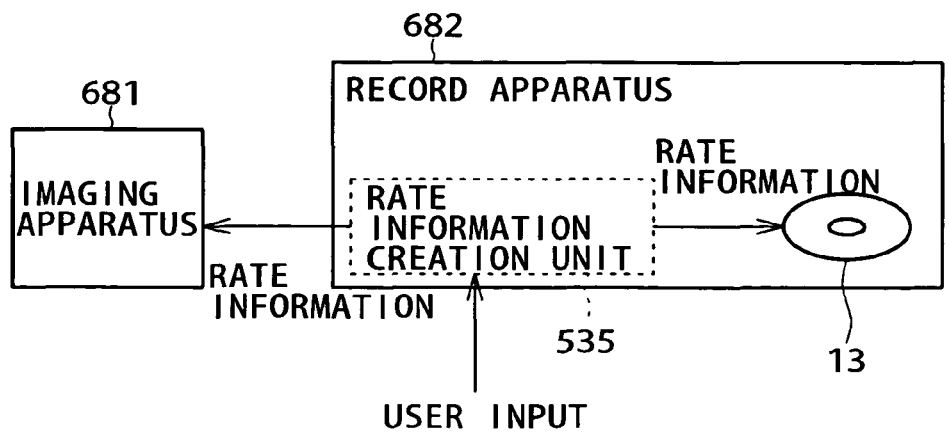

Furthermore, for example, as shown in FIG. 27C, the record apparatus may include the rate information creation unit. In FIG. 27C, a record apparatus 682 has the rate information creation unit 535. That is, in this case, the rate information is created in the record apparatus 682 and provided to an imaging apparatus 681.

In the same way, the configuration of the playback output system 512 also is not limited to the example of FIG. 22, but other configurations may be applied.

Figure 28A:
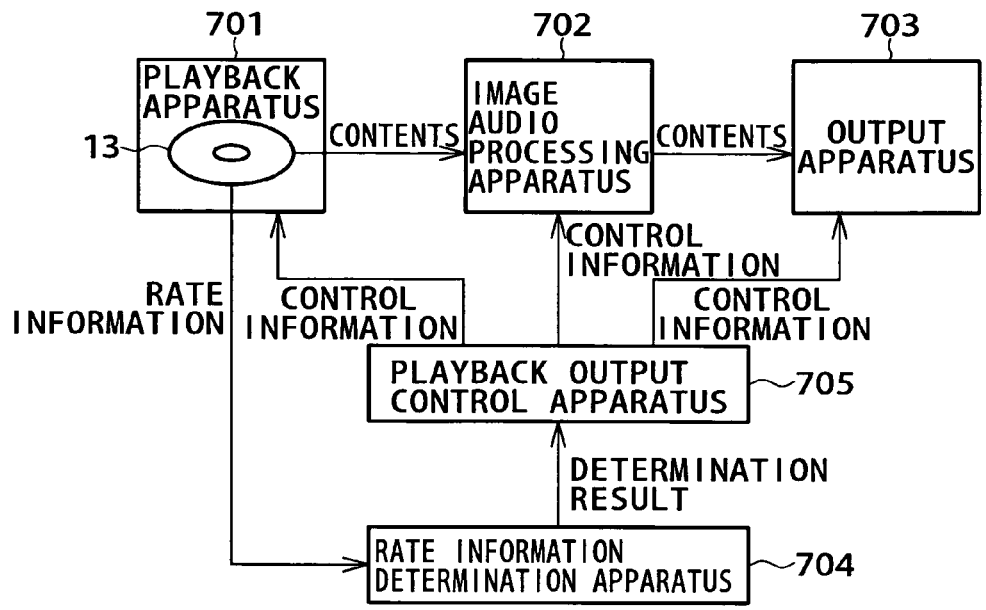
FIGS. 28A to 28C are block diagrams explaining another group of configuration examples of a playback output system in FIG. 22.

For example, as shown in FIG. 28A, the playback output system 512 may include a playback output control apparatus 705 which controls a playback apparatus 701, an image audio processing apparatus 702, and an output apparatus 703 based on a determination result of a rate information determination apparatus 704. In this case, the rate information determination apparatus 704 determines a variety of settings and operation modes based on the rate information which is read out by the playback apparatus 701 and provides the determination result to the playback output control apparatus 705. The playback output control apparatus 705 provides control information to the playback apparatus 701, the image audio processing apparatus 702, and the output apparatus 703 based on the determination result. The playback apparatus 701, the image audio processing apparatus 702, and the output apparatus 703 perform each processing based on the control information.

Figure 28B:
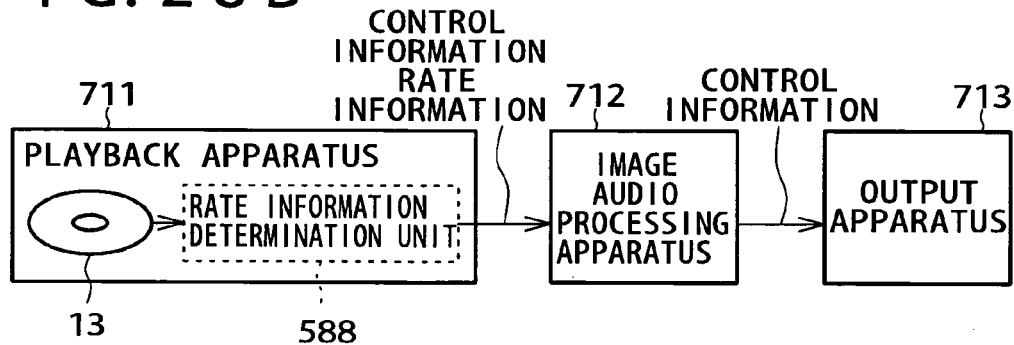

Further, for example, as shown in FIG. 28B, the playback apparatus may include the rate information determination unit. In FIG. 28B, a playback apparatus 711 has a rate information determination unit 588. That is, in this case, determination is made based on the rate information in the playback apparatus 711, and control information created based on the determination result is provided to an image audio processing apparatus 712 and an output apparatus 713.

Figure 28C:
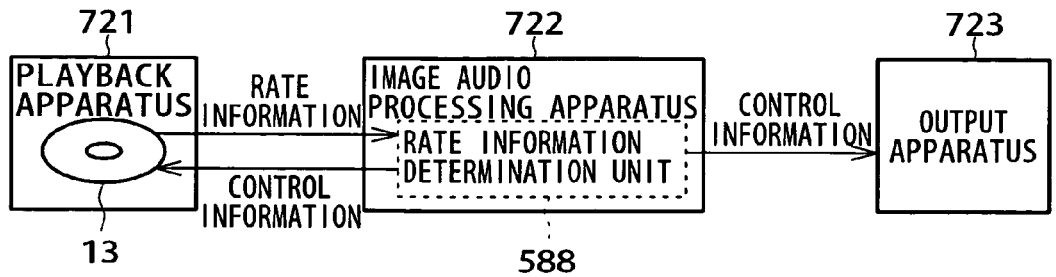

Furthermore, for example, as shown in FIG. 28C, the image audio processing apparatus may include the rate information determination unit. In FIG. 28C, an image audio processing apparatus 722 has a rate information determination unit 588. That is, in this case, determination is made based on the rate information in the image audio processing apparatus 722, and control information created based on the determination result is provided to a playback apparatus 721 and an output apparatus 723. As described above, the system and the apparatus according to the present invention can provide information regarding settings at the time of imaging and recording to the user or the apparatus that plays back the data and enables them to perform more effective playback processing and output processing.

In the foregoing, the description of the rate information has been made on the image data; however, the above description may apply to, for example, the rate information of the audio data, etc.

Further, the description in the case where the imaging apparatus images the subject and thereby the image data which is the content data is generated has been made. However, the present invention can apply to any system that sends the content data from a first apparatus to a second apparatus through the record medium or the transmission medium. That is, the first apparatus may generate the content data or receive it from the outside. That is, the capture rate refers to the data rate at the time of generating or receiving the content data at the first apparatus. Further, the first apparatus may record the content data onto the record medium or transmit it to the second apparatus through a wire or wireless network. That is, the REC rate refers to the data rate at the time of recording or transmitting the content data at the first apparatus. Furthermore, the second apparatus may read and play back the content data from the record medium on which the first apparatus records it, or receive and play back the content data transmitted from the first apparatus. That is, the format rate refers to the data rate at the time of playing back the content data (normal playback) at the second apparatus.

A series of processes described above is performed in hardware or software. In the case of performing the processes in software, a program that constitutes the software is installed from the network or the record medium.

As shown in FIG. 23 for example, the record medium comprises not only the removable medium 616 comprising the magnetic disk (including a floppy disk), the optical disc (including a CD-ROM (Compact Disk-Read Only Memory) and a DVD (Digital Versatile Disk)), the magneto-optical disk (including an MD (Mini-Disk)), a semiconductor memory, etc. which the recorded program is distributed to the user from, besides from the body of the apparatus, but also the ROM 602, a hard disk in the storage unit 613, etc. which are incorporated in the apparatus beforehand and contains the program.

Furthermore, in this specification, steps for describing the program recorded on the record medium may be performed not only in the time series described but also in parallel or individually.

Furthermore, in this specification, the system represents the whole apparatus comprising a plurality of apparatuses.

The foregoing invention has been described in terms of preferred embodiments. However, those skilled, in the art will recognize that many variations of such embodiments exist. Such variations are intended to be within the scope of the present invention and the appended claims.

What is claimed is:

1. An image recording apparatus for processing information regarding content data, the apparatus comprising:
creation means for receiving (1) input record mode which is input by a user and (2) a broadcast standard of the image recording apparatus as image recording apparatus information, said creation means for creating (a) a capture rate which is information regarding a data rate at the time of inputting or generating the content data, (b) a REC rate which is information regarding a data rate at the time of recording the content data, and (c) a format rate which is a data rate at the time of normal playback of the content data and for outputting low resolution content data, the capture rate, the REC rate and format rate to a playback apparatus via a communication unit and for outputting high-resolution content data to a record unit,
wherein the capture rate and the REC rate are created based upon both the image recording apparatus information and the input record mode, and wherein the format rate is created based on the image recording apparatus information, and wherein the input record mode being a system mode and a speed mode, the system modes including an interlaced mode, a progressive mode, a progressive segmented frame (PSF) mode and a pull down mode and the speed modes including a normal speed mode, high-speed mode and a low-speed mode.

2. The apparatus according to claim 1, wherein the content data is image data.

3. The apparatus according to claim 1, wherein
the apparatus further comprises imaging means for imaging a subject and generating image data as the content data, and wherein
the creation means creates, as the capture rate, information regarding a data rate of the content data at the time when the imaging means generates the content data.

4. The apparatus according to claim 1, wherein,
the record unit comprises content data record means for recording the content data onto a record medium, and wherein
the creation means creates, as the REC rate, information regarding a data rate of the content data at the time when the content data record means records the content data onto the record medium.

5. The apparatus according to claim 1, wherein
the apparatus further comprises input reception means for receiving a control instruction regarding input, generation, record, or playback of the content data that a user inputs, and wherein
the creation means creates the capture rate, the REC rate, and the format rate based on the control instruction received by the input reception means.

6. The apparatus according to claim 1, wherein the record unit including rate information record means for recording the capture rate, the REC rate, and the format rate are created by the creation means onto a record medium.

7. The apparatus according to claim 6, wherein the rate information record means records a transition point of the capture rate, the REC rate, and the format rate onto the record medium.

8. The apparatus according to claim 6, wherein the rate information record means relates information regarding a UMID of the content data to the capture rate, the REC rate, and the format rate and further records the information regarding the UMID of the content data onto the record medium.

9. The apparatus according to claim 1, wherein the record unit including rate information transmission means for transmitting the capture rate, the REC rate, and the format rate which are created by the creation means to a different information processing apparatus.

10. The apparatus according to claim 9, wherein the rate information transmission means transmits a transition point of the capture rate, the REC rate, and the format rate to the different information processing apparatus.

11. The apparatus according to claim 9, wherein the rate information transmission means relates information regarding a UMID of the content data to the capture rate, the REC rate, and the format rate and further transmits the information regarding the UMID of the content data to the different information processing apparatus.

12. An image recording method of an image recording apparatus for processing information regarding content data, the method comprising:
receiving (1) input record mode which is input by a user and (2) a broadcast standard of the image recording apparatus as image recording apparatus information, creating a capture rate which is information regarding a data rate at the time of inputting or generating the content data, a REC rate which is information regarding data rate at the time of recording the content data, and a format rate which is a data rate at the time of normal playback of the content data,
outputting low resolution content data, the capture rate, the REC rate and the format rate to a playback apparatus via a communication unit and
outputting high resolution content data content data to a record unit,
wherein the capture rate and the REC rate are created based upon both the image recording apparatus information and the input record mode, and wherein the format rate is created based on the image recording apparatus information, and wherein the input record mode being a system mode and a speed mode, the system modes including an interlaced mode, a progressive mode, a progressive segmented frame (PSF) mode and a pull-down mode and the speed modes including a normal speed mode, high-speed mode and a low-speed mode.

13. A computer program embodied on a non-transitory computer readable medium for making a computer process information regarding content data obtained by an image recording apparatus, the program comprising:
a creation step of receiving (1) input record node which is input by a user and (2) a broadcast standard of the image recording apparatus as image recording apparatus information, creating a capture rate which is information regarding a data rate at the time of inputting or generating the content data, a REC rate which is information regarding a data rate at the time of recording the content data, and a format rate which is a data rate at the time of normal playback of the content data, and outputting low resolution content data, the capture rate, the REC rate and the format rate to a playback apparatus via a communication unit and outputting high resolution content data to a record unit,
wherein the capture rate and the REC rate are created based upon both the image recording apparatus information and the input record mode, and wherein the format rate is created based on the image recording apparatus information, and wherein the input record mode being a system mode and a speed mode, the system modes including an interlaced mode, a progressive mode, a progressive segmented frame (PSF) mode and pull-down mode and the speed modes including a normal speed-mode, high-speed mode and a low-speed mode.

14. A playback output apparatus for output processing information regarding content data, the apparatus comprising:
determination means for determining a setting for controlling at least one of playback processing and output data conversion processing of the content data, high resolution content data provided on a recording medium, said setting is directly determined based on input information from an image recording apparatus via a communication unit, the input information includes (a) a capture rate which is information regarding a data rate at the time of inputting or generating the content data, (b) a REC rate which is information regarding a data rate at the time of recording the content data, (c) a format rate which is a data rate at the time of normal playback of the content data and (d) low resolution content data, wherein the capture rate and REC rate are created based upon both a broadcast standard of the image recording apparatus as image recording apparatus information and a user input at the time of recording and the format rate is created based on the image recording apparatus information, and the user input at the time of recording being a system mode and a speed mode, the system modes including an interlaced mode, a progressive mode, a progressive segmented frame (PSF) mode and a pull-down mode and the speed modes including a normal-speed mode, a high-speed mode and a low-speed mode.

15. The apparatus according to claim 14, wherein the content data is image data.

16. The apparatus according to claim 14, further comprising playback means for playing back the content data at a data rate based on the format rate.

17. The apparatus according to claim 16, further comprising output means for outputting the content data played back by the playback means.

18. The apparatus according to claim 17, wherein
the apparatus further comprises data conversion means for converting the content data played back by the playback means based on a determination result by the determination means, and wherein
the output means outputs the content data converted by the data conversion means.

19. The apparatus according to claim 17, wherein
the apparatus further comprises output information creation means for creating output information for outputting a determination result by the determination means or the capture rate, the REC rate, and the format rate, and wherein
the output means further outputs the output information created by the output information creation means.

20. The apparatus according to claim 14, wherein
the apparatus further comprises acquisition means for reading and acquiring the capture rate, the REC rate, and the format rate recorded on the record medium, and wherein
the determination means determines a setting regarding playback processing and output processing of the content data based on the capture rate, the REC rate, and the format rate which are read and acquired from the record medium by the acquisition means.

21. The apparatus according to claim. 14, wherein
the apparatus further comprises receiving means for receiving the capture rate, the REC rate, and the format rate which are transmitted from the different information processing apparatus, and wherein
the determination means determines a setting regarding playback processing and output processing of the content data based on the capture rate, the REC rate, and the format rate which are received by the receiving means.

22. A playback output method of a playback output apparatus for processing information regarding content data, the method comprising:
a determination step of determining a setting for controlling at least one of playback processing and output data conversion processing of the content data, high resolution content data provided on a record medium, said setting being directly determined based on input information from an image recording apparatus via a communication unit, the input information includes (a) a capture rate which is information regarding a data rate at the time of inputting or generating the content data, (b) a REC rate which is information regarding a data rate at the time of recording the content data, (c) a format rate which is a data rate at the time of normal playback of the content data and (d) low resolution content data, wherein the capture rate and REC rate are created based upon both a broadcast standard of the image recording apparatus as image recording apparatus information and a user input at the time of recording and the format rate is created based on the image recording apparatus information, and the user input at the time of recording being a system mode and a speed mode, the system modes including an interlaced mode, a progressie mode, a progressive segmented frame (PSF) mode and a pull-down mode and the speed modes including a normal-speed mode, a high-speed mode and a low-speed mode.

23. A computer program embodied on a non-transitory computer readable medium for making a computer process information regarding content data output by a playback output apparatus, the program comprising:
a determination step of determining a setting for controlling at least one of playback processing and output data conversion processing of the content data, high resolution content data provided on a record medium, said setting being directly determined based on input information from a communication unit of an image recording apparatus, the input information includes (a) a capture rate which is information regarding a data rate at the time of inputting or generating the content data, (b) a REC rate which is information regarding a data rate at the time of recording the content data, (C) a format rate which is a data rate at the time of normal playback of the content data and (d) low resolution content data, wherein the capture rate and REC rate are created based upon both a broadcast standard of the image recording apparatus as image recording apparatus information and a user input at the time of recording and the format rate is created based on the image recording apparatus information, and the user input at the time of recording being a system mode and a speed mode, the system modes including an interlaced mode, a progressive mode, a progressive segmented frame (PSF) mode and a pull-down mode and the speed modes including a normal-speed mode, a high-speed mode and a low-speed mode.

* * * * *